United States Patent [19]
Negishi et al.

[11] Patent Number: 5,486,878
[45] Date of Patent: Jan. 23, 1996

[54] COLOR IMAGE DISPLAY APPARATUS WITH REFLECTION MIRRORS SIMULTANEOUSLY OSCILLATED

[75] Inventors: Ichiro Negishi; Tetsuji Suzuki, both of Yokosuka; Fujiko Koyama, Yokohama; Yuji Uchiyama, Yokosuka; Hiroyuki Bonde, Yokohama; Toshio Konno, Tokyo; Ryusaku Takahashi; Toshiaki Shou, both of Yokosuka, all of Japan

[73] Assignee: Victor Company of Japan, Ltd., Yokohama, Japan

[21] Appl. No.: 313,585

[22] Filed: Sep. 23, 1994

[30] Foreign Application Priority Data

Sep. 24, 1993 [JP] Japan ................... 5-261654
Sep. 30, 1993 [JP] Japan ................... 5-268387
Oct. 8, 1993 [JP] Japan ................... 5-277697

[51] Int. Cl.⁶ .................................. H04N 9/31
[52] U.S. Cl. ................... 348/757; 348/205; 348/752; 359/204; 359/634
[58] Field of Search ................... 348/196, 203, 348/205, 599, 744, 750, 756, 757, 751, 752, 754; 359/629, 634, 640, 201, 216, 202, 221, 204, 205, 315, 318, 319, 263; 250/578.1; H04N 9/31

[56] References Cited

U.S. PATENT DOCUMENTS 4,687,301  8/1987  Ledebuhr ................... 359/634
4,807,976  2/1989  Little et al. ................... 359/236
5,305,146  4/1994  Nakagaki et al. ................... 359/634

FOREIGN PATENT DOCUMENTS

0509194A1  10/1992  European Pat. Off. ......... H04N 9/31
5-219464   8/1993   Japan ................... H04N 9/31
5224232    9/1993   Japan ................... H04N 9/31
5-224232   9/1993   Japan ................... H04N 9/31

Primary Examiner—James J. Groody
Assistant Examiner—Jeffrey S. Murrell
Attorney, Agent, or Firm—Jacobson, Price, Holman & Stern

[57] ABSTRACT

In a color image display apparatus, light beams intensity modulated by a green color image signal are deflected by an ocillating mirror, and then focused on a photo-conductive layer (PCL) member of a light-written type spacial light modulation element (SLM) through two focusing lenses for light write operation. Light beams intensity modulated by a time-axis compressed time-divisional image signal of two remaining colors (red and blue) are deflected by another mirror oscillated simultaneously with the ocillating mirror, and then focused on a PCL member of a SLM of the same type through two focusing lenses for light write operation. A read light beam is resolved into the light of the green wave length band and the lights of red and blue wave length bands, respectively, and then given to the SLMs, respectively for light read operation. The two read light beams reflected by the SLMs are synthesizing, and then projected on a screen through a common projection lens.

18 Claims, 37 Drawing Sheets

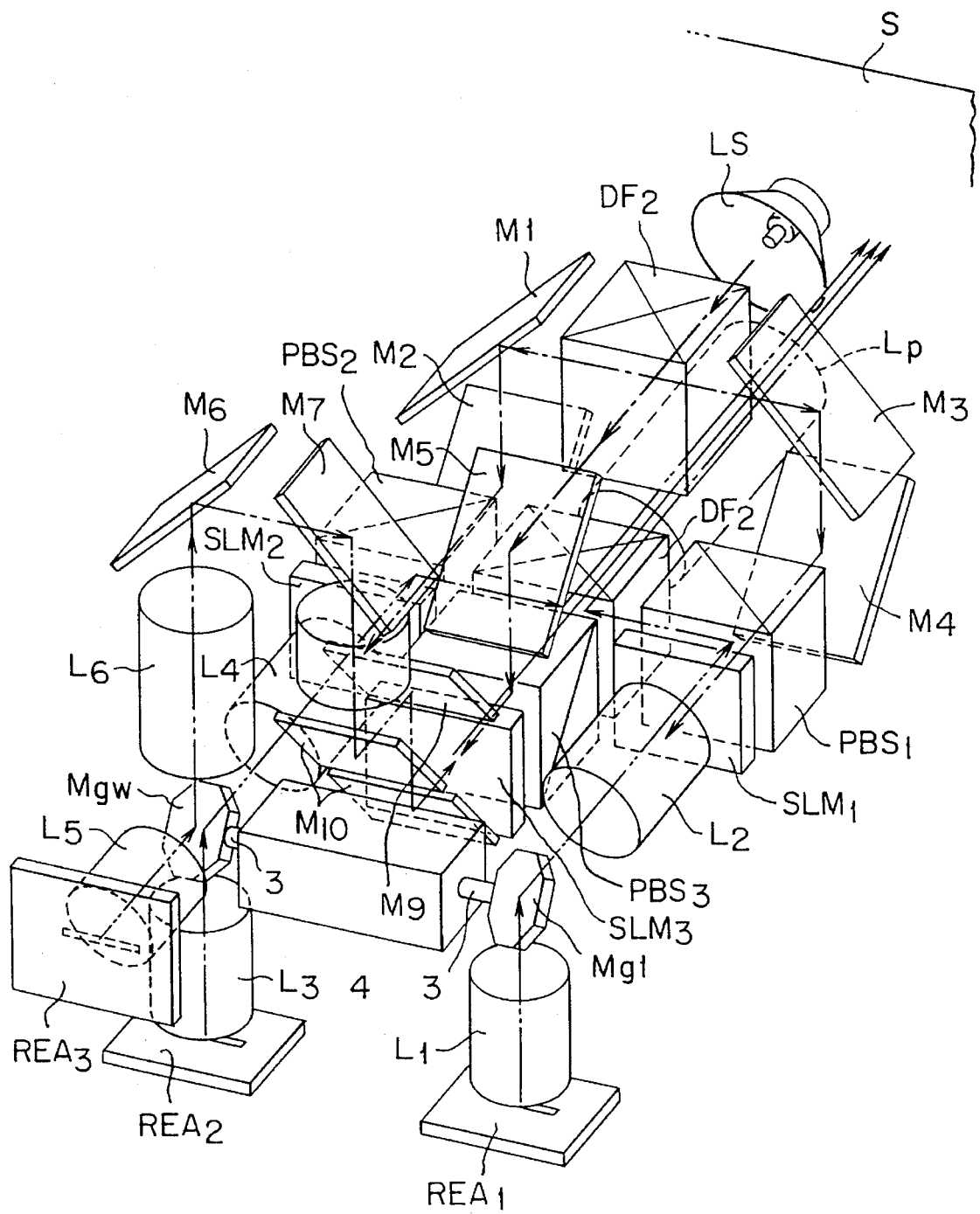
F I G. 5

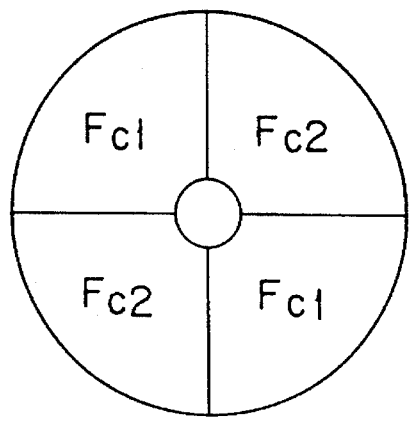 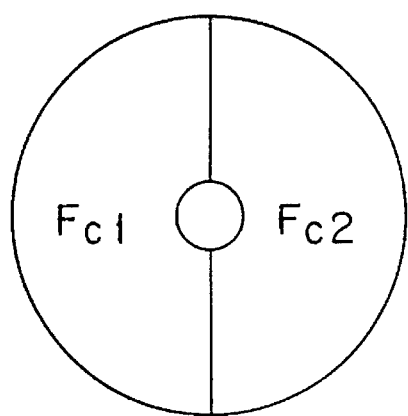
FIG. 34   FIG. 35
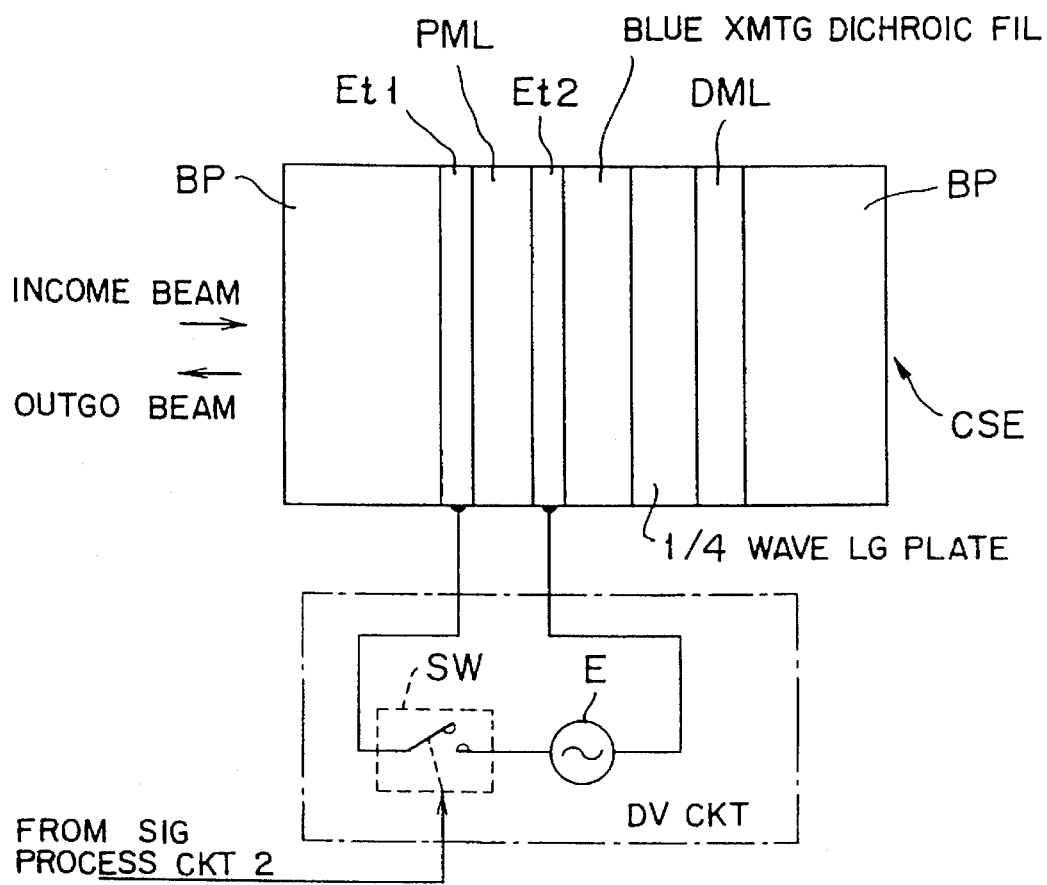
FIG. 36

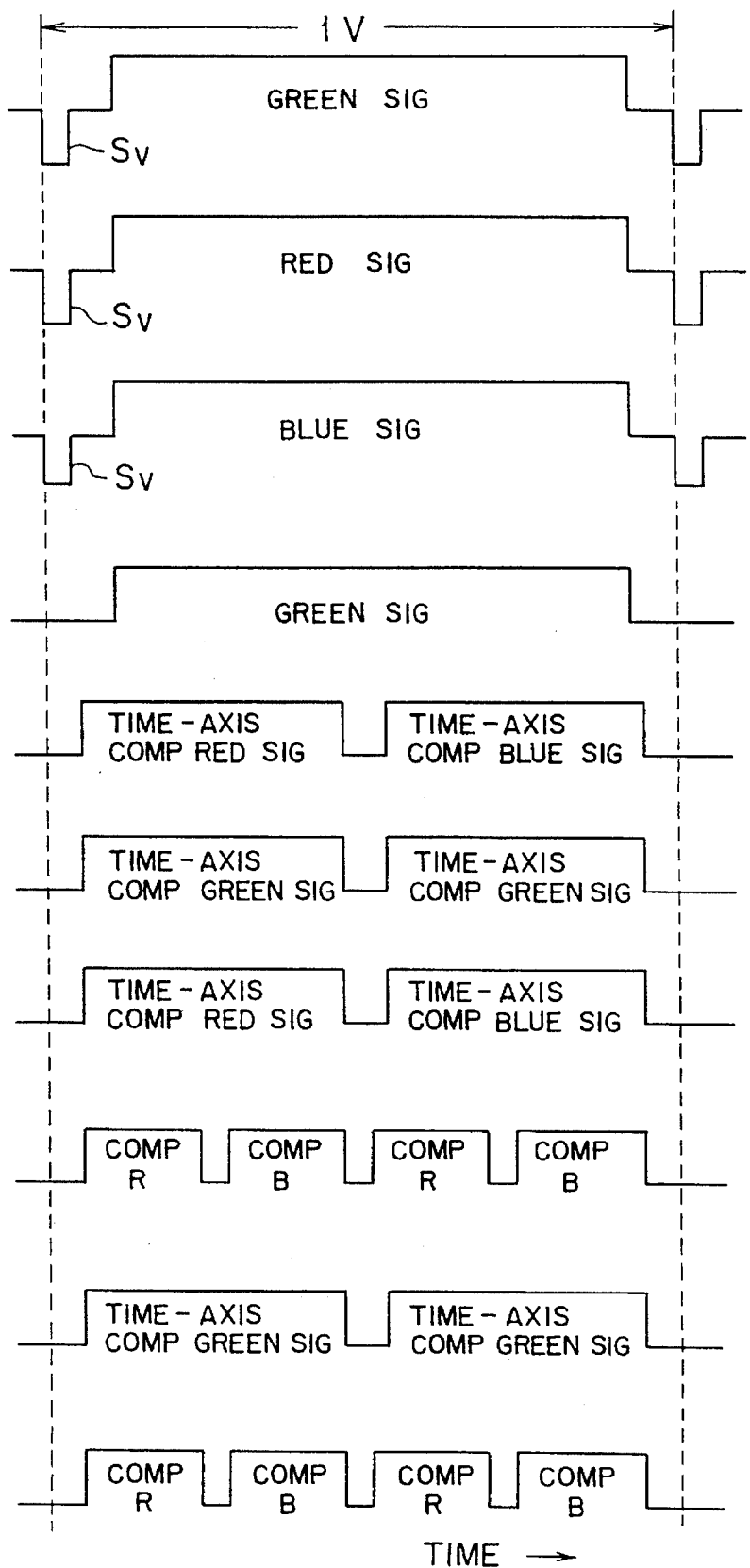

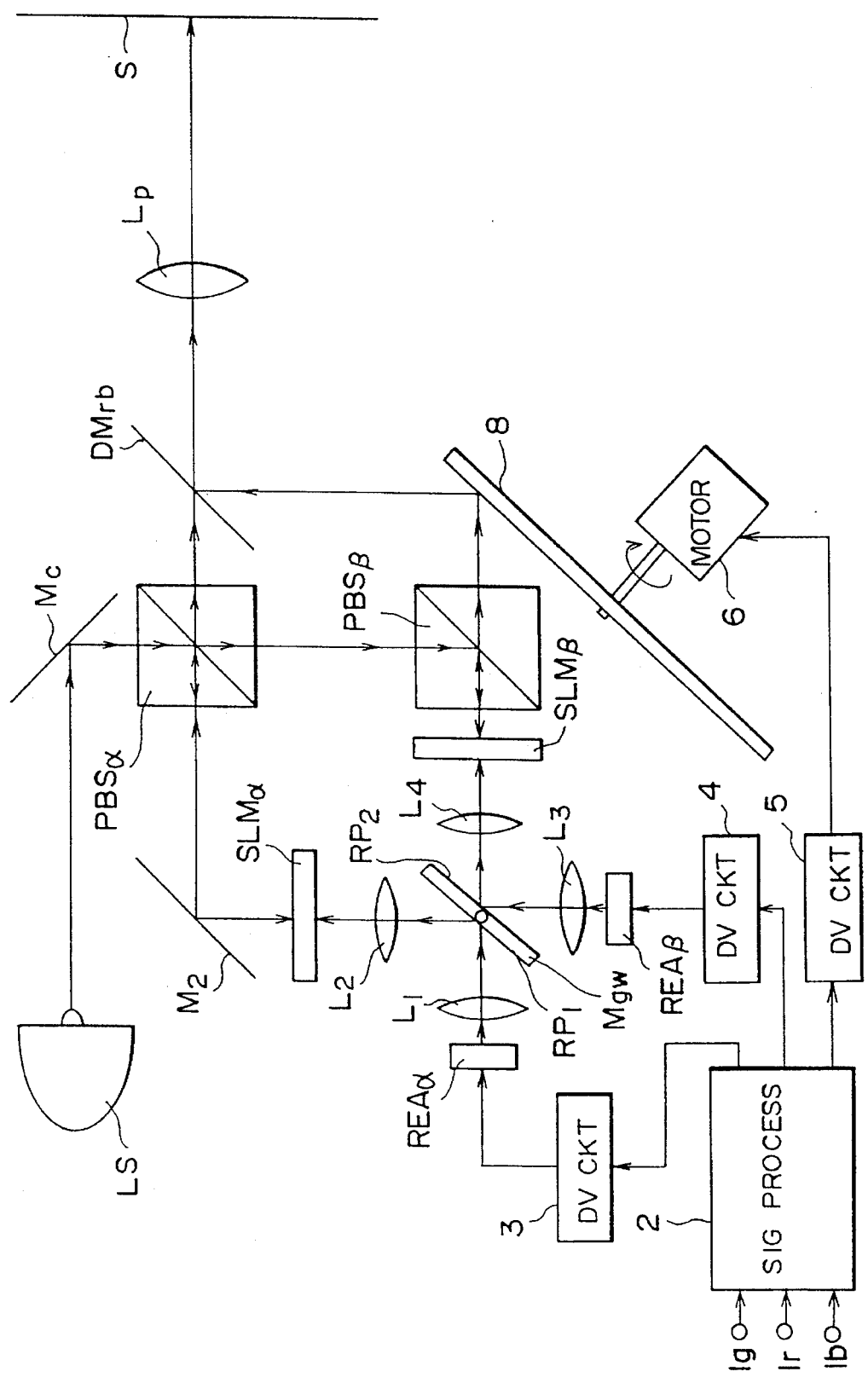
F I G. 40

COLOR IMAGE DISPLAY APPARATUS WITH REFLECTION MIRRORS SIMULTANEOUSLY OSCILLATED

BACKGROUND OF THE INVENTION

1. Field of the Invention

The present invention relates to a color image display apparatus.

2. Description of the Prior Art

FIGS. 1 and 2 show examples of prior art color image display apparatus of high resolution type. In these drawings, REA (in FIG. 2), REAr (red), REAg (green) and REAb (blue) (in FIG. 1) denote light emitting element arrays, respectively, each of which is formed by arranging a great number of light emitting elements (e.g., light emitting diodes) in a straight line. Further, CSA denotes a three-color resolving (or synthesizing) optical system composed of prisms Pr and Pb, a dichroic prism DP, reflection surfaces Mr and Mb, etc.

In the display apparatus shown in FIG. 1, three light emitting element arrays REAr, REAg and REAb are arranged in parallel to each other in a space. Three sorts of light beams (three primary colors) emitted from these three regions independently are focused on three spacial light modulation elements (SLMr, SLMg and SLMb) through three focusing lenses Lr, Lg and Lb end three light deflection elements DMgr, DMg end DMb, respectively.

In the display apparatus shown in FIG. 2, on the other hand, one light emitting element array REA is divided into three regions of r(red), g(green) and b (blue) arranged in series. Three sorts of light beams (three primary colors) emitted from these three regions are focused on three spacial light modulation elements (SLMr, SLMg and SLMb), respectively through a single focusing lens L and a single light deflection element Mg.

Further, in both FIGS. 1 and 2, a read light emitted from a read light source LS is written in the three spacial light modulation elements SLMr, SLMg and SLMb, respectively through a polarizing light beam splitter PBS and a three-color resolving (or synthesizing) optical system, to read three different optical information from the three spacial light modulation elements SLMr, SLMg and SLMb, separately. The three sorts (primary colors) of optical information read from the three spacial light modulation elements SLMr, SLMg and SLMb, separately are synthesized (or resolved) by the three-color resolving (or synthesizing) optical system CSA, introduced to a projection lens Lp through the polarizing light beam splitter PBS, and then projected upon a screens through the projection lens Lp as a color image.

In the display apparatus, N-units of light beams emitted from the N-unit light emitting elements of the light emitting arrays, respectively are introduced to the three light deflection elements DMr, DMg, DMb through the focusing lenses Lr, Lg and Lb, respectively in FIG. 1, and to the light deflection element Mg through the focusing lens L in FIG. 2 under such conditions that the intensities of these three light beams are modulated (referred to as intensity-modulated, hereinafter) on the basis of N-units of pixel information. Further, the deflected three light beams are focused on three photo-conductive layer members of the three spacial light modulation elements (SLMr, SLMg and SLMb), respectively. Further, under these focused conditions, the three light beams are scanned repeatedly in the perpendicular direction of the three spacial light modulation elements SLMr, SLMg and SLMb, respectively, so that the three light beams are written in the three spacial light modulation elements SLMr, SLMg and SLMb, respectively.

In the following description, where a plurality of spacial light modulation elements SLM are explained, these elements SLM are distinguished from each other by attaching some suffixes to the elements SLM. However, where these elements are explained in common without any distinction, no suffix is attached to the elements. Here, the spacial light modulation element SLM is formed as shown in FIG. 3, for instance. In more detail, the spacial light modulation element SLM is formed by laminating a transparent substrate BP1, a Transparent electrode Et1, a photo-conductive layer member PCL, a dielectric mirror DML, a light modulation substance layer member PML, a transparent electrode Et2, and a transparent substrate BP2. The transparent electrodes Et1 end Et2 are of a thin film, respectively formed of a transparent photo-conductive substance. Further, the photo-conductive layer member PCL is formed of a substance having photo-conductive characteristics in a wave length band of light to be used. Further, the dielectric mirror DML is a known multilayer structure by which light of a predetermined wave length band can be reflected. Further, the light modulation substance layer member PML is formed of a light modulating substance by which light status (deflection, polarization, scattering, etc.) can be changed according to the strength of an electric field applied to the modulation substance thereof.

The above-mentioned light modulation substance is a nematic liquid crystal activated in various modes such as TN mode, hybrid field effect mode (HFE), guest host mode (GH), electric field induced double refraction mode (vertical or horizontal orientation), dynamic scattering mode, phase transition mode, etc., for instance. In particular, when the nematic liquid crystal of vertical orientation is used in the electric field induced double refraction mode, since the dependency of the light modulation effect upon the wave length of the read light can be reduced, it is possible to obtain a high contrast image. As the other light modulation substances, there are smetic liquid crystal, ferroelectric liquid crystal, etc. Further, electro-optic crystals such as lithium niobate, BSO, PLZT, etc. and high molecular-liquid crystal composite film, etc. can be used as the light modulation substance.

In FIG. 3, E denotes a power source for supplying a predetermined voltage between the two transparent electrodes Et1 and Et2. Although shown as an alternating voltage power source, this power source can be replaced with a direct current voltage power source according to the substance for constituting the light modulation substance layer member PML. Further, in FIG. 3, WL denotes a write light beam incoming to the substrate (BP1) side of the spacial light modulation element SLM and focused on the photo-conductive layer member PCL. This write light beam is intensity-modulated according to the image information to be displayed. That is, N-unite of the write light beams WL each of whose intensity is modulated according to the image (pixel) information to be displayed are introduced to the transparent substrate (Et1) side of the spacial light modulation element SLM, to which a predetermined voltage of the voltage source E is applied between the two transparent electrodes Et1 and Et2.

When the write light beam is focused upon the photo-conductive layer member PCL through the transparent substrate BP1 and the transparent electrode Et1, the electric resistance of the photo-conductive layer member PCL (at which the write light beam is focused) changes according to the quantity of the write light beam, so that an eclectic field having an electric field strength distribution corresponding to the quantity of the write light beam WL is to be applied between both ends of the light modulation substance layer member PML. The distribution of the electric field strength corresponds to the level change of the sequential pixel signals generated in time series manner.

Therefore, when the read light RL is introduced to the transparent substrate (BP2) side of the spacial light modulation element SLM, the introduced read light reaches a dielectric mirror DML by way of the transparent substrate BP2→the transparent electrode Et2→the light modulation substance layer member PML→the dielectric mirror DML. After that, being reflected therefrom, the reflected read light outgoes by way of the dielectric mirror DML→the light modulation substance layer member PML→the transparent electrode Et2→the transparent substrate BP2. The light status of the N-unit light beams outgoing from the spacial light modulation element SLM changes according to the level change of the pixel signals generated in time series manner.

Therefore, when material constituting the light modulation substance layer member PML of the spacial light modulation element SLM can change the polarization status or double refraction status of the light beam passed through the element SLM according to the electric field strength applied thereto, the polarization status or the polarization plane status of the reflected read light beam outgoing from the spacial light modulation element SLM changes according to the N-units of sequential pixel information generated in time series manner. Accordingly, when the light beam outgoing from the spacial light modulation element SLM is passed through an analyzer (or the polarizing light beam splitter PBS), it is possible to obtain the light beam whose intensity changes according to the N-units of sequential time-series pixel information.

In the above-mentioned prior art color image display apparatus as shown in FIG. 1, however, three light beams are emitted from the three light emitting element arrays REAr, REAg and REAb arranged in parallel to each other in a space. Further, these light beams are focused on the three spacial light modulation elements (SLMr, SLMg and SLMb) through three focusing lenses Lr, Lg and Lb and the three light deflection elements DMgr, DMg and DMb, independently to write the optical information in the three spacial light modulation elements (SLMr, SLMg and SLMb), separately. Accordingly, there exists a problem in that various errors are inevitably produced due to the manufacturing error of the optical lenses, the mounting error of the lenses to lens barrels, the eccentricity of the optical axes of the lenses, the error of the light deflector, etc.

Further, since the respective optical paths are provided between the three light emitting element arrays REAr, REAg and REAb and the three spacial light modulation elements (SLMr, SLMg and SLMb) respectively, the image distortions generated by the respective optical members arranged in the respective optical paths are independent from each other without any correlation between them, with the result that it is extremely difficult to superimpose a plurality of high resolution images under excellent conditions. In the case of the color image display in particular, since a plurality of optical information must be displayed simultaneously, it is impossible to display color images of high resolution.

On the other hand, in the case of the prior art color image display apparatus shown in FIG. 2, one light emitting element array PEA is divided into three regions of r, g and b being arranged in series, and three light beams are emitted in parallel individually. Further, these three sorts of light beams emitted from these three regions are focused on three spacial light modulation elements (SLMr, SLMg and SLMb), respectively through a common focusing lens L and a common light deflection element Mg. Therefore, the three sorts of light beams emitted from the three different regions r, g, and b of one light emitting element array REA in parallel to each other are introduced to the image-forming lens L at three different incident angles. Therefore, the images of the optical information emitted from three different divided regions r, g and b of the one light emitting element array REA have three different image distortions, independently. As a result, it is extremely difficult to superimpose a plurality of high resolution images under excellent conditions. In addition, there exists another problem in that MTF (mean time to failure) of the display apparatus is degraded and shear (dislocation) occurs in color image.

Further, in the prior art color display apparatus, the major light beam goes and returns in the same optical path through the color resolving or synthesizing means, with the result that there exists another problem in that the contrast is degraded and the resolution is lowered. In addition, since an expensive polarization beam splitter operative to light of a wide wave length band (white light) excellently must be used and further an expensive projection lens of long lens back is required, there arises another problem in that the display apparatus is costly.

Further, in the prior art display apparatus, since a plurality of light begone having plural optical information are synthesized into one light beam, the optical synthesizing system is relatively complicated in proportion to the number of the optical information, so that the attenuation rate of the optical information increases. In order to project a bright color image on the screen, the light emitting elements of high power type must be used under consideration of the increased attenuation rate of the optical information. In addition, in order to superimpose the plural optical information, a complicated adjusting mechanism has been so far required.

SUMMARY OF THE INVENTION

With these problems in mind, therefore, it is the object of the present invention to provide a color image display apparatus high in resolution, low in cost and small in size by use of low-costly polarizing light beam splitters, color resolving or synthesizing filters, projection lens, etc.

To achieve the above-mentioned object, the present invention provides a color image display apparatus, comprising: light deflecting means for deflecting two light beams simultaneously by oscillating first and second oscillating reflection mirrors attached to a common oscillation shaft a predetermined distance away from each other at a predetermined period; first light emitting means for emitting a first light beam intensity-modulated on the basis of an image signal of a specific primary color of three primary colors of additive color mixture for constituting a color image to be displayed, to the first oscillating reflection mirror of said light deflecting means; second light emitting means for emitting a second light beam intensity modulated on the basis of an image signal of two remaining primary colors, to the second oscillating reflection mirror of said light deflecting means, the two remaining primary colors being complementary to the specific primary color and the two remaining primary color light beams being separatable in space or time; first focusing means for focusing the light beam deflected by the first oscillating reflection mirror to a first light-written type spacial light modulation element composed of at least a photo-conductive layer member and a light modulation substance layer member, to write the light beam deflected by the first oscillating reflection mirror; second focusing means for focusing the light beam deflected by The second oscillating reflection mirror to a second light-written type spacial light modulation element composed of at least a photo-conductive layer member and a light modulation substance layer member, to write the light beam deflected by the second oscillating reflection mirror; light resolving means for resolving light emitted by a read light source to three read lights of predetermined wave length bands corresponding to the three primary colors of the additive color mixture, respectively; first light introducing means for introducing a resolved read light with a wave length band of the specific primary color, to said first light-written type spacial light modulation element as a read light; second light introducing means for selectively introducing two remaining read lights with two wave length bands of the two primary colors complementary to the specific primary color, to said second light-written type spacial light modulation element as two read lights, separately in correspondence to light writing portions at which the second light beam intensity-modulated on the basis of the image signal of the two remaining primary colors has been written; light synthesizing means for synthesizing two read lights intensity-modulated on the basis of the respective color image information and read from said first and second light-written type spacial light modulation elements separately, into light intensity-modulated on the basis of the respective image information; and projecting means for projecting the light synthesized by said light synthesizing means onto a screen.

Further, the present invention provides a color image display apparatus, comprising: light deflecting means for deflecting three light beams simultaneously by oscillating a first oscillating reflection mirror and a second oscillating reflection mirror formed with a first reflective surface and a second reflective surface on both right and reverse sides thereof at a predetermined period, both the reflection mirror being attached to a common oscillation shaft a predetermined distance away from each other; first light emitting means for emitting a first light beam intensity-modulated on the basis of an image signal of a specific primary color of three primary colors of additive color mixture for constituting a color image to be displayed, to the first oscillating reflection mirror of said light deflecting means; second light emitting means for emitting a second light beam intensity-modulated on the basis of an image signal of one of two remaining primary colors, to the first reflective surface of the second oscillating reflection mirror of said light deflecting means; third light emitting means for emitting a third light beam intensity-modulated on the basis of an image signal of the other of two remaining primary colors, to the second reflective surface of the second oscillating reflection mirror of said light deflecting means; first focusing means for focusing the light beam deflected by the first oscillating reflection mirror to a first light-written type spacial light modulation element composed of at least a photo-conductive layer member and a light modulation substance layer member; second focusing means for focusing the light beam deflected by the first reflective surface of the second oscillating reflection mirror to a second light-written type spacial light modulation element composed of at least a photo-conductive layer member and a light modulation substance layer member; third focusing means for focusing the light beam deflected by the second reflective surface of the second oscillating reflection mirror to a third light-written type spacial light modulation element composed of at least a photo-conductive layer member and a light modulation substance layer member; light resolving means for resolving light emitted by a read light source to three read lights with wave length bands of the three primary colors of the additive color mixture, respectively; light introducing means for introducing each of the three resolved read lights with three wave length bands of the three primary colors, to said first, second and third light-written type spacial light modulation elements, as a read light, respectively; light synthesizing means for synthesizing three lights intensity-modulated on the basis of the respective color image signals and read from said first, second and third light-written type spacial light modulation elements separately, into light intensity-modulated on the basis of the respective image information; and projecting means for projecting the light synthesized by said light synthesizing means onto a screen.

Further, the present invention provides a color image display means, comprising: a first light-written type reflective spacial light modulation element composed of at least a photo-conductive layer member and a light modulating substance member, for writing two-dimensional image information of a first light beam intensity-modulated on the basis of an image signal of a specific primary color of three primary colors of additive color mixture for constituting a color image to be displayed; a second light-written type reflective spacial light modulation element composed of at least a photo-conductive layer member and a light modulating substance member, for writing two-dimensional image information of a second light beam intensity-modulated on the basis of an image signal of two remaining primary colors, the two remaining primary colors being complementary to the specific primary color and the two remaining primary color light beams being separatable in space or time; a first polarizing light beam splitter arranged on a read light incoming side of said first light-written type reflective spacial light modulation element; a second polarizing light beam splitter arranged on a read light incoming side of said second light-written type reflective spacial light modulation element; separating means for separating read light emitted by a read light source to a first read light of the specific primary color of three colors of additive color mixture and second read lights of two remaining primary colors complementary to the specific primary color; light introducing means for introducing the separated first read light to the read light incoming side of said first light-written type reflective spacial light modulation element through said first polarizing light beam splitter; selective light introducing means for selectively introducing the separated second read lights with two wave length bands of the two primary colors complementary to the specific primary color, to the read light incoming side of said second light-written type reflective spacial light modulation element through said second polarizing light beam splitter, in correspondence to light writing portions at which the second light beams intensity-modulated on the basis of the image signal of the two remaining primary colors has been written; synthesizing means for synthesizing the first read light having image information of the specific primary color of the three primary colors of additive color mixture, reflected by said first light-written type reflective light modulation element and outputted through said first polarizing light beam splitter; and the second read light having image information of the two remaining primary colors complementary to the specific primary color and separatable in space or time, reflected by said second light-written type reflective light modulation element, and outputted through said second polarizing light beam splitter, into light intensity-modulated on the basis of the respective image information; and projecting means for projecting the light synthesized by said light synthesizing means onto a screen.

Further, the present invention provides a color image display apparatus, comprising: first light emitting means for emitting a first light beam intensity-modulated on the basis of an image signal of a specific primary color of three primary colors of additive color mixture for constituting a color image to be displayed, to a first reflective surface of an oscillating reflection mirror formed with a first and second reflective surfaces on both right and reverse sides thereof; second light emitting means for emitting a second light beam intensity-modulated on the basis of an image signal of two remaining primary colors, to the second reflective surface of the oscillating reflection mirror, the two remaining primary colors being complementary to the specific primary color and the two remaining primary color light beams being separatable in space or time; first focusing means for focusing the light beam deflected by the first reflective surface of the oscillating reflection mirror to a first light-written type spacial light modulation element composed of at least a photo-conductive layer member and a light modulation substance layer member; second focusing means for focusing the light beam deflected by the second reflective surface of the oscillating reflection mirror to a second light-written type spacial light modulation element composed of at least a photo-conductive layer member and a light modulation substance layer member; light resolving means for resolving light emitted by a read light source to three read lights of predetermined wave length bands corresponding to the three primary colors of the additive color mixture, respectively; first light introducing means for introducing a resolved read light with a wave length band of a specific primary color, to said first light-written type spacial light modulation element as a read light; second light introducing means for selectively introducing two remaining read lights with two wave length bands of the two primary colors complementary to the specific primary color, to said second light-written type spacial light modulation element as two read lights, separately in correspondence to light writing portions at which the second light beam intensity-modulated on the basis of the image signal of the two remaining primary colors separatable in space or time has been written; light synthesizing means for synthesizing two lights intensity-modulated on the basis of the respective color image signals and read from said first and second light-written type spacial light modulation elements separately, into light intensity-modulated on the basis of the respective image information; and projecting means for projecting the light synthesized by said light synthesizing means onto a screen.

Further, the present invention provides a color image display apparatus, comprising: first light emitting means for emitting a first light beam intensity-modulated on the basis of an image signal of a specific primary color of three primary colors of additive color mixture for constituting a color image to be displayed, to a first reflective surface of an oscillating reflection mirror formed with a first and second reflective surfaces on both right and reverse sides thereof; second light emitting means for emitting a second light beam intensity-modulated on the basis of a time-axis compressed and time division multiplexed image signal of two remaining primary colors, to the second reflective surface of the oscillating reflection mirror, the two remaining primary colors being complementary to the specific primary color; first focusing means for focusing the light beam deflected by the first reflective surface of the oscillating reflection mirror to a first light-written type spacial light modulation element composed of at least a photo-conductive layer member and a light modulation substance layer member; second focusing means for focusing the light beam deflected by the second reflective surface of the oscillating reflection mirror to a second light-written type spacial light modulation element composed of at least a photo-conductive layer member and a light modulation substance layer member; light resolving means for resolving light emitted by a read light source to three read lights of predetermined wave length bands corresponding to the three primary colors of the additive color mixture, respectively; light introducing means for introducing a resolved read light with a wave length band of a specific primary color, to said first light-written type spacial light modulation element as a reed light; second light introducing means for selectively introducing two remaining read lights with two wave length bands of the two primary colors complementary to the specific primary color, to said second light-written type spacial light modulation element as two read lights, separately in correspondence to light writing portions at which the second light beam intensity-modulated on the basis of the image signal of the two remaining primary colors has been written; light synthesizing means for synthesizing two lights intensity-modulated on the basis of the respective color image signals and read from said first and second light-written type spacial light modulation elements separately, into light intensity-modulated on the basis of the respective image information; and projecting means for projecting the light synthesized by said light synthesizing means onto a screen.

Further, the present invention provides a color image display apparatus, comprising: first light emitting means for emitting a first light beam intensity-modulated on the basis of an image signal of a specific primary color of three primary colors of additive color mixture for constituting a color image to be displayed, to a first reflective surface of an oscillating reflection mirror formed with a first and second reflective surfaces on both right and reverse sides thereof; second light emitting means for emitting two light beams with two different wave length bands and intensity-modulated on the basis of two image signals of two remaining primary colors for each primary color, to the second reflective surface of the oscillating reflection mirror, the two remaining primary colors being complementary to the specific primary color; first focusing means for focusing the light beam deflected by the first reflective surface of the oscillating reflection mirror to a first light-written type spacial light modulation element composed of at least a photo-conductive layer member and a light modulation substance layer member; second focusing means for focusing the light beams with two different wave length bands and deflected by the second reflective surface of the oscillating reflection mirror to a second light-written type spacial light modulation element composed of at least a photo-conductive layer member and a light modulation substance layer member; light resolving means for resolving light emitted by a read light source to three read lights of predetermined wave length bands corresponding to the three primary colors of the additive color mixture, respectively; light introducing means for introducing a resolved read light with a wave length band of a specific primary color, to said first light-written type spacial light modulation element as a read light; second light introducing means for selectively introducing two remaining read lights with two wave length bands of the two primary colors complementary to the specific primary color, to said second light-written type spacial light modulation element as two read lights, separately in correspondence to light writing portions at which the second light beams with two different wave length bands for each primary color and intensity-modulated on the basis of the image signal of the two remaining primary colors has been written; light synthesizing means for synthesizing two lights intensity-modulated on the basis of the respective color image signals and read from said first and second light-written type spacial light modulation elements separately, into light intensity-modulated on the basis of the respective image information; and projecting means for projecting the light synthesized by said light synthesizing means onto a screen.

Further, the present invention provides a color image display apparatus, comprising: light deflecting means for simultaneously deflecting two light beams incident upon two reflection surfaces formed on right end reverse sides of an oscillating reflection mirror thereof, independently; light emitting means for introducing light beams intensity-modulated on the basis of different image information for each light having a specific polarization plane, to at least one of the reflection surfaces of the oscillating reflection mirror of said light deflecting means; focusing means for focusing the light beams deflected by both the right and reverse sides of the oscillating reflection mirror of said light deflecting means, separately; first light guiding means for guiding the light beam deflected and passed through said focusing means to a light-written type spacial light modulation element composed of at least a photo-conductive layer member and a light modulation substance layer member, when the deflected light beam passed through said focusing means is not a light beam intensity-modulated on the basis of the respective image information for each light having a specific polarization plane; and second light guiding means for separating the light beams into each light having a specific polarization plane and guiding the separated light beams deflected by said deflecting means and passed through said focusing means to two different light-written an type spacial light modulation elements, respectively each composed of at least a photo-conductive layer member and a light modulation substance layer member, when the deflected light beams passed through said focusing means ere light beams intensity-modulated on the basis of the respective image information for each light having a specific polarization plane.

Further, the color image display apparatus further comprises: light resolving means for resolving light emitted by a read light source to a plurality of read lights with predetermined wave length bands; introducing means for introducing each of the resolved read lights to each of a plurality of light-written type spacial light modulation elements as a read light, respectively; light synthesizing means for synthesizing lights modulated on the basis of the respective image information and read by a plurality of the light-written type spacial light modulation elements, respectively; and projecting means for projecting the light synthesized by said light synthesizing means onto a screen.

Further, in the color image display apparatus, said light emitting means is a plurality of light emitting element arrays each formed by arranging a plurality of light emitting elements in straight lines; the light emitting element arrays are arranged on a substrate in such a way that two adjacent light emitting element array columns are spaced away from each other by integer times of a pitch of the light emitting elements of the light emitting element array; and light beams intensity-modulated on the basis of different image information and having a specific polarization plane are introduced to at least one of the reflection surfaces of the oscillating reflection mirror of said light deflecting means, for each light emitting element array. Further, said light emitting means is a plurality of light emitting element arrays each formed by arranging a plurality of light emitting elements in straight lines; the light emitting element columns of the light emitting element arrays are arranged on a substrate in straight lines; and light beams intensity-modulated on the basis of different image information and having a specific polarization plane are introduced to at least one of the reflection surfaces of the oscillating reflection mirror of said light deflecting means, for each light emitting element array. Further, said light emitting means is a plurality of light emitting element arrays each formed by arranging a plurality of light emitting elements in straight lines; and light beams intensity-modulated on the basis of different image information and having a specific polarization plane are introduced to at least one of the reflection surfaces of the oscillating reflection mirror of said light deflecting means, for each region determined in series and in sequence along the light emitting element array. Further, said light emitting means is a plurality of light emitting element arrays each formed by arranging a plurality of light emitting elements in straight lines; and a light beam obtained by synthesizing a plurality of light beam groups each intensity-modulated on the basis of image information and having a specific polarization plane is introduced to at least one of the reflection surfaces of the oscillating reflection mirror of said light deflecting means. Further, in the above-description, the light beam having a specific polarization plane can be replaced with the light beam with a specific wave length band.

BRIEF DESCRIPTION OF THE DRAWINGS

FIG. 5 is a perspective view showing a second embodiment of the color image display apparatus according to the present invention;

FIG. 34 is a view showing an example of an optical color filter disk;

FIG. 35 is a view showing the other example of the optical color filter disk;

FIG. 36 is view showing an example of a color selection reflective element;

FIGS. 37A to 37J shows waveform diagrams of various image signals;

FIGS. 38A to 38L shows waveform diagrams of various image signals;

FIG. 40 is a block diagram showing another example of the fifth embodiment of the color image display apparatus according to the present invention;

DETAILED DESCRIPTION OF THE EMBODIMENTS

Embodiments of the color image display apparatus according to the present invention will be described hereinbelow with reference to the attached drawings.

[First embodiment]

Figure 4:
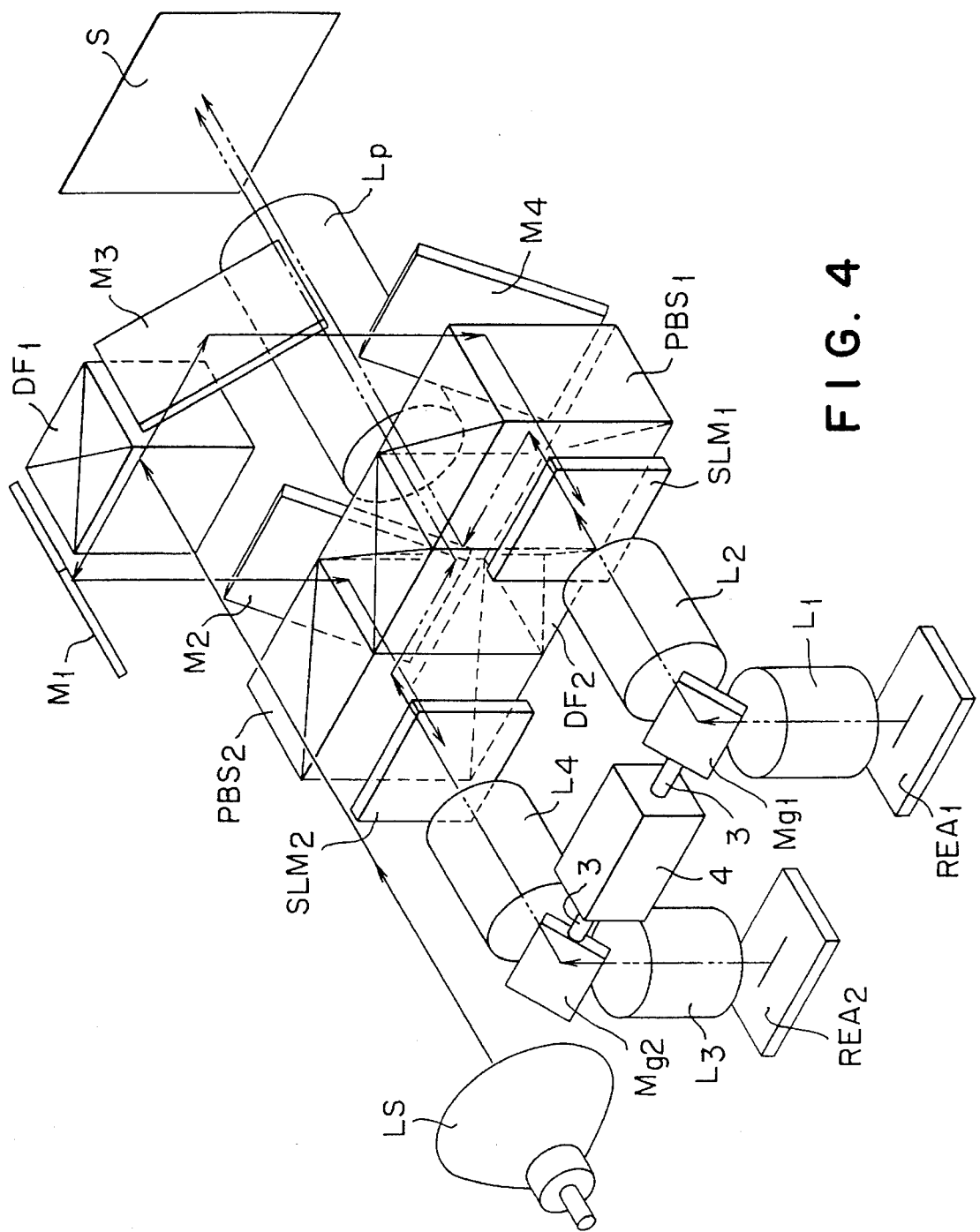
FIG. 4 is a perspective view showing a first embodiment of the color image display apparatus according to the present invention.

FIG. 4 shows a first embodiment thereof. In FIG. 4, light emitting element arrays REA1 and REA2 are each composed of a number of light emitting elements (e.g., N-units of light emitting diodes) arranged in a straight line. Each of these light emitting element arrays emits light beams on the basis of drive signals supplied by a signal processing circuit (not shown). The emitted light beams correspond to a predetermined image information of three primary colors in additive color mixture for constituting a color image to be displayed.

Four lenses L are focusing lenses for image formation, each of whose suffixes denotes the number thereof. These lenses L1 To L4 are used to focus light beams (emitted from the light emitting element arrays (REA1 and REA2) and deflected by a deflector, respectively) onto two light written type reflective spacial light modulation elements SLM (referred to as spacial light modulation elements, hereinafter), separately.

The light deflector is provided wish first and second oscillation mirrors Mg1 and Mg2 attached to a common oscillation axis 3 at a predetermined distance away from each other. The oscillation axis 3 is driven by a drive section 4 at a predetermined period (or frequency). Therefore, the light beam emitted by the light emitting element array REA1 is deflected by the first oscillation mirror Mg1, and the light beam emitted by the light emitting element array REA2 is deflected by the first oscillation mirror Mg2, respectively.

The respective light emitting elements of both the light emitting element arrays REA1 and REA2 are driven on the basis of image signals supplied by a drive circuit of a signal processing circuit (both not shown) in such a way that the quantity of light beam thereof changes according to the image information to be displayed. To change the quantity of light beam emitted by each light emitting element of each light emitting array according to the image information, the intensity of light beam emitted by the light emitting element is changed according to the amplitude of the image signal. Or else, the time width of the light beam with a constant intensity emitted by the light emitting element is changed according to the amplitude of the image signal.

In the color image display apparatus according to the present invention, two light emitting element arrays REA1 and REA2 are used to generate two sort of light beams each of whose intensity is modulated on the basis of image information of one of three primary colors of additive color mixture for constituting the color image to be displayed. The image signal supplied by the signal processing circuit (not shown) to the light emitting element array REA1 is a specific one-channel image signal of one of the three primary colors of additive color mixture. In the following description, this specific primary color is determined as green. This is because where image information of green primary color is always displayed, it is possible to advantageously improve the definition rate of the displayed image, from the standpoint of human visibility characteristics. On the other hand, the image signal supplied to the light emitting element array REA2 is one-channel alternate end sequential image signal including of two image signals of the two remaining primary colors (red and blue) complementary to the specific primary color (green).

Therefore, the light beam emitted by the light emitting element array REA1 is passed through the lens L1, and on the other hand, the light beam emitted by the light emitting element array REA2 is passed through the lens L3.

Further, the light beam passed through the lens L1 is focused onto the photo-conductive layer member PCL (see FIG. 3 and FIGS. 18 to 22) of the spacial light modulation element SLM1 by optical path of the lens L1→the oscillation mirror Mg1→the lens L2→the photo-conductive layer member PCL of the spacial light modulation element SLM1. Further, the light beam passed through the lens L3 is focused onto the photo-conductive layer member PCL of the spacial light modulation element SLM2 (see FIG. 3 and FIGS. 18 to 22) by optical path of the lens L3→the oscillation mirror Mg2→the lens L4→the photo-conductive layer member PCL of the spacial light modulation element SLM2. In the spacial light modulation element SLM1 or SLM2, the incident light beam is scanned in the vertical direction on the photo-conductive layer member PCL thereof, for repetitive write operation.

As already explained, the red primary color image signal and the blue primary color image signal are both supplied to the light emitting element array REA2 in sequence. The sequential color image signal transmission modes are as follows: the red primary color image signal and the blue primary color image signal are arranged alternately in sequence on the time axis in unit of one vertical scanning period of the image signal or in unit of one horizontal scanning period of the image signal or in unit of pixel. In this embodiment, the sequential image signal composed of the red and blue primary color image signals supplied to the light emitting element array REA2 is a dot(pixel)-sequence image signal, in which red and blue color signals are arranged alternately in sequence on the time axis in unit of pixel.

Figure 28:
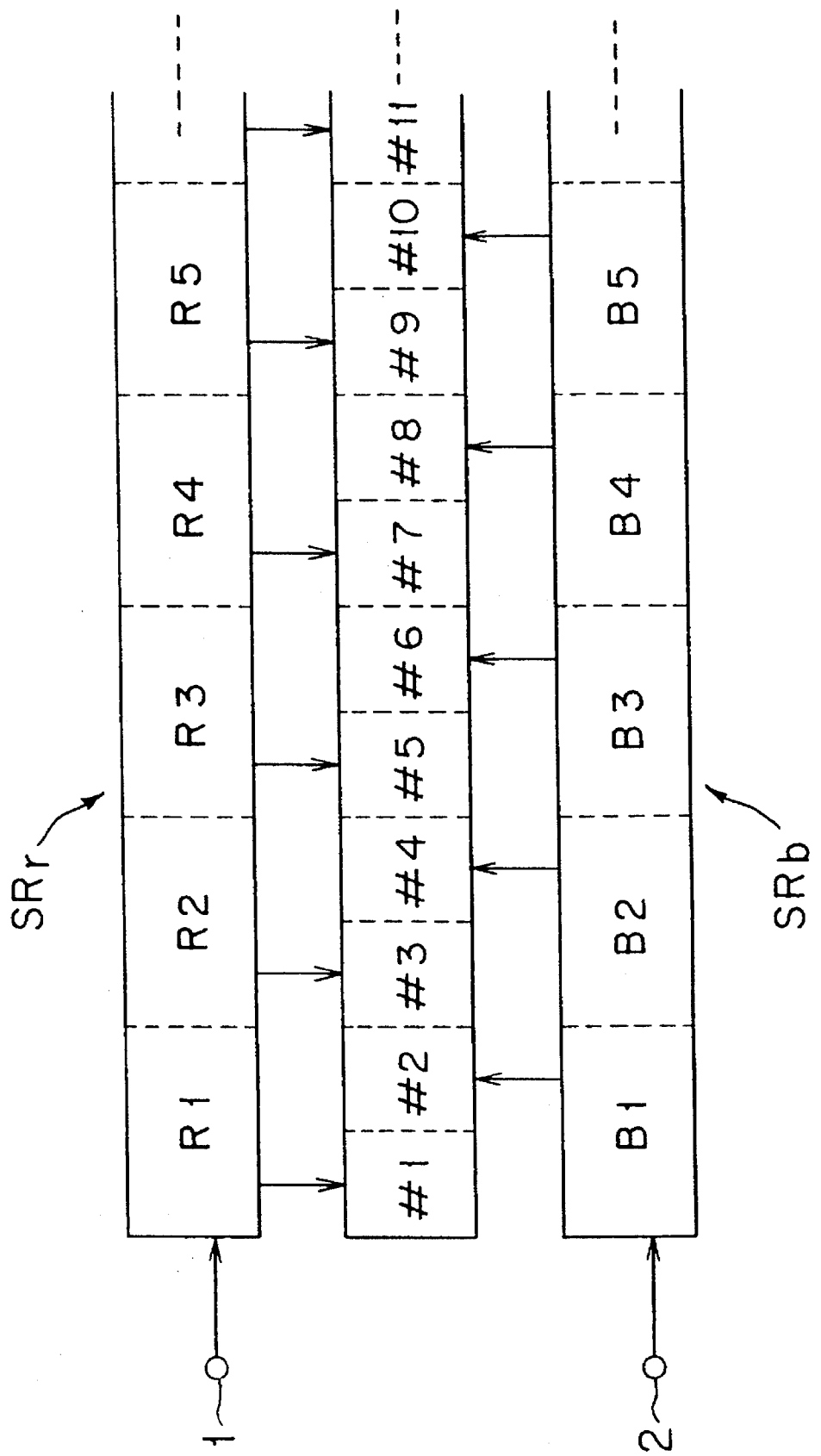
FIG. 28 is a block diagram showing an example of a driving circuit of the light emitting element array.

To obtain the dot(pixel)-sequence signal composed of the red and blue primary color signals used to drive the light emitting element array REA2, a drive circuit as shown in FIG. 28 can be used. The drive circuit shown in FIG. 28 is composed of two shift register SRr and SRb of serial input and parallel output type. In more detail, the red primary color image signal is supplied to an input terminal 1 of the shift register SRr, and the blue primary color signal is supplied to an input terminal 2 of the shift register SRb. Further, in FIG. 28, a number of light emitting elements #1, #2, #3, ... are arranged in a straight line in the light emitting element array REA. The red primary color pixel signal is supplied in sequence from the shift register SRr to the odd number light emitting elements #1, #3, #5, ... of the light emitting element array REA. On the other hand, the blue primary color pixel signal is supplied in sequence from the shift register SRr to the even number light emitting elements #2, #4, #6, ... of the light emitting element array REA. Therefore, it is possible to obtain the light beam whose intensity is modulated on the basis of the alternate dot (pixel) sequence image signal composed of the red and blue primary colors, from the light emitting element array REA.

Further, where the red primary color image signal and the blue primary color image signal are required to be arranged alternately in sequence on the time axis in unit of one vertical scanning period of the image signal to obtain the red and blue color sequential image signal, the signal processing circuit is constructed, for instance as follows: "1/N time-axis compressed primary color signals" are generated for each one vertical scanning period (for each 1 V) of the specific (green) primary color signal, and the generated "time-axis compressed primary color signals" are outputted repeatedly a predetermined times for each vertical scanning period, to output the color sequence signal. Further, it is possible to provide a color filter in the reproduction system of the color image reproducing apparatus, so that the two primary colors can be switched from red to blue or vice versa, in synchronism with the color switching period of the color sequence signal.

Now, in the spacial light modulation element SLM2, the red and blue primary color image signals are written at two spacial positions different from each other (because the light beam is scanned). Therefore, it is possible to obtain two red and blue read light beams reflected from the two different positions (at which the red and blue primary color images are written).

Figure 23:
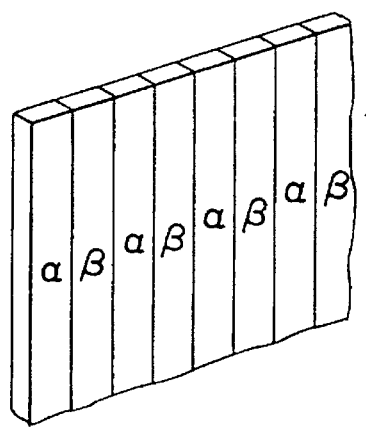
FIG. 23 is a perspective view showing an example of an optical color resolving filter.
Figure 24:
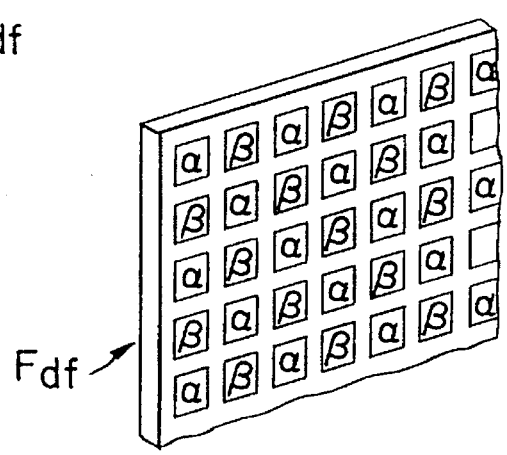
FIG. 24 is a perspective view showing another example of the optical color resolving filter.

An optical color resolving filter Fdf as shown in FIGS. 23 to 26 is provided inside the spacial light modulation element SLM2. In FIGS. 23 and 24, α denotes a filter for transmitting only light of a wave length band α (any number), and β denotes a filter for transmitting only light of a wave length band β (any number). Further, in FIGS. 25 and 26, R denotes a filter for transmitting only light of red primary color light wave length band, and B denotes a filter for transmitting only light of blue primary color light wave length band. Further, in FIG. 27, DMLdf denotes a dielectric mirror having regions R from each of which light of red primary color wave length band is reflected and regions B from each of which light of blue primary color wave length band is reflected.

Here, the filters or the reflection regions for the respective colors are arranged in the same way as the arrangement of the light beams modulated on the basis of the red and blue dot-sequence image signal.

Figure 7:
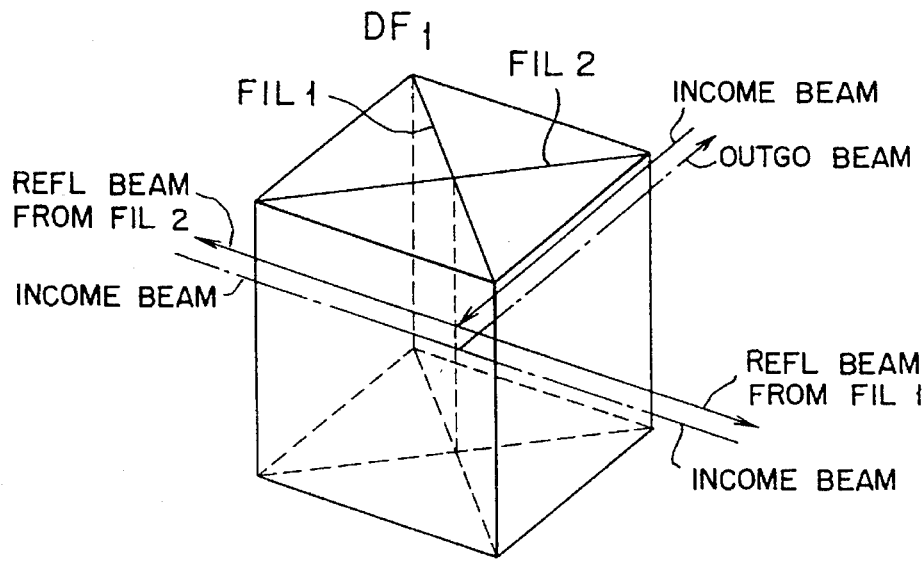
FIG. 7 is a perspective view showing a dichroic filter DF1.
Figure 8:
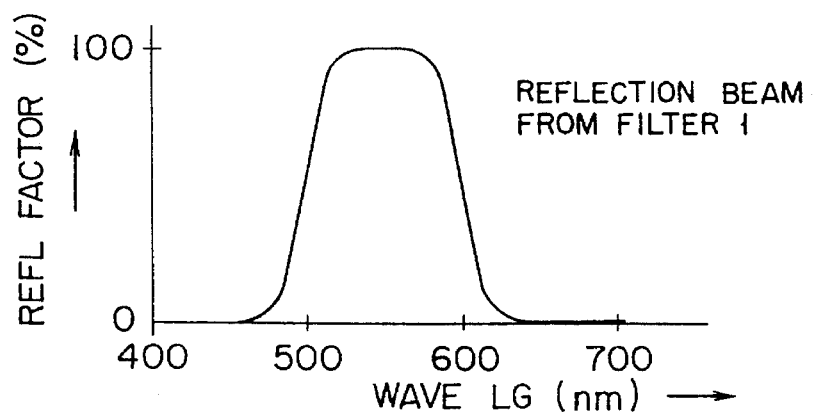
FIG. 8 is a graphical representation showing the reflection factor characteristics with respect to the wave length of a filter 1 for constituting the dichroic filter DF1.
Figure 9:
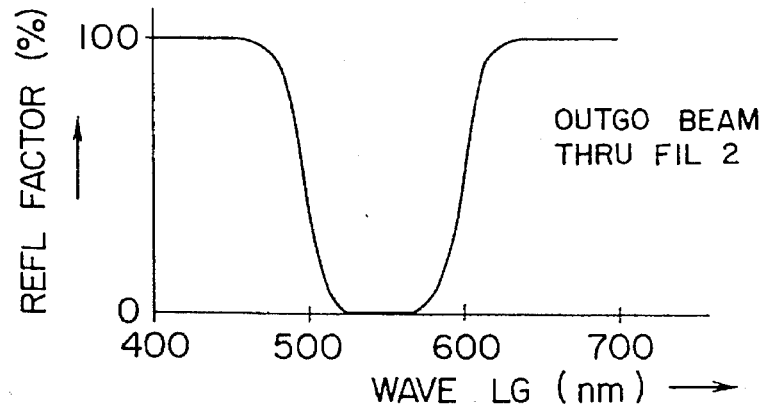
FIG. 9 is a graphical representation showing the reflection factor characteristics with respect to the wave length of a filter 2 for constituting the dichroic filter DF1.
Figure 10:
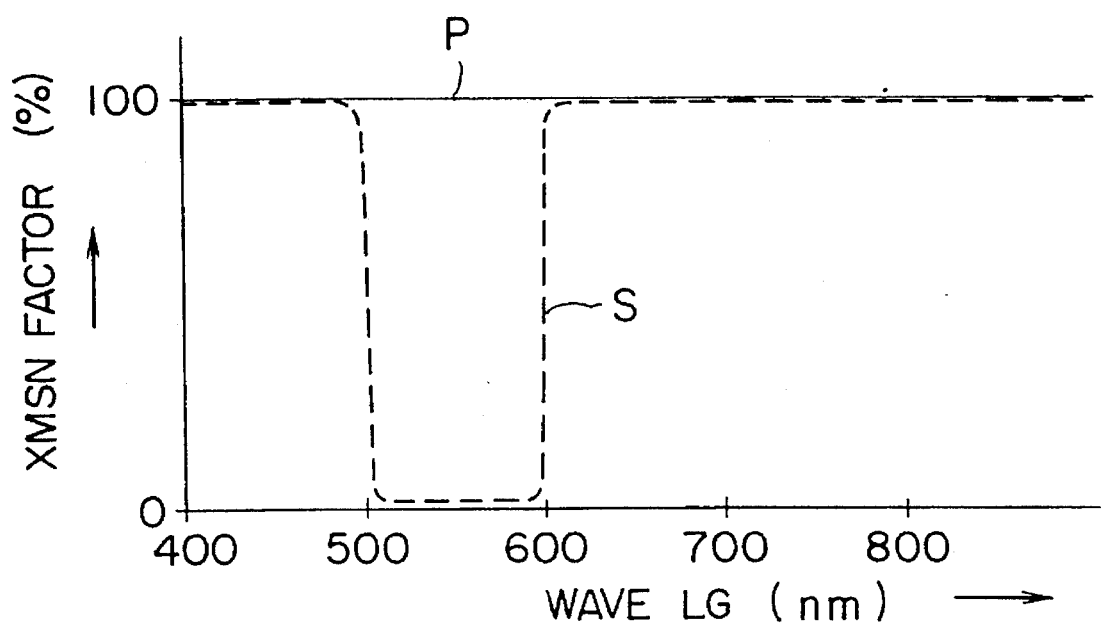
FIG. 10 is a graphical representation showing the transmission factor characteristics with respect to the wave length of e polarizing light beam splitter PBS1.
Figure 11:
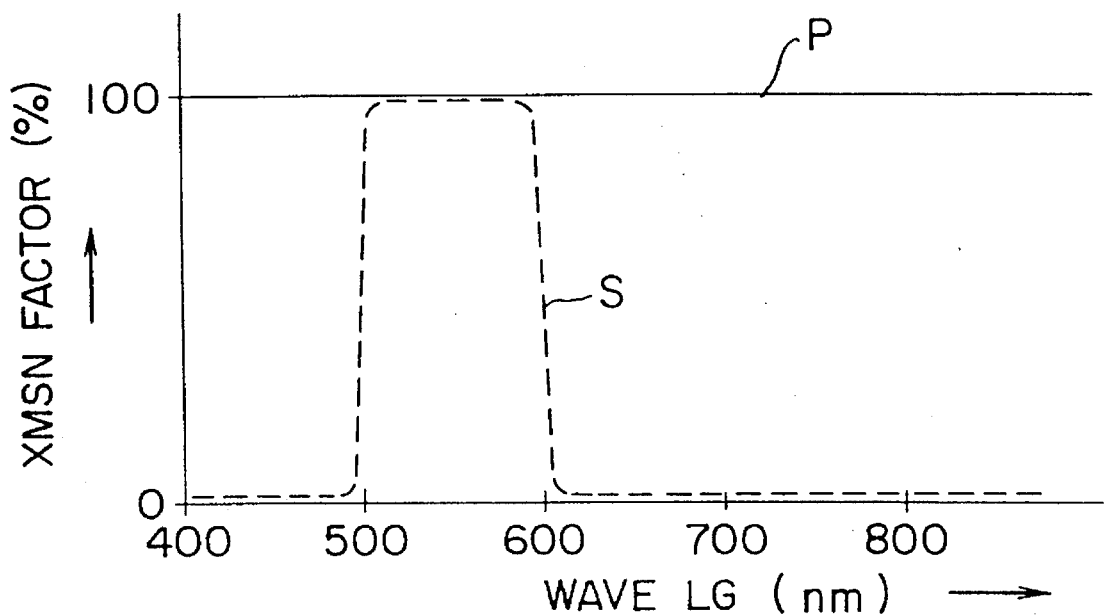
FIG. 11 is a graphical representation showing the transmission factor characteristics with respect to the wave length of a polarizing light beam splitter PBS2.

The three primary color image information can be read from the two spacial light modulation elements SLM1 and SLM2 in which image information has been written as follows: With reference to FIG. 4 again, the read light emitted by a read light source LS is introduced to a dichroic filter DF1. As shown in FIG. 7, the dichroic filter DF1 is formed with a filter 1 for reflecting green primary color light and a filter 2 for reflecting red and blue primary color lights. The reflection factor characteristics of the filter 1 with respect to the wave length are shown in FIG. 8, and the reflection factor characteristics of the filter 2 with respect to the wave length are shown in FIG. 9. As shown in FIG. 4, a green primary color light of the read light incoming from the read light source LS to the dichroic filter DF1 is reflected by the filter 1 of the dichroic filter DF1 and additionally by a total reflection mirror M3 and a total reflection mirror M4, and then passed through a polarizing light beam splitter PBS1. The transmission factor characteristics of with respect to the waver length of this beam splitter PBS1 are shown in FIG. 10. On the other hand, red and blue primary color lights reflected by the filter 2 of the dichroic filter DF1 are reflected by the total reflection mirror M1 and a total reflection mirror M2, and then passed through a polarizing light beam splitter PBS2. The transmission factor characteristics of with respect to the waver length of this beam splitter PBS2 are shown in FIG. 11.

As shown in FIG. 4, the P-polarized light of the green primary color light incoming from the total reflection mirror M4 to the polarizing light beam splitter PBS1 is passed through the polarizing light beam splitter PBS1 and then introduced to the read side of the light written type reflective spacial light modulation element SLM1. The P-polarized light of the red and blue primary color lights incoming from the total reflection mirror M2 to the polarizing light beam splitter PBS2 is passed through the polarizing light beam splitter PBS2 and then introduced the read side of the light written type reflective spacial light modulation element SLM2.

Figure 1:
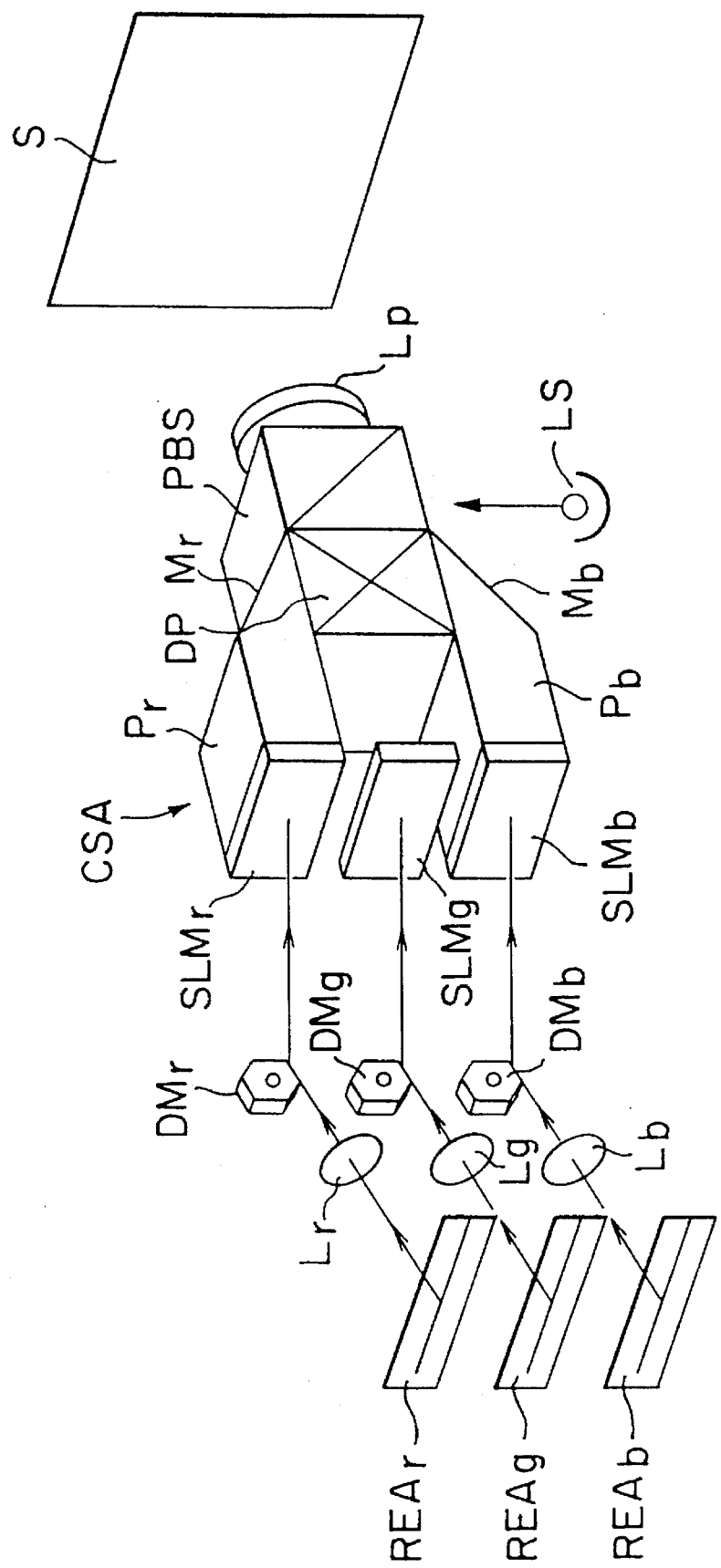
FIG. 1 is a perspective view showing a first prior art color image display apparatus.
Figure 2:
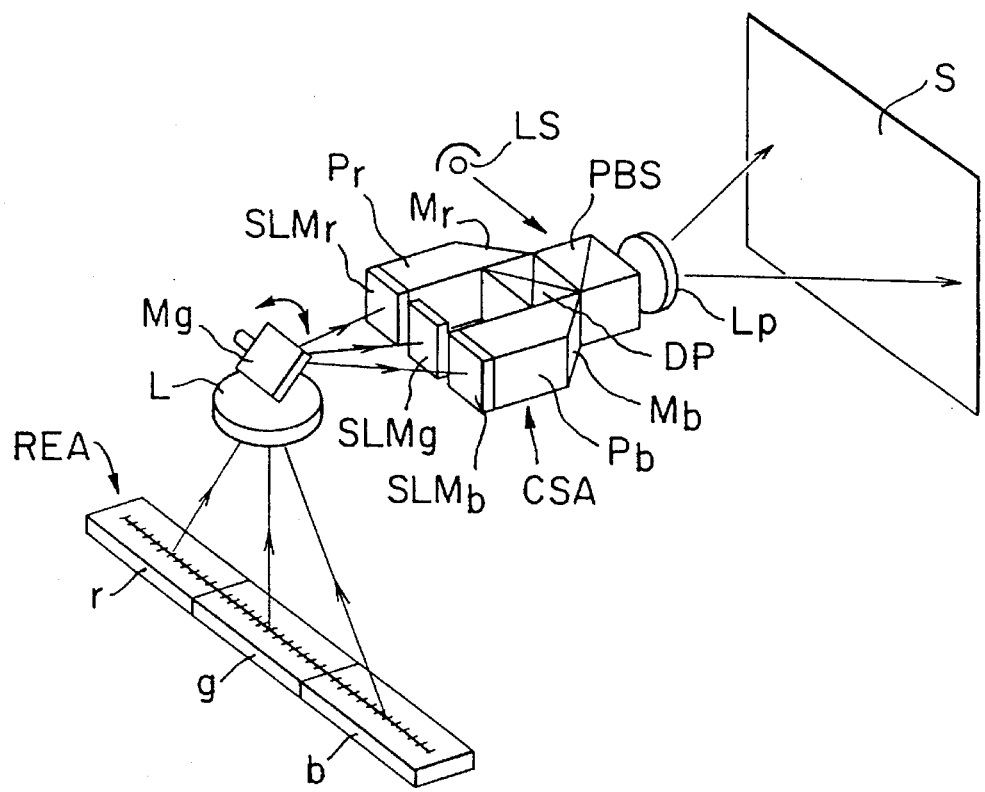
FIG. 2 is a perspective view showing a second prior art color image display apparatus.
Figure 3:
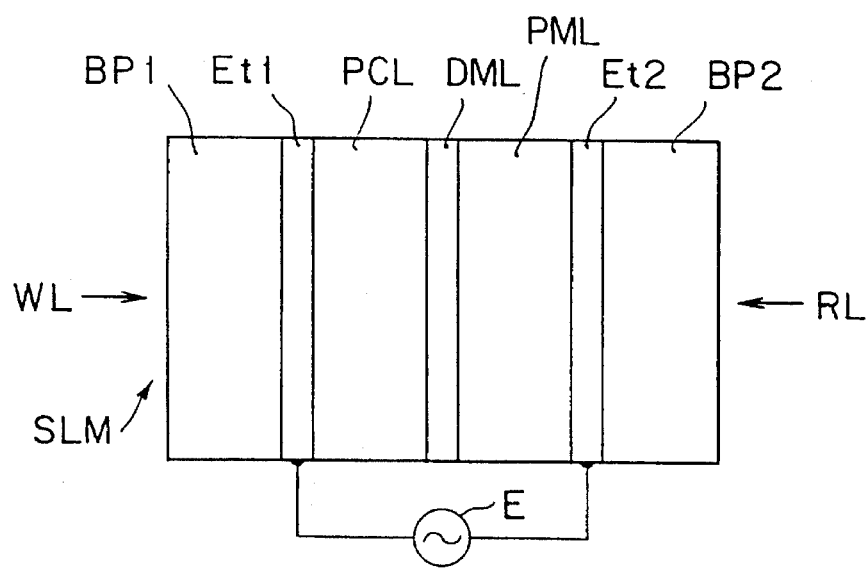
FIG. 3 is a side cross-sectional view showing a prior art reflective spacial light modulation element of light written type.

At the light written type reflective spacial light modulation element SLM1 (referred to as spacial light modulation element, simply hereinafter), the prior art light modulation element as shown in FIG. 3 can be used. However, as the spacial light modulation element, the light modulation elements as shown in FIGS. 18 to 22 can be used.

Figure 27:
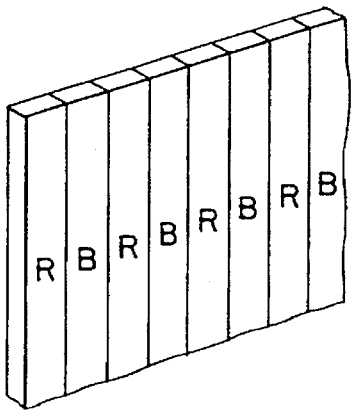
FIG. 27 is a perspective view showing an example of a dielectric mirror.

In the spacial light modulation element SLM shown in FIG. 18, the dielectric mirror DMLdf as shown in FIG. 27 is used as one composing element, in which the regions R for reflecting light of red primary color wave length band and the regions B for reflecting light of blue primary color wave length band are arranged alternately in sequence in a predetermined direction (a direction perpendicular to the light deflection direction by the oscillation mirror (described later) in this embodiment).

Figure 26:
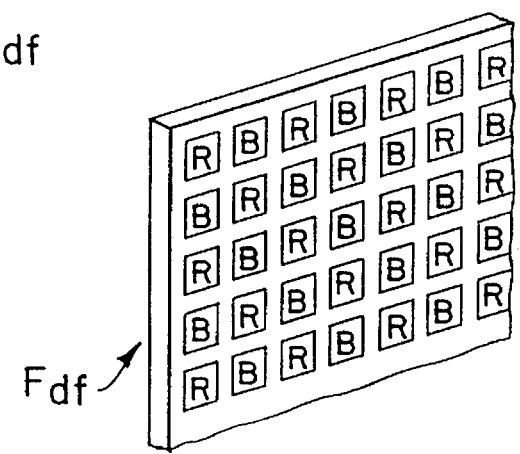
FIG. 26 is a perspective view showing the other example of the optical color resolving filter.

Further, it is also possible to form the dielectric mirror DMLdf by arranging two different wave length regions R and B in island shape, as shown in FIGS. 24 and 26, in the same way as with the case of the color resolving filter Fdf, without arranging the two different wave length ranges R and B in stripe shape, as shown in FIG. 27.

Figure 19:
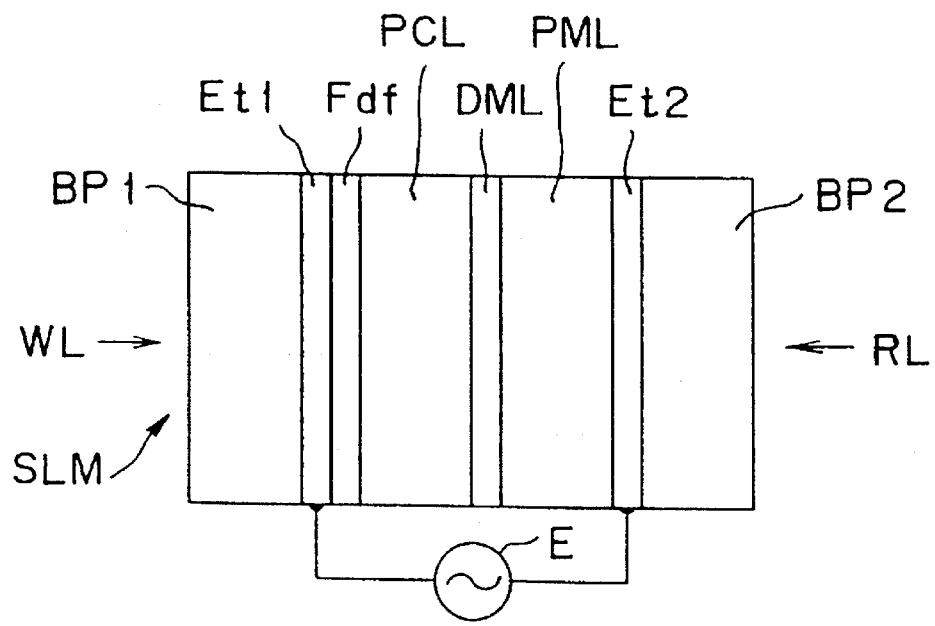
FIG. 19 is a side cross-sectional view showing another example of the reflective spacial light modulation element of light written type.

Further, in the spacial light modulation element SLM shown in FIG. 19, a color resolving filter Fdf is formed in the optical path of the write light to the photo-conductive layer member PCL. As the color resolving filter Fdf, the one as shown in FIG. 23 can be used, in which color filter stripes α for passing light of wave length band 1 and color filter stripes β for passing light of wave length band 2 are arranged alternately in sequence in a predetermined direction (a direction perpendicular to the deflection direction of the light beam reflected by the oscillation mirror (described later) in this embodiment). Or else, it is also possible to use the color resolving filter Fdf as shown in FIG. 24, in which two different island-shaped color filters α and β for passing only light beams of two wave length bands 1 and 2, respectively are arranged alternately in sequence.

Figure 20:
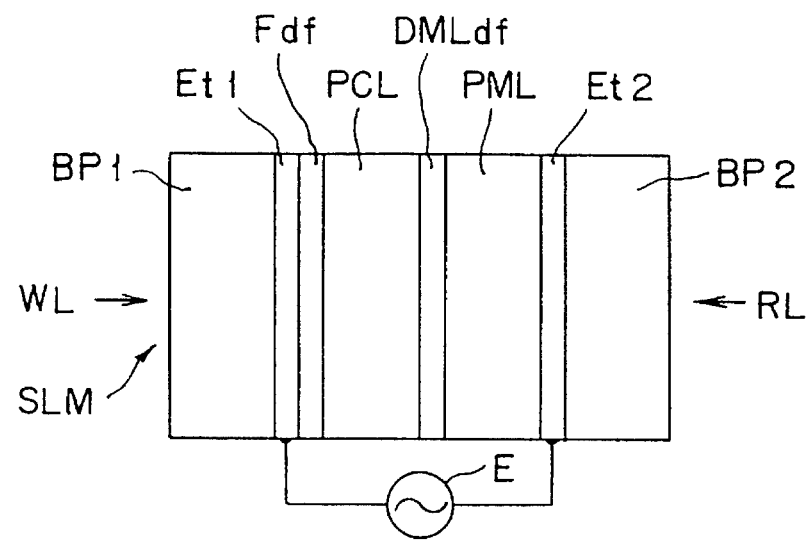
FIG. 20 is a side cross-sectional view showing another example of the reflective spacial light modulation element of light written type.

In the spacial light modulation element SLM shown in FIG. 20, a color resolving filter Fdf is provided in the optical path of the write light to the photo-conductive layer member PCL. In this color resolving filter Fdf, two sorts of color filter stripes are arranged. In addition, in this element SLM, a dielectric mirror DMLdf is provided, on which regions for reflecting different lights of different wave length bands are arranged in the same way as the arrangement of the two sorts of color filter strips of the color resolving filter Fdf.

Figure 21:
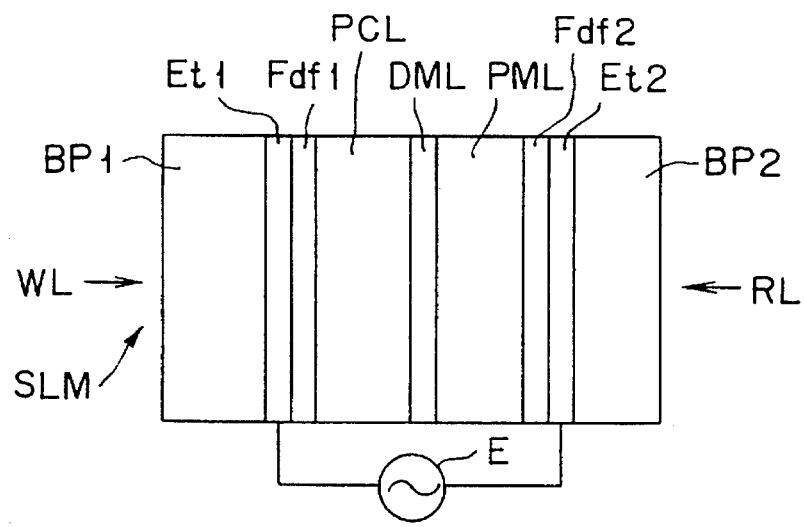
FIG. 21 is a side cross-sectional view showing another example of the reflective spacial light modulation element of light written type.
Figure 25:
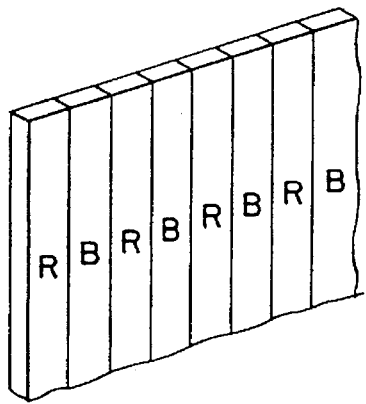
FIG. 25 is a perspective view showing another example of the optical color resolving filter.

Further, in the spacial light modulation element SLM shown in FIG. 21, a color resolving filter Fdf1 (e.g., the color resolving filter Fdf as shown in FIG. 23 or 24) is provided in the optical path of the write light to the photo-conductive layer member PCL. In the color resolving filter Fdf1, two sorts of color filter stripes are arranged. In addition, in this element SLM, a color resolving filter Fdf2 (e.g., the color resolving filter Fdf as shown in FIG. 25 or 26) is provided in the optical path of the read light. In the color resolving filter Fdf2, regions R and B for reflecting two different primary color lights of different wave length bands are arranged in same way as the arrangement of the two sorts of color filter strips of the color resolving filter Fdf1.

Figure 22:
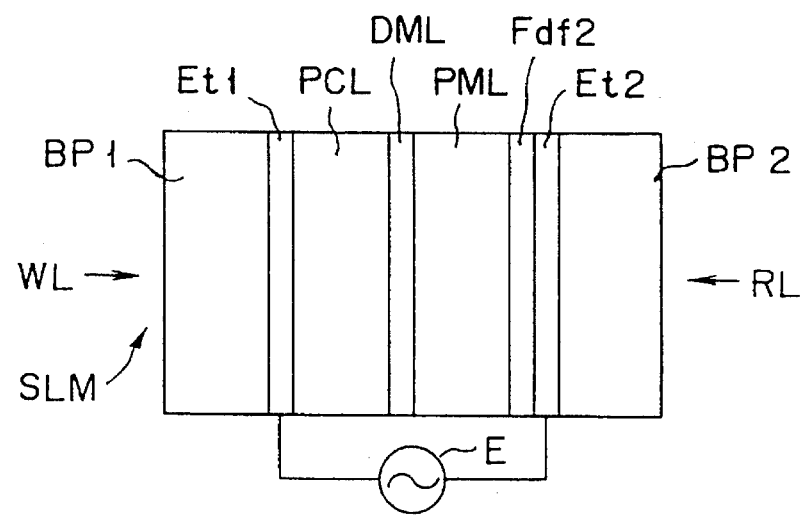
FIG. 22 is a side cross-sectional view showing the other example of the reflective spacial light modulation element of light written type.

Further, in the spacial light modulation element SLM shown in FIG. 22, a color resolving filter Fdf2 (e.g., the color resolving filter Fdf as shown in FIG. 25 or 26) is provided in the optical path of the read light. The color resolving filter Fdf2 has two regions R and B for reflecting two different primary color light of different wave length bands.

To the spacial light modulation element SLM1, two-dimensional image information of green primary color is written on the basis of the light beam intensity-modulated by the image signal of the green primary color of the three primary colors of additive color mixture for constituting a color image to be displayed.

On the other hand, to the spacial light modulation element SLM2, two-dimensional image information of two red and blue (complementary to the green primary color) primary colors is written on the basis of the light beam intensity-modulated by the red and blue primary color image signals in such a way as to be separable with respect to time or space.

Further, as shown by solid line arrows in FIG. 4, the green read light beam is supplied to the spacial light modulation element SEM1 by optical path of a read light source LS→the dichroic filter DF1→the total reflection mirror M3→the total reflection mirror M4→the polarizing light beam splitter PBS1→the read side of the light written type reflective spacial light modulation element SLM1. On the other hand, the red and blue read lights are supplied to the spacial light modulation element SLM2 by optical path of a read light source LS→the dichroic filter DF1→the total reflection mirror M1→the total reflection mirror M2→the polarizing light beam splitter PBS2→the reed side of the light written type reflective spacial light modulation element SLM2. Therefore, it is possible to correctly read the primary color information corresponding to the three primary color images of additive color mixture for constituting the color image to be displayed form the respective spacial light modulation elements SLM1 and SLM2, respectively.

In more detail, when the green read light is supplied to the read side of the spacial light modulation element SLM1, as shown by dot-dashed line arrows in FIG. 4, the image signal can be focused on the screen by optical path from the read side of the spacial light modulation element SEM1→the polarizing beam splitter PBS1→(reflection from) the filter 1 of the dichroic filter DF2 (as shown in FIG. 7 and having the reflection factor as shown in FIG. 8)→the projection lens Lp→the screen S.

Further, when the red and blue read lights are supplied to the read side of the spacial light modulation element SLM2, as shown by dot-dashed line arrows in FIG. 4, the image signal is focused on the screen by optical path from the read side of the spacial light modulation element SLM2→the polarizing beam splitter PBS2→(reflection from) the filter 2 of the dichroic filter DF2 (as shown in FIG. 7 and having the reflection factor as shown in FIG. 9)→the projection lens Lp→the screen S. As a result, the color image can be formed on the screen S.

[Second Embodiment]

FIG. 5 shows a second embodiment of the color image display apparatus according to the present invention. In FIG. 5, each of the light emitting element arrays REA1, REA2 and REA3 is composed of a number of light emitting elements (e.g., N-units of light emitting diodes) arranged in a straight line. Each of these light emitting element arrays emits a light beam on the basis of drive signals supplied by a signal processing circuit (not shown) in such a way that the quantity of the light beam changes according to the image information. To change the quantity of the light beam emitted by each light emitting element of each light emitting array according to the image information, the intensity of the light beam emitted by the light emitting element is changed according to the amplitude of the image signal, or the time width of the light beam with a constant intensity emitted by the light emitting element is changed according to the amplitude of the image signal. Further, the light beam emitted by the light emitting element of the arrays represents a predetermined image information of three primary colors of additive color mixture for constituting a color image to be displayed. In more detail, the light emitting element array REA1 corresponds to one channel image signal of green primary color; the light emitting element array REA2 corresponds to one channel image signal of red primary color; and the light emitting element array REA3 corresponds to one channel image signal of blue primary color, respectively.

Further, six lenses L are focusing lenses for image formation, each of whose suffix denotes the number thereof. These lenses L1 to L6 are used to focus the light beams emitted from the light emitting element arrays (REA1, REA2 and REA3) and further deflected onto two light written type reflective spacial light modulation elements (referred to as spacial light modulation elements, hereinafter), separately.

A light deflector is provided with two first and second oscillation mirrors Mg1 and Mgw attached to a common oscillation axis 3 at a predetermined distance away from each other. The oscillation axis 3 is driven by a drive section 4 at a predetermined period. That is, the light beam emitted by the light emitting element array REA1 is deflected by the first oscillation mirror Mg1. At the same time, the light beam emitted by the lights emitting element array REA2 is deflected by a first reflection surface formed on one of both the right and reverse surfaces of the second oscillation mirror Mgw, and the light beam emitted by the light emitting element of the array REA3 is deflected by a second reflection surface formed on the other of both the right and reverse surfaces of the second oscillation mirror Mgw.

The light beam emitted by the light emitting element of the array REA1 is passed through the lens L1; the light beam emitted by the light emitting element of the array REA2 is passed through the lens L3; and the light beam emitted by the light emitting element of the array REA3 is passed through the lens L5.

Further, the light beam emitted by the light emitting element of the array REA1 is focused on a photo-conductive layer member PCL (see FIG. 3) of the spacial light modulation element SLM1 by optical path, as shown by dot-dot-dashed line arrows shown in FIG. 5, of the light emitting element array REA1→the lens L1→the first oscillation mirror Mg1→the lens L2→the photo-conductive layer member PCL of the spacial light modulation element SLM1. Further, the light beam emitted by the light emitting element of the array REA2 is focused on a photo-conductive layer member PCL (see FIG. 3) of the spacial light modulation element SLM2 by optical path, as shown by dot-dot-dashed line arrows shown in FIG. 5, of the light emitting element array REA2→the lens L3→(reflection from) the first reflection surface of the second oscillating mirror Mgw (attached to the same the oscillation axis of the first oscillation mirror Mg1)→the lens L4→the photoconductive layer member PCL of the spacial light modulation element SLM2. Further, the light beam emitted by the light emitting element of the array REA3 is focused on a photoconductive layer member PCL (see FIG. 3) of the spacial light modulation element SLM3 by optical path, as shown by dot-dot-dashed line arrows shown in FIG. 5, of the light emitting element array REA3→the lens L5→(reflection from) the second reflection surface of the second oscillating mirror Mgw)→the lens L7→the photo-conductive layer member PCL of the spacial light modulation element SLM3.

In the above-mentioned optical paths, since the first and second oscillation mirrors Mg1 and Mgw attached to the same oscillation axis are oscillated at a predetermined period, the light beams can be scanned in the perpendicular direction on the photo-conductive layer members PCL of the three spacial light modulation elements SLM1, SLM2 and SLM3 (the vertical scanning operation), respectively. Accordingly, image information of specific primary colors can be written by the light beams incoming to the three spacial light modulation elements SLM1, SLM2 and SLM3, respectively.

On the other hand, read light emitted by a read light source LS is introduced to the read sides of the three spacial light modulation elements SLM1, SLM2 and SLM3, respectively by optical paths, as shown by dot-dashed line arrows in FIG. 5, as the read light for three primary colors of predetermined wave bends, respectively.

Figure 12:
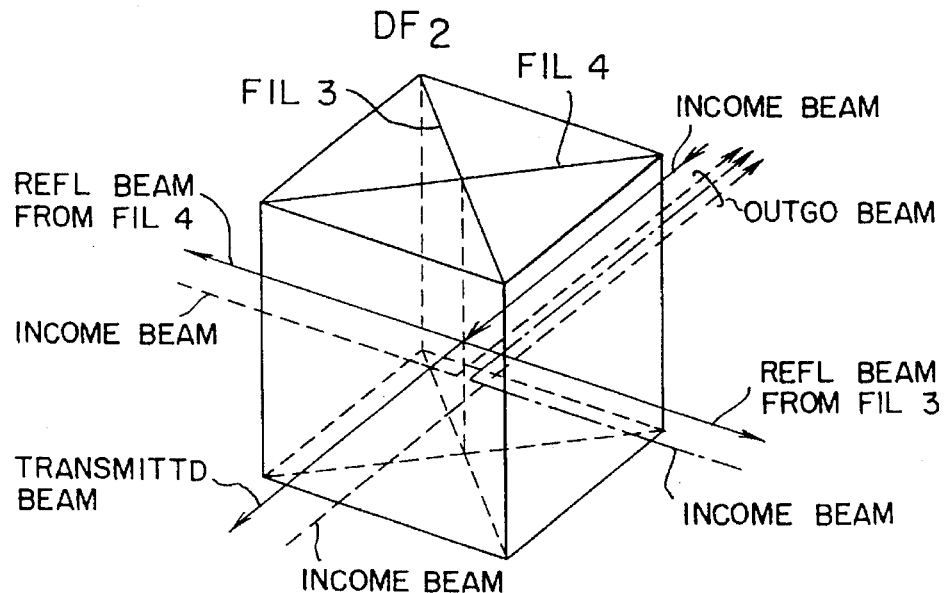
FIG. 12 is a perspective view showing a dichroic filter DF2.
Figure 13:
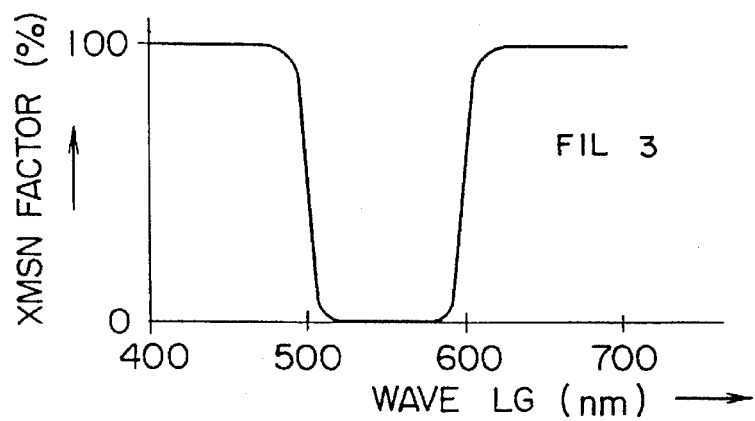
FIG. 13 is a graphical representation showing the transmission factor characteristics with respect to the wave length of a filter 3 for constituting the dichroic filter DF2.
Figure 14:
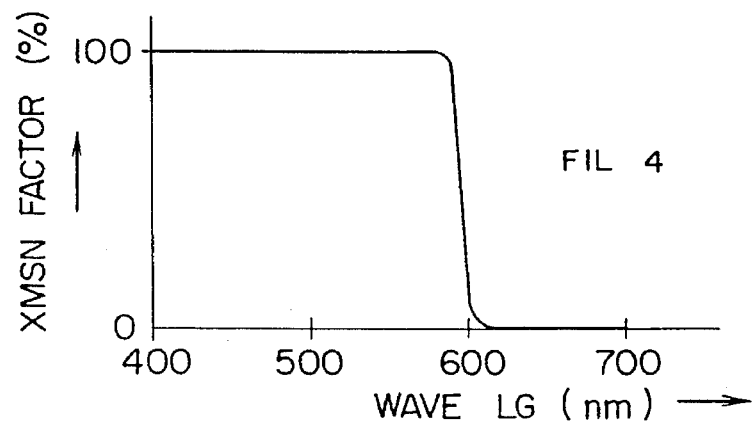
FIG. 14 is a graphical representation showing the transmission factor characteristics with respect to the wave length of a filter 4 for constituting the dichroic filter DF2.
Figure 15:
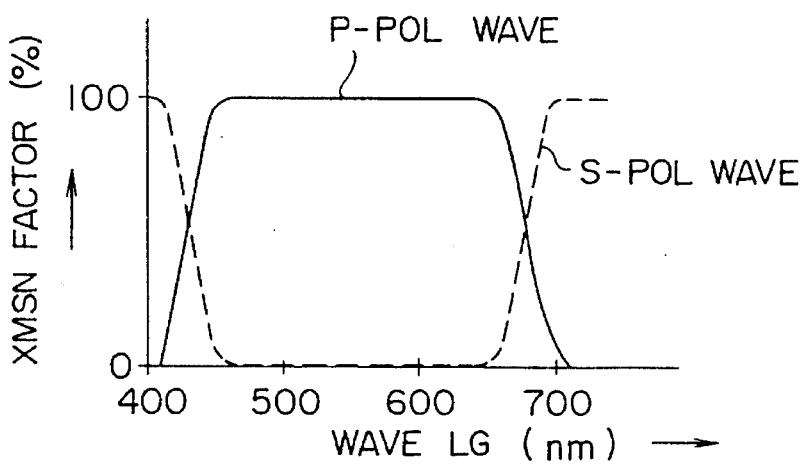
FIG. 15 is a graphical representation showing the transmission factor characteristics with respect to the wave length of the polarizing light beam splitter.

The read light emitted by the read light source LS first is introduced to a dichroic filter DF2, as shown in FIG. 12. This dichroic filter DF2 is formed with a filter 3 for reflecting green primary color light but passing red and blue primary color lights (having the transmission factor as shown in FIG. 13) and a filter 4 for reflecting red primary color light but passing green and blue primary color lights (having the transmission factor as shown in FIG. 14). Therefore, the green primary color light incoming from the read light source LS to the dichroic filter DF2 is reflected by the filter 3 (as shown in FIG. 12) of the dichroic filter DF2 and then further reflected by the total reflection mirrors M3 and M4. After that, the light is introduced to the polarizing light beam splitter PBS1 having the transmission factor characteristics with respect to wave length as shown in FIG. 15. Further, the P-polarized light component of green primary color is passed through the polarizing light beam splitter PBS1, and then introduced to the read side of the spacial light modulation element SLM1.

Figure 16:
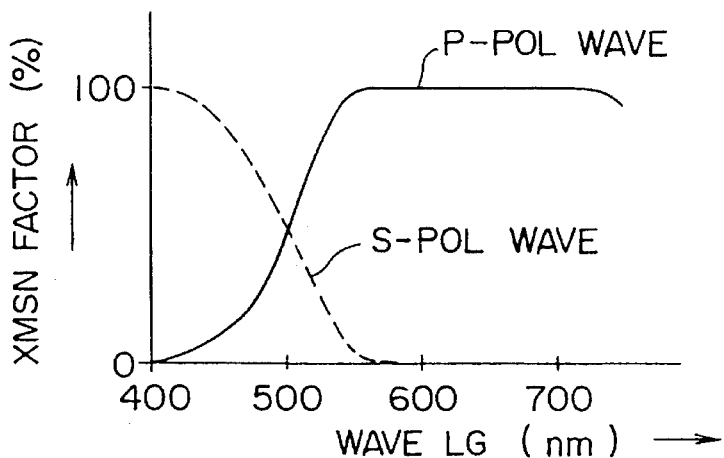
FIG. 16 is a graphical representation showing the transmission factor characteristics with respect to the wave length of the polarizing light beam splitter.
Figure 17:
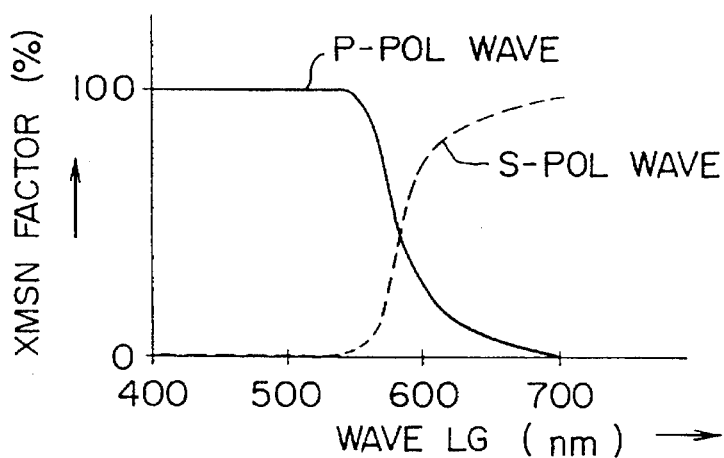
FIG. 17 is a graphical representation showing the transmission factor characteristics with respect to the wave length of the polarizing light beam splitter.

The red primary color light of the read light introduced to the dichroic filter DF2 and reflected by the filter 4 (as shown in FIG. 12) is then reflected by the total reflection minors M1 and M2. After that, the light is introduced to the polarizing light beam splitter PBS2 having the transmission factor characteristics with respect to wave length as shown in FIG. 16. Further, the P-polarized light component of red primary color is passed through the polarizing light beam splitter PBS2, and then introduced to the read side of the spacial light modulation element SLM2. The blue primary color light of the read light introduced to the dichroic filter DF2 and passed through the filter 4 as shown in FIG. 12 is reflected by the total reflection mirrors M1 and M2. After that, the light beam is introduced to the polarizing light beam splitter PBS3 having the transmission factor characteristics with respect to wave length as shown in FIG. 17. Further, the S-polarized light component of blue primary color light is reflected by the polarizing light beam splitter PBS3, and further introduced to the read side of the spacial light modulation element SLM3.

Therefore, two-dimensional image information corresponding to the three primary colors of the additive color mixture can be written in the spacial light modulation elements SLM1, SLM2 and SLM3, respectively. On the other hand, on the basis of the above-mentioned read operation, the read lights modulated by the image information written in the spacial light modulation elements, respectively can be reflected from the spacial light modulation elements SLM1, SLM2 and SLM3 to each of which the specific primary color read light is supplied. Further, the read lights reflected from the respective spacial light modulation elements SLM1, SLM2 and SLM3 are projected onto a screen S to display a color image by optical path as shown by the solid line arrows in FIG. 5.

In more detail, the read green primary color light corresponding to the green primary color image information outgoing from the read side of the spacial light modulation element SLM1 is introduced to the polarizing light beam splitter PBS1. On the basis of the transmission factor characteristics with respect to wave length as shown in FIG. 15, the polarizing light beam splitter PBS1 reflects the S-polarized light component of the read green primary color light, so that the reflected light is introduced to the dichroic filter DF2 formed as shown in FIG. 12 and having the characteristics as shown in FIGS. 13 and 14. On the other hand, the filter 3 of the dichroic filter DF2 having the transmission factor characteristics as shown in FIG. 13 reflects the read green primary color light, so that the reflected light beams is introduced to the projection lens Lp.

On the other hand, the read red primary color light beam corresponding to the red primary color image information outgoing from the read side of the spacial light modulation element SLM2 is introduced to the polarizing light beam splitter PBS2. On the basis of the transmission factor characteristics with respect to wave length as shown in FIG. 16, the polarizing light beam splitter PBS2 reflects the S-polarized light component of the read red primary color light beam, so that the reflected light is introduced to the dichroic filter DF2 formed as shown in FIG. 12 and having the characteristics as shown in FIGS. 13 and 14. On the other hand, the filter 4 of the dichroic filter DF2 having the transmission factor characteristics as shown in FIG. 13 reflects the read red primary color light beam, so that the reflected light is introduced to the projection lens Lp.

Further, the read blue primary color light beam corresponding to the blue primary color image information outgoing from the read side of the spacial light modulation element SLM3 is introduced to the polarizing light beam splitter PBS3. On the basis of the transmission factor characteristics with respect to wave length as shown in FIG. 17, the polarizing light beam splitter PBS3 reflects the S-polarized light component of the read blue primary color light beam, so that the reflected light is introduced to the dichroic filter DF2 formed as shown in FIG. 12 and having the characteristics as shown in FIGS. 13 and 14. On the other hand, the filters 3 and 4 of the dichroic filter DF2 having the transmission factor characteristics as shown in FIGS. 13 and 14 transmit the read blue primary color light, so that the light is introduced to the projection lens Lp.

As described above, the read lights whose intensities are modulated by the three primary color image information and introduced to the projection lens Lp are focused on the screen S, so that a color image can be projected on the screen S.

[Third Embodiment]

The third embodiment of the color image display apparatus according to the present invention will be described hereinbelow with reference to FIG. 6. In this embodiment, since the light deflector, lenses and the dichroic filter DF2 are substantially the same as with the case of those of the second embodiment shown in FIG. 5, the description thereof is omitted hereinbelow.

In the same way as with the case of the afore-mentioned embodiments, the image signals to be displayed are those of three primary colors of additive color mixture.

The light emitting element array REA1 emits a light beam on the basis of one-channel green primary color image signal. The light beam emitted by the light emitting element array REA1 is focused on a photo-conductive layer member PCL (see FIG. 3) of the spacial light modulation element SLM1 by optical path, as shown by solid line arrows shown in FIG. 6, of the light emitting element array REA1 →the lens L1→the first oscillation mirror Mg1→the lens L2→the photo-conductive layer member PCL of the spacial light modulation element SLM1.

The light emitting element array REA2 emits a light beam on the basis of one-channel red primary color image signal. The light beam emitted by the light emitting element array REA2 is focused on a photo-conductive layer member PCL (see FIG. 3) of the spacial light modulation element SLM2 by optical path, as shown by solid line arrows shown in FIG. 6, of the light emitting element array REA2 →the lens L3→(reflection by) the first reflection surface of the second oscillation mirror Mgw→the lens L4 →the total reflection mirror M14→the photo-conductive layer member PCL of the spacial light modulation element SLM2.

Further, the light emitting element array REA3 emits a light beam on the basis of one-channel blue primary color image signal. The light beam emitted by the light emitting element array REA3 is focused on a photo-conductive layer member PCL (see FIG. 3) of the spacial light modulation element SLM3 by optical path, as shown by solid line arrows shown in FIG. 6, of the light emitting element array REA3 →the lens L5→(reflection by) the second reflection surface of the second oscillation mirror Mgw→the lens L6 →the total reflection mirror M11→the lens L7→the total reflection mirror M12→the total reflection mirror M13→the photo-conductive layer member PCL of the spacial light modulation element SLM3.

In the above-mentioned optical paths, since the first and second oscillation mirrors Mg1 and Mgw attached to the same oscillation axis are oscillated at a predetermined period, the light beams can be scanned in the perpendicular direction on the photo-conductive layer members PCL of the three spacial light modulation elements SLM1, SLM2 and SLM3, respectively. Accordingly, image information of specific primary colors is written by the light beams incoming to the three spacial light modulation elements SLM1, SLM2 and SLM3, respectively.

Figure 6:
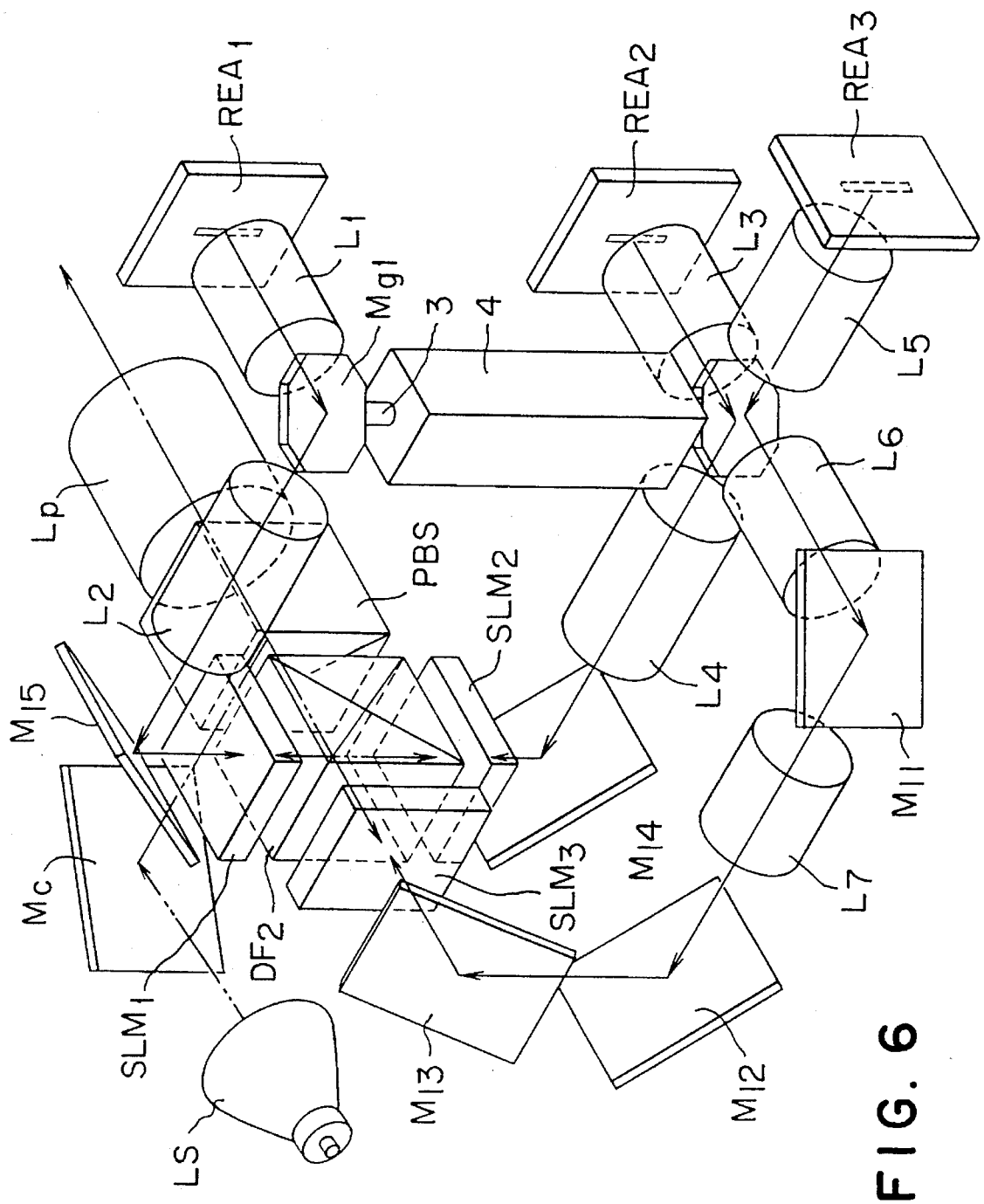
FIG. 6 is a perspective view showing a third embodiment of the color image display apparatus according to the present invention.

On the other hand, read light emitted by a read light source LS is introduced to the read sides of the three spacial light modulation elements SLM1, SLM2 and SLM3, respectively by optical paths, as shown by dot-dashed line arrows in FIG. 6.

In more detail, the read light emitted by the read light source LS is first reflected bye cold mirror Mc and then introduced to a polarizing beam splitter PBS. The S-polarized read light reflected by the polarizing beam splitter PBS is introduced to the dichroic filter DF2 (as shown in FIGS. 12 to 14). Further, the green primary color light of the read light is introduced to the dichroic filter FD2 (as shown in FIGS. 12 to 14). The green primary color light beam of the light incoming to the dichroic filter FD2 is reflected by the filter 3 (having the transmission factor characteristics with respect to wave length as shown in FIG. 13) of the dichroic filter DF2, and then introduced to the read side of the spacial light modulation element SLM1.

Further, the red primary color light beam of the light incoming to the dichroic filter DF2 is reflected by the filter 4 (having the transmission factor characteristics with respect to wave length as shown in FIG. 14) of the dichroic filter DF2, end then introduced to the read side of the spacial light modulation element SLM2. Further, the blue primary color light beam of the light incoming to the dichroic filter DF2 is passed through the filter 3 (having the transmission factor characteristics with respect to wave length as shown in FIG. 13) and the filter 4 (having the transmission factor characteristics with respect to wave length as shown in FIG. 14) of the dichroic filter DF2, and then introduced to the read side of the spacial light modulation element SLM3.

On the other hand, two-dimensional image information can be written in the spacial light modulation elements SLM1, SLM2 and SLM3, respectively on the basis of the light beams corresponding to the three images representative of three primary colors for constituting the color image. On the other hand, the read lights are supplied to the spacial light modulation elements SLM1, SLM2 and SLM3, respectively by the above-mentioned paths, so that the reflected read lights can be obtained owing to the read operation as already explained with reference to FIG. 3. The read lights outgoing from the spatial light modulation elements SLM1, SLM2 and SLM3, respectively are projected on the screens S as a color image by way of the dot-dot-dashed line arrows shown in FIG. 6.

That is, the green primary color read light beam outgoing from the read side of the spacial light modulation element SLM1 is introduced to the dichroic filter DF2. The P-polarized light component of the green primary color read light beam is reflected by the filter 3 (having the transmission factor characteristics with respect to wave length as shown in FIG. 13), and then introduced to the projection lens Lp.

Further, the red primary color read light beam outgoing from the read side of the spacial light modulation element SLM2 is introduced to the dichroic filter DF2. The P-polarized light component of the red primary color read light beam is reflected by the filter 4 (having the transmission factor characteristics with respect to wave length as shown in FIG. 14), and then introduced to the projection lens Lp.

Further, the blue primary color read light beam outgoing from the read side of the spacial light modulation element SLM3 is introduced to the dichroic filter DF2. The P-polarized light component of the blue primary color read light beam is passed through the filters 3 and 4 (having the transmission factor characteristics with respect to wave length as shown in FIGS. 13 and 14), and then introduced to the projection lens Lp. The read light incoming to the projection lens Lp is focused onto the screen L through the projection lens Lp to display a color image.

As described above, in the first to third embodiments of the color image display apparatus according to the present invention, the first and second oscillating reflection mirrors are attached to the same oscillation axis a predetermined distance away from each other. The color image to be displayed is composed of three image signals of three primary colors of additive color mixture. The different light beams whose intensities are modulated by the predetermined primary color image signals are deflected simultaneously by the oscillating reflection mirrors. As a result, it is possible to write the image information in a plurality of light-written type spacial light modulation elements under excellent deflection linearity. Further, the read light emitted by the read light source is resolved into three read lights having predetermined three wave length bands corresponding to the three primary colors of additive color mixture. The read light of specific wave length bands are given to the corresponding light-written spacial light modulation elements, respectively and the light modulated by the respective image information can be read (reflected) from the three light-written spacial light modulation elements, respectively. The lights read from the three light-written spacial light modulation elements (whose intensities are modulated by the respective image information) are synthesized and then passed through the common projection lens to display a color image on the screen. Accordingly, it is possible to utilize the low-costly polarizing beam splitters and color resolving and synthesizing filters. In addition, it is possible to use the projection lens of short lens back. Consequently, the present invention can realize a small-sized, low-costly and high resolution color image display apparatus.

[Fourth Embodiment]

Figure 29:
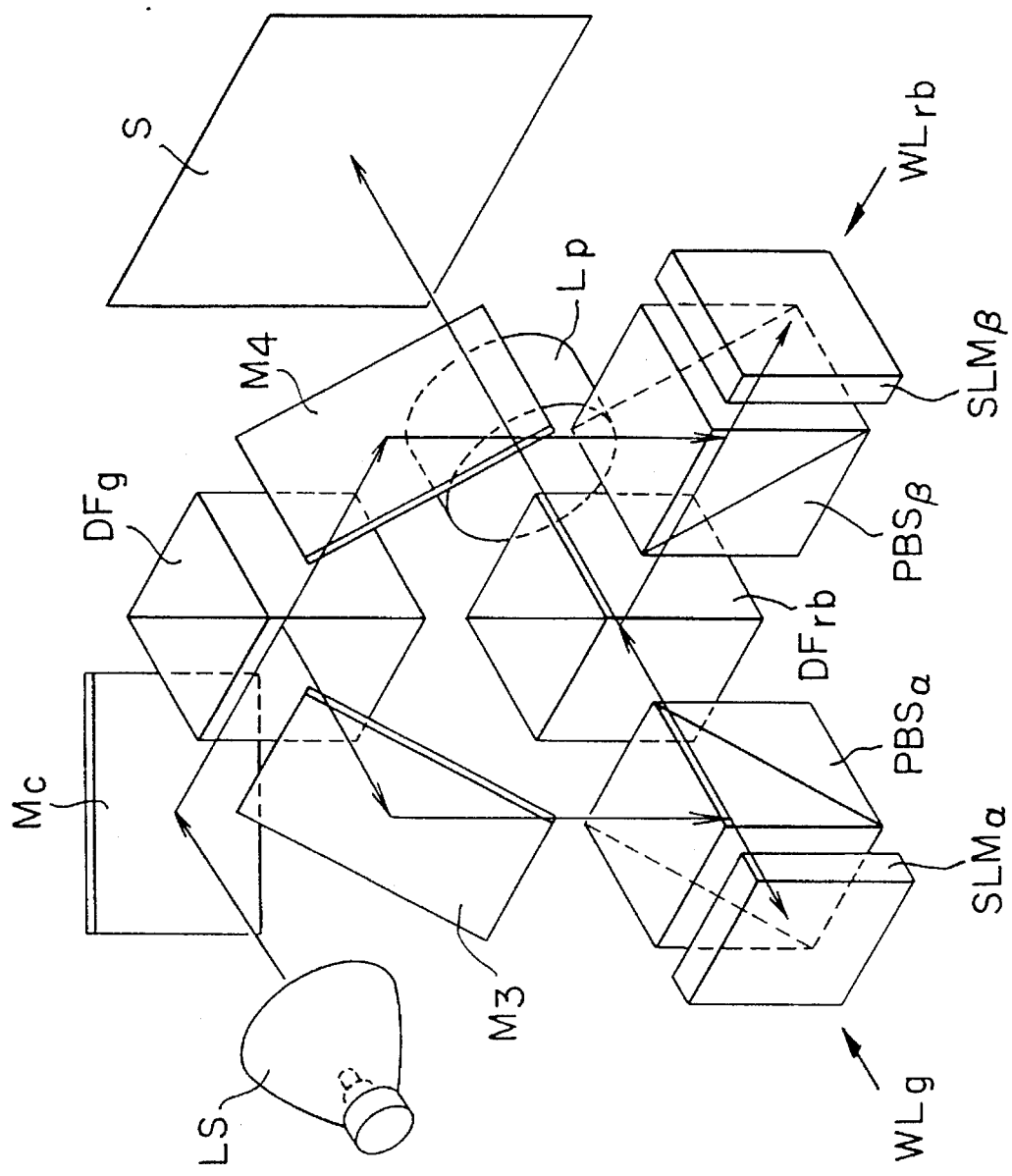
FIG. 29 is a perspective view showing an example of the read side of a fourth embodiment of the color image display apparatus according to the present invention.
Figure 30:
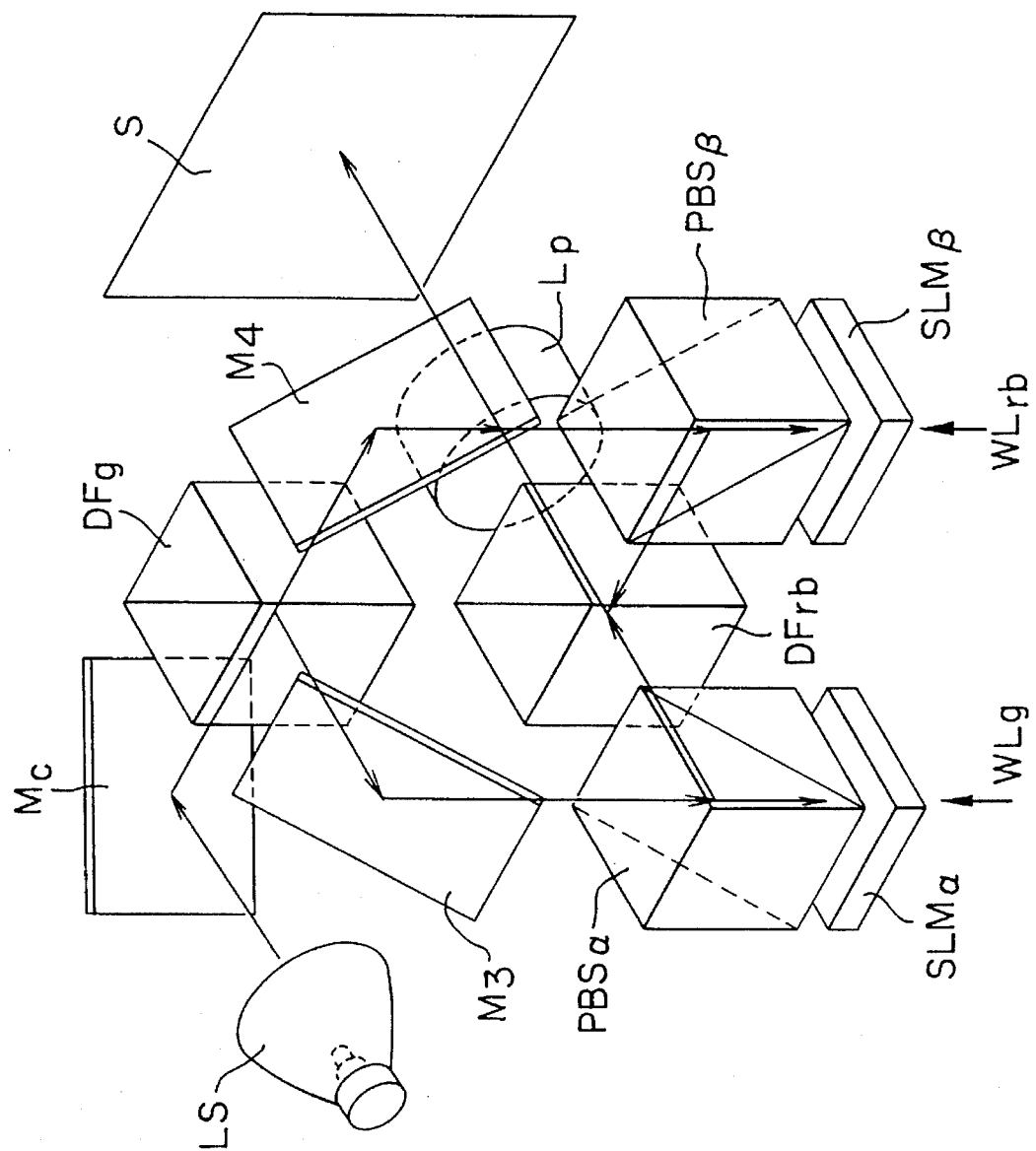
FIG. 30 is a perspective view showing another example of the read side of the fourth embodiment of the color image display apparatus according to the present invention.
Figure 31:
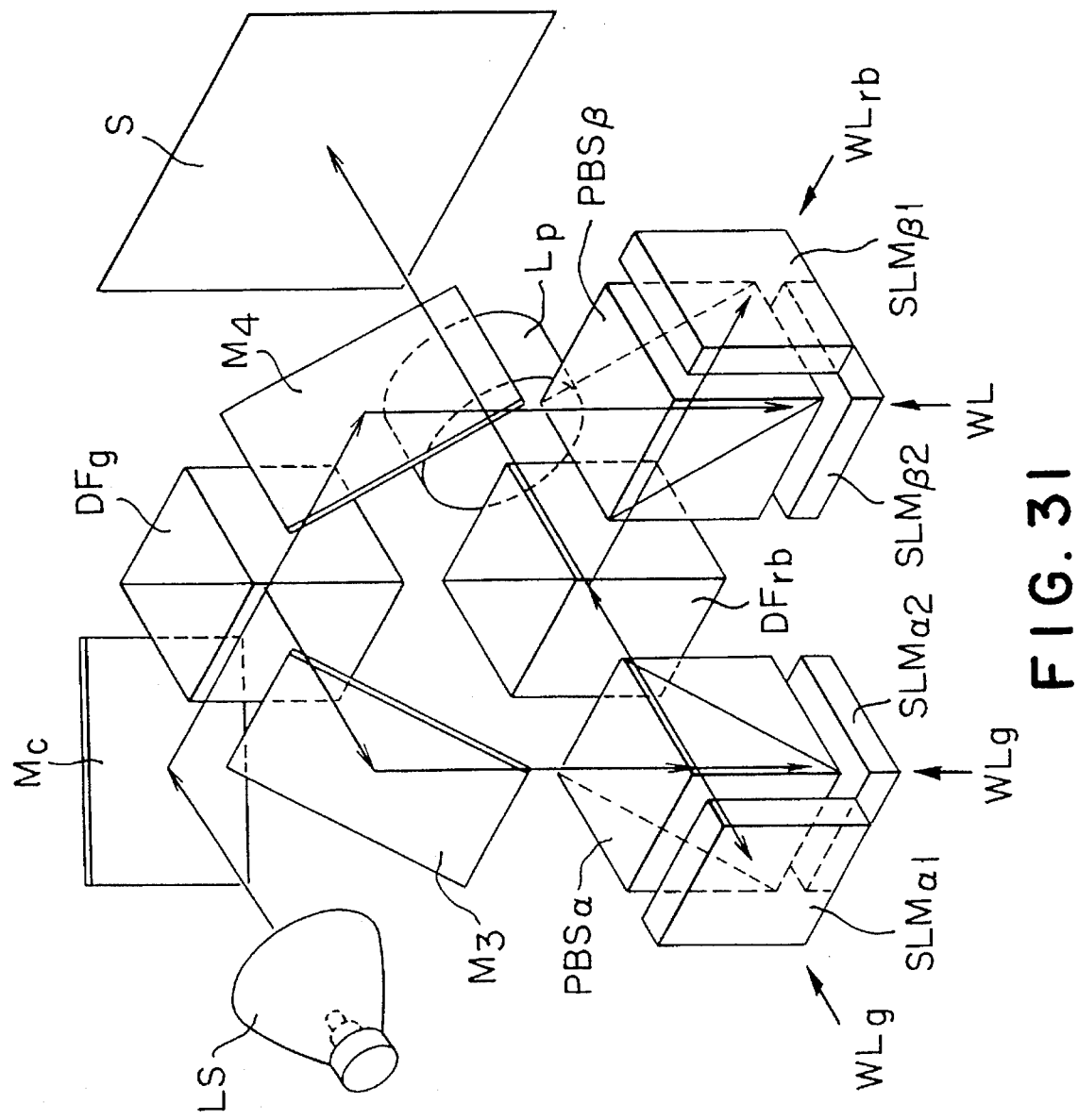
FIG. 31 is a perspective view showing the other example of the read side of the fourth embodiment of the color image display apparatus according to the present invention.

A fourth embodiment of the color image display apparatus according to the present invention will be described hereinbelow with reference to the attached drawings. FIGS. 29 to 31 show various read side system modifications of the fourth embodiments, in which SLMα and SLMβ denote light-written type spacial light modulation elements, and PBSα and PBSβ denotes polarizing light beam splitters arranged on the incoming sides of the light-written type spacial light modulation elements SLMα and SLMβ, respectively.

The read light emitted by a read light source LS is reflected by a cold mirror MC, and then introduced to a dichroic filter DFg. This dichroic filter DFg reflects the green primary color light but transmits the red and blue primary color lights. The green primary color light reflected by the dichroic filter DFg is further reflected by a total reflection mirror M3, and then introduced to the polarizing light beam splitter PBSα. On the other hand, the red and blue primary color lights reflected by the dichroic filter DFg are further reflected by a total reflection mirror M4, and then introduced to the polarizing light beam splitter PBSα. The transmission factor characteristics of the polarizing light beam splitter PBSα with respect to wave length are shown in FIG. 10, and the transmission factor characteristics of the polarizing light beam splitter PBSβ with respect to wave length are shown in FIG. 11.

The P-polarized light of the green primary color read light incoming from the total reflection mirror M3 to the polarizing light beam splitter PBSα is passed through the polarizing light beam splitter PBSα, but the S-polarized light thereof is reflected by the polarizing light beam splitter PBSα. On the other hand, the P-polarized light of the red and blue primary color reed lights incoming from the total reflection mirror M4 to the polarizing light beam splitter PBSβ is passed through the polarizing light beam splitter PBSβ, but the S-polarized light thereof is reflected by the polarizing light beam splitter PBSβ.

In the read side system of the color image display apparatus shown in FIG. 29, the S-polarized light of the green primary color read light reflected by the polarizing light beam splitter PBSα is introduced to the read side system of the spacial light modulation element SLMα. Further, the S-polarized light of the red and blue primary color read lights reflected by the polarizing light beam splitter at PBSβ is introduced to the read side system of the spacial light modulation element SLMβ.

In the read side system of the color image display apparatus shown in FIG. 30, the P-polarized light of the green primary color read light passed through the polarizing light beam splitter PBSα is introduced to the read side system of the spacial light modulation element SLMα. Further, the P-polarized light of the red and blue primary color read lights passed through the polarizing light beam splitter PBSβ is introduced to the read side system of the spacial light modulation element SLMβ.

Further, in the read side system of the color image display apparatus shown in FIG. 31, the S-polarized light of the green primary color read light reflected by the polarizing light beam splitter PBSα is introduced to the read side system of the spacial light modulation element SLMα1. Further, the P-polarized light of the green primary color read light passed through the polarizing light beam splitter PBSα is introduced to the read side system of the spacial light modulation element SLMα2. Further, the S-polarized light of the red and blue primary color read lights reflected by the polarizing light beam splitter PBSβ is introduced to the read side system of the spacial light modulation element SLMβ1. Further, the P-polarized light of the red and blue primary color read lights passed through the polarizing light beam splitter PBSβ is introduced to the read side system of the spacial light modulation element SLMβ2.

The spacial light modulation element as shown in FIG. 3 can be used as these spacial light modulation elements SLMα, SLMα1 end SLMα2, respectively. Further, the spacial light modulation element as shown in FIGS. 3 and 18 to 22 can be also used as these spacial light modulation elements SLMβ, SLMβ1 and SLMβ2, respectively.

One two-dimensional image information is written in the spacial light modulation element SLMα on the basis of the light beam whose intensity is modulated by the image signal of green primary color of the three primary colors of the additive color mixture.

On the other hand, the two-dimensional image information is written in the spacial light modulation element SLMβ on the basis of the light beam whose intensity is modulated by the sequential image signal of red and blue primary colors (complementary to the green primary color) of the three primary colors of the additive color mixture. Further, the red and blue primary color image signals can be separated from each other in space or time.

Further, a green primary color read light is supplied to the spacial light modulation element SLMα through the polarizing light beam splitter PBSα. The red and blue green primary color read lights are supplied to the spacial light modulation element SLMβ through the polarizing light beam splitter PBSβ. The reflected read light including image information written in the spacial light modulation elements SLMα and SLMβ, respectively can be read (reflected from the spacial light modulation elements SLMα and SLMβ, respectively; introduced to a dichroic filter DFrb through the polarizing light beam splitters PBSα and PBSβ, respectively; and then projected on a screen S through a common projection lens Lp, as a color image.

Figure 32:
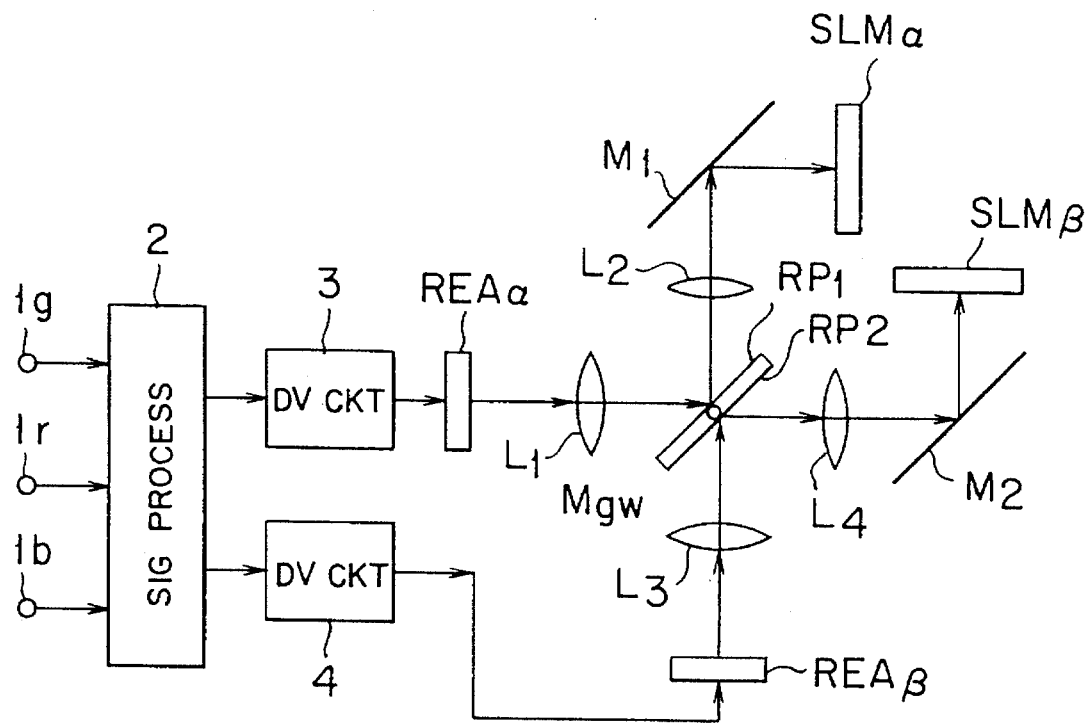
FIG. 32 is a perspective view showing an example of the write side of the fourth embodiment of the color image display apparatus according to the present invention.
Figure 33:
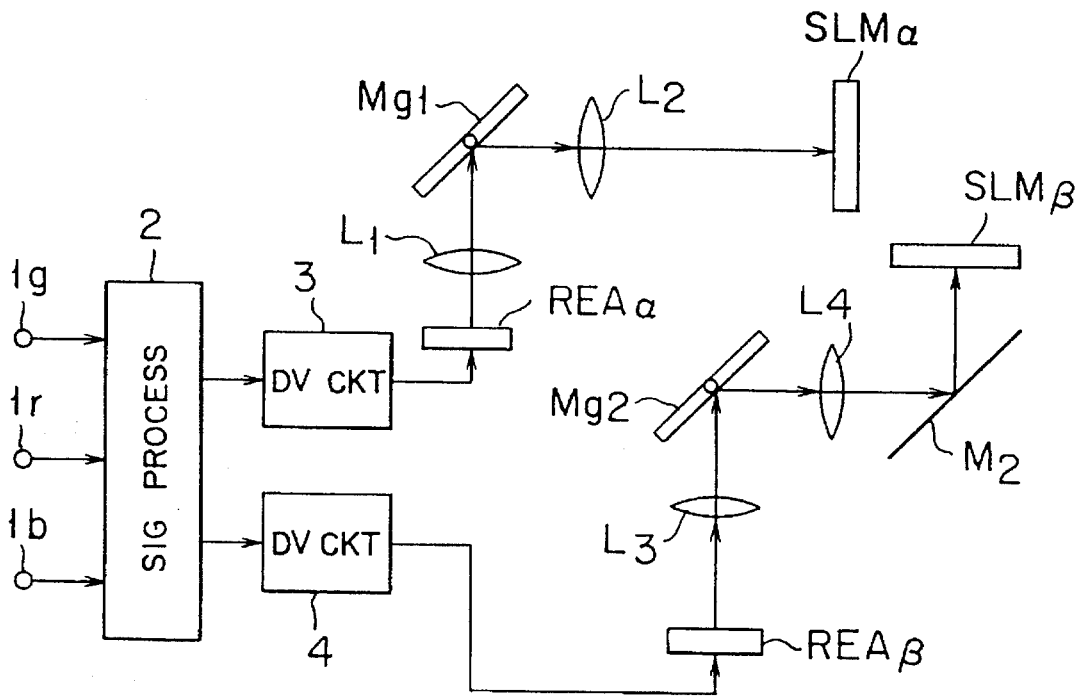
FIG. 33 is a perspective view showing the other example of the write side of the fourth embodiment of the color image display apparatus according to the present invention.

Here, the writing system of three primary color (additive color mixture) image information (for constituting the color image to be displayed) to the spacial light modulation elements SLMα and SLMβ will be described hereinbelow with reference to FIGS. 32 to 38. In FIGS. 32 and 33, REAα and REAβ denote a light emitting element array in which a number of light emitting elements (e.g., N-units of light emitting diodes) are arranged in straight line, respectively. Further, L1 to L4 denote focusing lenses. In FIG. 32, Mgw denotes an oscillation reflection mirror formed with a first reflection surface RP1 on one of both the right and reverse surfaces thereof and a second reflection surface RP2 on the other thereof. Further, in FIG. 33, Mg1 and Mg2 denote oscillation reflection mirrors, and SLMα and SLMβ denote spacial light modulation elements, respectively.

To the light emitting element arrays REAα and REAβ, image signals outputted by a signal processing circuit 2 are supplied via drive circuits 3 and 4, respectively. Each of the light emitting elements emits a light beam having a light quantity corresponding to the supplied image information. To change the quantity of the light emitted by each light emitting element of the light emitting element arrays REAα and REAβ according to the image information, the intensity of light emitted by each light emitting element is changed according to change in the amplitude of the image signal, or the emitting time width of the light with a constant light intensity emitted by each light emitting element is changed according to change in the amplitude of the image signal.

In the write system shown in FIG. 32, the light beam emitted by the light emitting element of the array REAα is deflected by the first reflection surface RP1 formed on one surface of the oscillation mirror Mgw, passed through a focusing lens L2, and focused on the photo-conductive layer member PCL (see FIG. 3) of the spacial light modulation element SLMα. On the other hand, in the write system shown in FIG. 33, the light beam emitted by the light emitting element of the array REAα is deflected by the oscillation mirror Mg1, passed through a focusing lens L2, and focused on the photo-conductive layer member PCL (see FIG. 3) of the spacial light modulation element SLMα.

Further, in the write system shown in FIG. 32, the light beam emitted by the light emitting element of the array REAβ is deflected by the second reflection surface RP2 formed on the other surface of the oscillation mirror Mgw, passed through a focusing lens L4, and focused on the photo-conductive layer member PCL (see FIGS. 3 and 18 to 22) of the spacial light modulation element SLMβ. On the other hand, in the write system shown in FIG. 33, the light emitted by the light emitting element array REAβ is deflected by the oscillation mirror Mg2, passed through a focusing lens L4, and focused on the photo-conductive layer member PCL (see FIGS. 3, 18 to 22) of the spacial light modulation element SLMβ. The light beam incoming to the photo-conductive layer member PCL of the spacial light modulation element (SLMα or SLMβ) is scanned in the perpendicular direction thereof in accordance with a predetermined method (being deflected by the oscillation mirror), to write the image information on the spacial light modulation element (SLMα or SLMβ) on the basis of the light beam incident thereupon, respectively.

In the write system shown in FIG. 32, the information signals of the color image to be displayed is being supplied to three input terminals 1g, 1r and 1b of a signal processing circuit 2. The information signals are image signals of three primary colors of additive color mixture, and these color image signals are supplied to the input terminals 1g, 1r and 1b, respectively as the simultaneous image signals. In more detail, a green primary color image signal is supplied to the input terminal 1g, a red primary color image signal is supplied to the input terminal 1r, and a blue primary color image signal is supplied to the input terminal 1b. The same as above can be applied to the write system shown in FIG. 33.

In the write type signal processing circuit 2 shown in FIG. 32, one-channel green primary color image signal and one-channel red and blue primary color sequential image signal ere generated as the simultaneous and sequential image signals.

The green primary color image signal outputted by the signal processing circuit 2 is supplied to the light emitting element array REAα via a drive circuit 3. On the other hand, the red and blue primary color sequential image signal outputted by the signal processing circuit 2 is supplied to the light emitting element array REAβ via a drive circuit 4. The light beam emitted by the light emitting element of the array REAα is introduced to the lens L1, end the light beam emitted by the light emitting element of the array REAβ is introduced to the lens L3, respectively.

The sequential image signals composed of the red and blue primary color signals supplied to the light emitting element array REAβ can be obtained by arranging the red and blue primary color image signals alternately in sequence on the time axis in unit of each vertical scanning period or in unit of pixel.

Figure 38A:
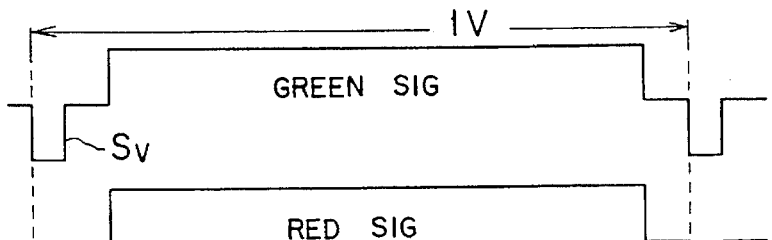

In more detail, the signal processing circuit 2 generates "time-axis compressed green primary color signal" (compressed G) (as shown by FIG. 3D or 38F) compressed down to 1/N on the time axis on the basis of the original green primary color signal (as shown by FIG. 38A) supplied to the input terminal 1g for each vertical scanning period (1 V period), and supplies the compressed G to the drive circuit 3 by N-times repeatedly for each vertical scanning period. The above-mentioned signal processing can be realized easily by use of a memory, for instance.

Figure 38D:

That is, the 1/N-time time-axis compressed green primary color signals are supplied from the signal processing circuit 2 to the drive circuit 3 in one vertical scanning period (1 V period) in sequence (N=2 in FIG. 38D and N=4 in FIG. 38F). The drive circuit 3 applies the time-axis compressed green primary color signals to the light emitting element array REAα in sequence for each horizontal scanning period. Therefore, all the light emitting elements of the light emitting element array REAα can emit a light beam whose quantity changes according each of the sequential image signals applied for each horizontal period in sequence repeatedly at the same period. The drive circuit 3 for executing the above operation is of shift register of serial input and parallel output.

Figure 38G:
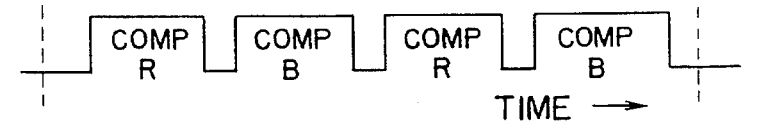
Figure 38H:
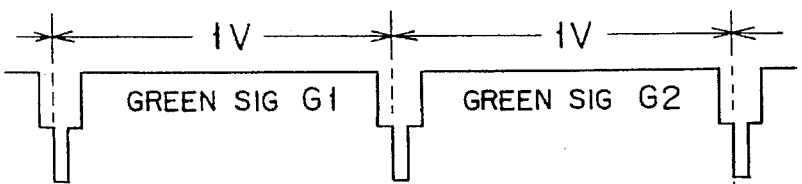

Further, the signal processing circuit 2 processes the inputted red and blue primary color signals in unit of one vertical scanning period in such a way that the 1/N-time time-axis compressed red primary color signal and the 1/N-time time-axis compressed blue primary color signal are arranged alternately in sequence and in series, to obtain a sequential signal (the time-axis compressed field sequential signal composed of red and blue primary color image signals). The obtained sequential signal is applied to the drive circuit 4. Further, the 1/N(=2)-time time-axis compressed red and blue primary color signal is shown in FIG. 38E, and the 1/N(=4)-time Time-axis compressed red and blue primary color signal is shown in FIG. 38G. The above-mentioned signal processing can be realized by use of a memory, for instance.

Therefore, each of all the light emitting elements of the light emitting element array REAα driven by the drive circuit 3 emits a light beam whose quantity changes according to each of the 1/N-time time-axis compressed green primary color image signals (compressed G) for each horizontal scanning period of the image signals simultaneously at the same period.

Further, each of all the light emitting elements of the light emitting element array REAα driven by the drive circuit 4 emits a light beam whose quantity changes according to each of the sequential time-axis compressed red end blue primary color field sequential signal (obtained by arranging the 1/N-time time-axis compressed red primary color image signals (compressed R) and the 1/N-time time-axis compressed blue primary color image signals (compressed B) alternately in sequence and in series) in each vertical scanning period (1 V), for each horizontal scanning period of the image signals simultaneously at the same period.

Figure 38L:

The simultaneous sequential image signals for driving the two light emitting element arrays REAα and REAβ as described above are shown in FIGS. 38A to 38G. Further, the other simultaneous sequential image signals for driving the two light emitting element arrays REAα and REAβ will be described hereinbelow with reference to FIGS. 38H to 38L. In the same way as above, as shown in FIGS. 38H to 38L, the three primary color signals of additive color mixture are inputted to the three input terminals 1g, 1r and 1b simultaneously to drive the two light emitting element arrays REAα and REAβ. In FIGS. 38M to 38L, the suffixes 1, 2 . . . of G1, G2, R1, R2, B1, B2, etc. represent the ordinal number of the vertical scanning periods.

Further, the signals of FIG. 38K are signals for driving the light emitting element array REAα, which are the same as the green primary color signals G1, G2, . . . for one vertical scanning period supplied in sequence on the time axis through the input terminal 1g of the signal processing circuit 2.

Further, the signals of FIG. 38L are signals for driving the light emitting element array REAβ, in which R1, R2, . . . are the red primary color signals for one vertical scanning period supplied in sequence on the time axis through the input terminal 1r of the signal processing circuit 2 and B1, B2, . . . are the blue primary color signals for one vertical scanning period supplied in sequence on the time axis through the input terminal 1b thereof. Further, in FIG. 38L, the red and blue primary color signals are arranged on the time axis in such a way that the arithmetic mean signal of the same two primary color signals at two adjacent vertical scanning periods are arranged as the field color sequence. Instead of this, it is also possible to arrange red and blue primary color signals in such a way that the same two primary color signals at two adjacent vertical scanning periods are time-axis compressed as signals for one vertical scanning period and the formed signals are arranged in the field color sequence on the time axis.

In the write system as shown in FIG. 33, the color image information signals to be displayed as shown by (a) to (c) of FIGS. 37A to 37C are inputted to the input terminals 1g, 1r and 1b of the signal processing circuit 2. The signal processing circuit 2 supplies one-channel green primary color image signal as shown by FIG. 37D to the drive circuit 3. The drive circuit 3 applies the green primary color sequential signals for one vertical scanning period (1 V period) to the light emitting element array REAα in sequence for each horizontal scanning period. Therefore, all the light emitting elements of the light emitting element array REAα can emit light beams whose quantities change according to the sequential image signals applied in sequence for each horizontal scanning period simultaneously at the same period. The drive circuit 3 for executing the above operation is of shift register of serial input end parallel output.

Further, the signal processing circuit 2 processes the inputted red and blue primary color signals in unit of one vertical scanning period in such a way that the time-axis compressed red primary color signal and the time-axis compressed blue primary color signal are arranged alternately in sequence and in series in one vertical scanning period (1 V period), to obtain a sequential signal (the time-axis compressed field sequential signal composed of red and blue primary color image signals). The obtained sequential signal is applied to the drive circuit Further, the time-axis compressed red and blue primary color signal is shown in FIG. 37E. The above-mentioned signal processing can be realized by use of a memory, for instance.

The drive circuit 4 gives the time-axis compressed red primary color image signal (as shown by FIG. 37E) for each horizontal scanning period in sequence to the light emitting element array REAβ at a first half section of one vertical scanning period (1 V). Therefore, all the light emitting elements of the light emitting element array REAβ can emit light beams whose quantities change according to the image signals, respectively simultaneously at the same period for each horizontal scanning period. Further, the drive circuit 4 gives the time-axis compressed blue primary color image signal (as shown by FIG. 37E) for each horizontal scanning period in sequence to the light emitting element array REAβ at a second half section of the one vertical scanning period (1 V). Therefore, all the light emitting elements of the light emitting element array REAβ can emit light beams whose quantities change according to the image signals, respectively simultaneously at the same period for each horizontal scanning period. The drive circuit 4 is of shift register of series input and parallel output.

Further, when the sequential signal (the time axis compressed field sequential signal composed of red and blue primary color signals) as shown by FIG. 37E is given to the light emitting element array REAβ, the oscillation period of the oscillating reflection mirror Mg2 for the light beams emitted by the light emitting element of the array REAβ is determined ½ of that of the oscillating reflection mirror Mg1 for the light beams emitted by the light emitting element of the array REAα.

In FIGS. 37H and 37J, the time-axis compressed red primary color signal is shown as "compressed R", and the time-axis compressed blue primary color signal is shown as "compressed B". Here, the sequential signal (time-axis compressed field sequential signal composed of the red and blue primary color signals) is shown being arranged in series as "compressed R"→"compressed B"→"compressed R" →"compressed B" at one vertical scanning period (1 V). Further, when the sequential signal is supplied to the drive circuit 4, the time-axis compressed primary color image signal corresponding to each ¼ section of one vertical scanning period (1 V) is given to the light emitting element array REAβ in sequence for each horizontal period. Therefore, all the light emitting elements of the light emitting element array REAβ can emit light beams whose quantities change according to the image signals simultaneously at the same period. The drive circuit 4 is of shift register of series input and parallel output.

Further, when the sequential signal as shown by FIG. 37H or 37J is given to the light emitting element array REAβ, the oscillation period of the oscillating reflection mirror Mg2 for the light beam emitted by the light emitting element of the array REAβ is determined ¼ of that of the oscillating reflection mirror Mg1 for the light beam emitted by the light emitting element of the array REAα.

In the above description, the image signal supplied to the light emitting element array REAα is the green primary color signal for one vertical scanning period as shown by FIG. 37D, Further, the image signal supplied to the light emitting element array REAβ is the sequential time-axis compressed red and blue primary color signal (time-axis compressed field sequential signal composed of red and blue primary color signals), as shown by FIG. 37E or 37H. Without being limited thereto, however, it is possible to use other various modifications, for instance as follows: the time-axis compressed green primary color signal as shown by FIG. 37F is supplied to the light emitting element array REAα twice repeatedly at one vertical scanning period, and further the sequential signal (time-axis compressed field sequential signal composed of red and blue primary color signals), as shown by FIG. 37G or 37H is supplied to the light emitting element array REAβ.

Further, in the above description of the write system shown in FIGS. 32 and 33, the simultaneous sequential signal are outputted by the signal processing circuit 2 in unit of one vertical scanning period. Without being limited thereto, however, as the simultaneous sequential signal, it is possible to use one-channel green primary color image signal and one-channel red and blue primary color image signal generated in unit of pixel of red and blue. In this case, the drive circuit as shown in FIG. 28 is used to obtain the sequential signal composed of the red and blue primary color signals arranged alternately in sequence on the time axis in unit of pixel. Further, the operation of the drive circuit shown in FIG. 28 has been already explained, so that the description thereof is omitted herein.

In the write system shown in FIGS. 32 and 33, three primary color image information signals written in the two spacial light modulation elements SLMα and SLMβ can be read by the read systems shown in FIGS. 29 to 31 as follows: In FIGS. 29 to 31, LS denotes a read light source which can emit light of wide wave length band. The read light of wide wave length band emitted by the read light source LS is first reflected by the cold mirror Mc, and then introduced to the dichroic filter DFg. The dichroic filter DFg reflects the light of green primary color wave length band and introduces the reflected light to the total reflection mirror M3. On the other hand, the light of red primary color wave length band and the light of blue primary color wave length band pass through the dichroic filter DFg, and is introduced to the total reflection mirror M4.

In the write system shown in FIGS. 32 and 33, the sequential image signal to be written in the spacial light modulation element SLMα is as follows: as already explained with reference to FIGS. 37 and 38, the simultaneous sequential signal outputted by the signal processing circuit 2 is the color sequential signal outputted in unit of one vertical scanning period. In this case, it is necessary to provide an optical color filter on the read side system of the color image display apparatus. In more detail, it is necessary to provide a mechanically rotating optical color filter element (as shown in FIGS. 34 and 35) or an electrically color-switchable optical color filter (e.g., a color selection reflection element CSE as shown in FIG. 36) in the optical path between the dichroic mirror DFg and the read side system of the spacial light modulation element SLMβ. In addition, the optical color filter must be switched in synchronism with the sequential color signal. Instead, it is also possible to provide optical color filter element in place of the total reflection mirror M4 shown in FIGS. 29 to 31.

Where the optical color filter disk as shown in FIGS. 34 and 35 is provided in place of the total reflection mirror M4, it is necessary to retain the synchronism between the optical color filter disk (a reflection type color filter disk in the case of FIGS. 34 and 35) composed of different color filter segments Fc1 and Fc2 having different optical filter characteristics and the three primary color signals for constituting the simultaneous sequential signal. For doing this, the optical color filter disk is rotated at a predetermined speed and in a predetermined phase by a motor (not shown) driven on the basis of a control signal outputted by the signal processing circuit 2. As described above, the color switching operation must be executed under such condition that the synchronous relationship between the three primary color signals can be retained properly. In this connection, the number of sets of the color filter segments of the color filter disk changes of course according to the selected number of revolutions of the color filter disk.

Further, where the colors are switched by use of a static type color selecting reflection element CSE (as shown in FIG. 36) instead of the total reflection mirror M4, the color switching operation of the static type color selecting reflection element CSE is controlled by a drive circuit controlled on the basis of a control signal outputted by the signal processing circuit 2, to switch the colors under such condition that the synchronous relationship between the three primary color signals can be kept properly.

With reference to FIG. 36, the construction and the operation of the color selecting reflection element CSE will be described hereinbelow. The static type color selecting reflection element CSE shown in FIG. 36 is a lamination layer composed of a transparent electrode Et1, a light modulation substance layer member (e.g., liquid crystal layer) PML, a transparent electrode Et2, a dichroic filter layer for passing blue light, a ¼ (quarter) wave length plate, and a dielectric mirror DLM all sandwiched between two substrates BP. Further, a drive circuit (composed of a switch SW and a voltage supply E connected in series) is connected between the two transparent electrodes Et1 and Et2. The switch SW is opened or closed on the basis of a color synchronizing switch control signal applied by the signal processing circuit 2.

The operation of the static type color selecting reflection element CSE on the basis of the switching (on-off) operation of the switch SW of the drive circuit will be described hereinbelow. When the switch SW of the drive circuit is turned on, since a voltage is applied between the light modulation substance layer member PML through the two transparent electrodes Et1 and Et2, the light modulation substance layer member PML changes as a member for functioning as a ¼ wave length plate. Accordingly, (1) the light of red wave length band in the P-polarized light introduced to the static color selecting reflection element CSE is passed by way of: the substrate BP→the transparent electrode Et1→the light modulation substance layer member PML (functioning as a ¼ wave length plate)→the transparent electrode Et2→(reflection by) the dichroic filter (for passing the blue light)→the transparent electrode Et2→the light modulation substance layer member PML (functioning as a ¼ wave length plate)→the substrate BP→the S-polarized light. Further, (2) the light of blue wave length bend in the P-polarized light introduced to the static color selecting reflection element CSE is passed by way of: the substrate BP→the transparent electrode Et1 →the light modulation substance layer member PML (functioning as a ¼ wave length plate)→the transparent electrode Et2→the dichroic filter for passing the blue light→the ¼ wave length plate→(reflection by) the dielectric mirror DML→the ¼ wave length plate→the dichroic filter for passing the blue light→the transparent electrode Et2→the light modulation substance layer member PML (functioning as a ¼ wave length plate)→the substrate BP→the P-polarized light.

On the other hand, when the switch SW of the drive circuit is turned off, (1) the light of red wave length band in the P-polarized light introduced to the static color selecting reflection element CSE is passed by way of: the substrate BP→the transparent electrode Et1→the light modulation substance layer member PML→the transparent electrode Et2→(reflection by) the dichroic filter (for passing the blue light)→the transparent electrode Et2→the light modulation substance layer member PML→the substrate BP→the P-polarized light. Further, (2) the light of blue wave length band in the P-polarized light introduced to the static color selecting reflection element CSE is passed by way of: the substrate BP→the transparent electrode Et1→the light modulation substance layer member PML→the transparent electrode Et2→the dichroic filter for passing the blue light→the ¼ wave length plate→ (reflection by) the dielectric mirror DML→the ¼ wave length plate→the dichroic filter for passing the blue light→the transparent electrode Et2→the light modulation substance layer member PML→the substrate BP→the S-polarized light.

As described above, in the static type color selecting reflection element CSE shown in FIG. 36, the light of red wave length band and the light of blue wave length band of the P-polarized light introduced thereto can be emitted selectively as a specific polarization plane light, respectively according to the on-off operation of the switch SW of the drive circuit. In more detail, when the switch SW is turned on, the S-polarized light of red wave length band and the P-polarized light of blue wave length bend can be emitted. Further, when the switch SW is turned off, the S-polarized light of blue wave length band and the P-polarized light of red wave length band can be emitted.

On the other hand, the read light emitted by the read light source LS is introduced to the spacial light modulation element SLMβ by optical path of the read light source LS→the dichroic filter DFg→the mechanically rotating optical color filter disk (as shown in FIGS. 34 and 33) or the optical color filter element of the color selecting reflection element CSE (as shown in FIG. 36)→the polarizing light beam splitter PBSβ→and the spacial light modulation element SLMβ. By this operation, the red and blue primary color light can be read. The read light is first introduced to the spacial light modulation element SLMβ, modulated on the basis of the image information already written in the spacial light modulation element SLMβ, and then reflected from the spacial light modulation element SLMβ. Further, the read light reaches the screen S by the optical path of the polarizing light beam splitter PBSβ→(reflection by) the dichroic filter DFrb→the projection lens Lp→the screen S. As a result, red and blue primary color images can be displayed on the screen S in series on the time axis.

Further, the read light emitted by the read light source LS is introduced to the spacial light modulation element SLMα by optical path of the read light source LS →the dichroic filter DFg→the total reflection mirror M3 →the polarization light beam splitter PBSα→the spacial light modulation element SLMα. By this operation, the green primary color light can be read. The read light is first introduced to the spacial light modulation element SLMα, modulated on the basis of the image information already written in the spacial light modulation element SLMα, and then reflected from the spacial light modulation element SLMα. Further, the read light reaches the screen S by the optical path of the polarizing light beam splitter PBSα→(transmission through) the dichroic filter DFrb→the projection lens Lp→the screen S. As a result, a green primary color image can be displayed on the screen S. As described above, three primary color images can be displayed on the screen S.

As described above, in the fourth embodiment of the color image display apparatus according to the present invention, a color image to be displayed is composed of three primary color image signals. One light beam whose intensity is modulated by one primary color image signal is written in the first light-written type reflective spacial light modulation element as a two-dimensional image information. The other light beam whose intensity modulated by two other primary color (complementary with respect to one primary color) image signals separately in time or space is written in the second light-written type reflective spacial light modulation element as a two-dimensional image information.

The written image information can be read from these two light-written type reflective spacial light modulation elements as follows: the light of wide wave length band emitted by the read light source is separated into the read light for the one primary color light and the read light for the other two primary color light (complementary to the one primary color). The first read light is introduced to the read light introduction side of the first light-written reflective spacial light modulation element through the first polarizing light beam splitter provided on the first light-written type reflective light modulation element. Further, the second read light is introduced to the read light introduction side of the second light-written reflective spacial light modulation element through the second polarizing light beam splitter provided on the second light-written type reflective light modulation element. The introduced second read light is given selectively as the read light of predetermined wave length band according to the light beams of the two primary color image signals. The first read light reflected from the first light-written type reflective light modulation element is introduced to the first polarizing light beam splitter and then outputted therefrom. This first read light includes the image information of the specific primary color of the three primary colors of additive color mixture. The second read light outputted from the second light-written type reflective light modulation element is introduced to the second polarizing light beam splitter and then outputted therefrom. This second read light includes the image information of two other primary colors (complementary to the specific primary color) of the three primary colors of additive color mixture. These image information signals of two primary colors are separatable in time or space. The first read light and the second read light are synthesized and then introduced to the common projection lens. The light passed through the common projection lens is projected onto the screen to display a color image on the screen.

As described above, in the color display apparatus of this embodiment, the optical system for resolving the light emitted by the read light source into the respective primary colors is different from the optical system for synthesizing the read light beams outputted by first and second light-written type reflective spacial light modulation elements into the light passed through the projection lens. Therefore, it is possible to use the respective optical members each having any required characteristics in relatively narrow wave length band, independently and easily at relatively low cost. Further, three primary color image signals can be written and read with the use of only two light-written type spacial light modulation elements, it is possible to realize a color image display apparatus of excellent characteristics in spite of a relatively simple construction.

[Fifth Embodiment]

The fifth embodiment of the color image display apparatus according to the present invention will be described hereinbelow with reference to FIGS. 39 to 47, in which various modifications are shown. In these drawings, REAα, REAβ and REAγ (FIG. 47) denote a light emitting element array composed of a great number of light emitting elements (e.g., N-units of light emitting diodes) arranged in a straight line, respectively, and further L1 to L4 denote focusing lenses. Further, Mgw is an oscillation mirror formed with a first reflection surface RP1 on one of the right and reverse surfaces thereof and a second reflection surface RP1 on the other thereof. Further, SLMα and SLMβ denote light-written type spacial light modulation elements (referred to as spacial light modulation elements, hereinafter); PBSα and PBSβ denote polarizing light beam splitters; LS denotes a read light source; Lp denotes a projection lens; and S denotes a screen.

To each of the light emitting element arrays REAα, RSAβ and REAγ, image signals outputted by a signal processing circuit 2 are supplied via drive circuits 3, 4 and 5, respectively. Each of the light emitting elements emits a light beam having a light quantity changed according to the supplied image information. To change the quantity of the light beam emitted by each light emitting element of the light emitting element arrays REAα, REAβand REAγ according to the image information, the intensity of light beam emitted by each light emitting element is changed according to change in the amplitude of the image signal, or the emitting time width of the light beam with a constant light intensity emitted by each light emitting element is changed according to change in the amplitude of the image signal.

The light beam emitted by each light emitting element of the array REAα is passed through a lens L1 and deflected by the first reflection surface of the single oscillating reflection mirror Mgw, and then focused onto the photoconductive layer member PCL (as shown in FIG. 3) of the spacial light modulation element SLMα through a focusing lens L2. The light beam emitted by the light emitting element of the array REAβ is passed through a lens L3 and deflected by the second reflection surface of the single oscillating reflection mirror Mgw, and then focused onto the photo-conductive layer member PCL (as shown in FIG. 3 and FIGS. 18 to 22) of the spacial light modulation element SLMβ through a focusing lens L4.

The light beam introduced to the photo-conductive layer member PCL of the spacial light modulation element (SLMα, SLMβ) is scanned in the perpendicular direction thereof in accordance with a predetermined method (the deflection by the oscillating mirror Mgw), to write the image information on the spacial light modulation element on the basis of the light beam incident thereupon, respectively.

In the following description, where a plurality of spacial light modulation elements SLM are shown, the elements SLM are distinguished from each other by attaching suffixes α to γ. However, where these elements are explained in common without any distinction, the elements are shown without attaching any suffix. The spacial light modulation element SLM is constructed as shown in FIG. 3 and FIGS. 18 to 22, for instance. In more detail, the spacial light modulation element SLM is formed by laminating a transparent substrate BP1, a transparent electrode Et1, a photo-conductive layer member PCL, a dielectric mirror DML, a light modulation substance layer member PML, a transparent electrode Et2, and a transparent substrate BP2. The spacial light modulation element SLM will be summarized hereinbelow with reference to FIG. 3.

The transparent electrodes Et1 and Et2 are of a thin film, respectively formed of a transparent photo-conductive substance. Further, the photo-conductive layer member PCL is formed of a substance having photo-conductive characteristics in a wave length band of light to be used. Further, the dielectric mirror DML is a known multilayer structure by which light in a predetermined wave length band can be reflected. Further, the light modulation substance layer member PML is formed of a light modulating substance by which the status of light (deflection, polarization, scattering, etc.) can be changed according to the strength of an electric field applied thereto.

The above-mentioned light modulation substance is a nematic liquid crystal, lithium niobate, BSO, PLZT, etc. and high molecular-liquid crystal composite film, etc.

E denotes a power source for supplying a predetermined voltage between the two transparent electrodes Et1 and Et2. Although shown as an alternating voltage power source, this power source can be replaced with a direct voltage power source according to the substance for constituting the light modulation substance layer member PML.

Further, WL denotes write light introduced to the substrate (BP1) side of the spacial light modulation element SLM and focused upon the photo-conductive layer member PCL. The intensity of this write light is modulated according to the information to be displayed. Under the condition that a predetermined voltage is applied between the transparent electrodes Et1 and Et2 by the voltage supply E, when the write light WL is introduced and then focused onto the photo-conductive layer member PCL, the electric resistance value of the photo-conductive layer member PCL (at which the write light WL is focused) changes according to the quantity of the write light. Therefore, an eclectic field having an electric field strength distribution corresponding to the quantity of the write light WL is to be applied between both ends of the light modulation substance layer member PML.

Further, when the read light RL is introduced to transparent substrate (BP2) side of the spacial light modulation element SLM, the incident read light reaches a dielectric mirror DML by optical path of the transparent substrate BP2→the electrode Et2→the light modulation substance layer member PML→the dielectric mirror DML, being reflected therefrom. Further, the reflected read light is outputted therefrom by optical path opposite to that of when introduced. Accordingly, the status of the light beam outputted from the spacial light modulation element SLM is changed according to the intensity distribution of the write light.

The substances of the light modulation substance layer member PML can be classified as follows:

(1) The type of changing the scattering status of light passed therethrough according to the electric field strength applied thereacross. In this type, the intensity of the reflected read light beam changes according to the intensity distribution of the write light.

(2) The type of changing the polarization status or the double refraction (birefringence) status of light passed therethrough according to the electric field strength applied thereacross. In this type, the polarization or the polarization plane of the reflected read light changes according to the intensity distribution of the write light. Therefore, when the reflected read light is passed through an analyzer (or the polarizing light beam splitter PBS), it is possible to obtain the reflected read light whose intensity changes according to the intensity distribution of the write light.

The spacial light modulation element SLM as shown in FIG. 3 is provided with a section at which there exist no selective response characteristics with respect to wave length within the wave length band of the write and read light.

Figure 18:
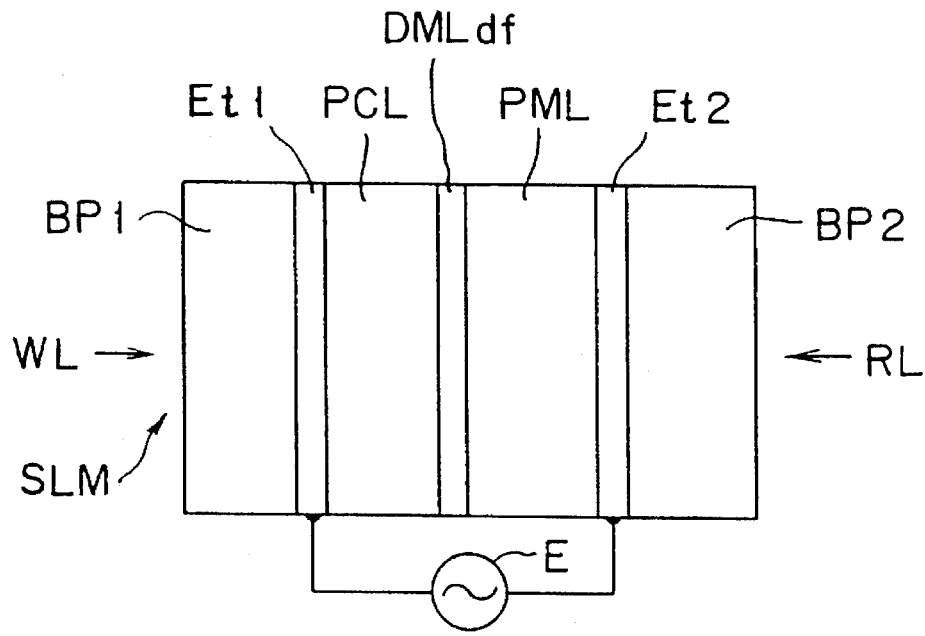
FIG. 18 is a side cross-sectional view showing an example of the reflective spacial light modulation element of light written type.

The spacial light modulation element SLM as shown in FIG. 18 uses a dielectric mirror DMLdf (as shown in FIG. 27) as the above-mentioned section. In more detail, as shown in FIG. 27, the regions R for reflecting light of red primary color wave length band and the regions B for reflecting light of blue primary color wave length band are arranged alternately in sequence extending in a predetermined direction (perpendicular to the light deflection direction of the oscillation reflecting mirror Mgw in this embodiment).

Further, it is also possible to form the dielectric mirror DMLdf by arranging two different wave length regions R and B in island shape, as shown in FIGS. 24 and 26, in the same way as with the case of the color resolving filter Fdl, without arranging the two different wave length ranges R and B in stripe shape.

Further, in the spacial light modulation element SLM shown in FIGS. 19 to 21, a color resolving filter Fdf is formed in the optical path of the write light toward the photo-conductive layer member PCL. As the color resolving filter Fdf, the one as shown in FIG. 23 or FIG. 24 can be used.

In the spacial light modulation element SLM shown in FIG. 20, a color resolving filter Fdf composed of two sorts of color filter stripes arranged. A dielectric mirror DMLdf is provided, on which regions for reflecting different light of different wave length bands are arranged.

Further, in the spacial light modulation element SLM shown in FIG. 21, a color resolving filter Fdfl (e.g., the color resolving filter Fdf as shown in FIG. 23 or 24) is provided in the optical path of the write light beam. In addition, a color resolving filter Fdf2 having two regions R end B for reflecting two different primary color light beams of different wave length bands (e.g., the color resolving filter Fdf as shown in FIG. 25 or 26) is provided in the optical path of the read light.

Further, in the spacial light modulation element shown in FIG. 22, a color resolving filter Fdf2 having two regions R and B for reflecting two different primary color lights of different wave length binds (e.g., the color resolving falter Fdf as shown in FIG. 25 or 26) is provided in the optical path of the read light.

Further, the various spacial light modulation elements SLM as explained above with reference to FIG. 3 and FIGS. 18 to 22 are used appropriately with the various modifications of the color image display apparatus according to the present invention shown in FIGS. 39 to 47.

In the color image display apparatus shown in FIGS. 39 to 46, the information signals of the color image to displayed is supplied to three input terminals 1g, 1r and 1b of a signal processing circuit 2. In the following description, three image signals of three primary colors of additive color mixture are applied to the input terminals 1g, 1r and 1b, respectively as the simultaneous image signals. In more detail, a green primary color image signal is supplied to the input terminal 1g, a red primary color image signal is supplied to the input terminal 1r, and a blue primary color image signal is supplied to input terminal 1b.

In the signal processing circuit 2, one-channel green primary color image signal and one-channel red and blue primary color sequential image signal ere generated as the simultaneous and sequential image signals.

The green primary color image signal outputted by the signal processing circuit 2 is supplied to the light emitting element array REAα via the drive circuit 3. On the other hand, the red and blue primary color sequential image signal outputted by the signal processing circuit 2 is supplied to the light emitting element array REAβ via the drive circuit 4. The light beam emitted by the light emitting element of the array REAα is introduced to the lens L1, and the light beam emitted by the light emitting element of the array REAβ is introduced to the lens L3, respectively.

Figure 47:
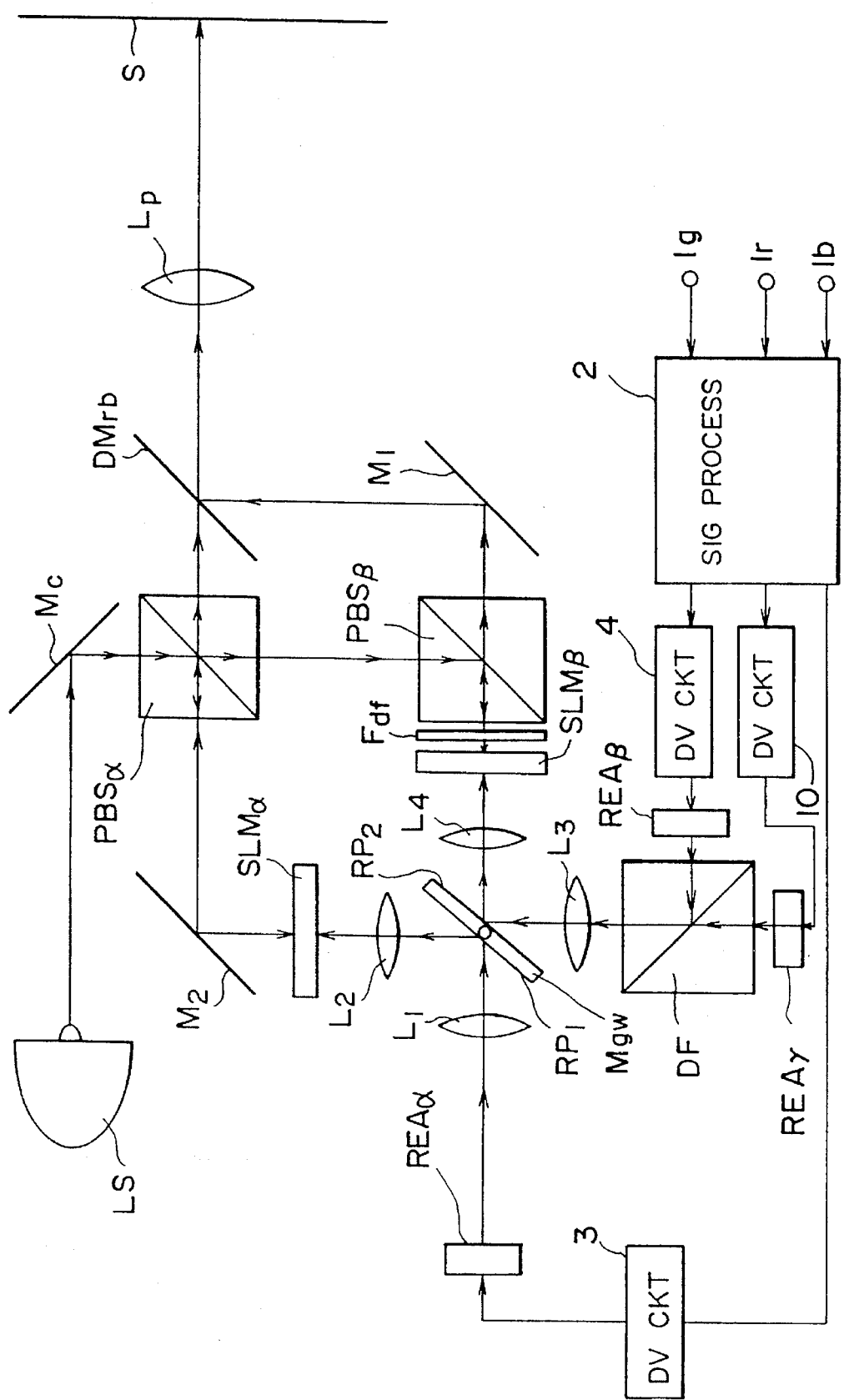
FIG. 47 is a block diagram showing the other example of the fifth embodiment of the color image display apparatus according to the present invention.

In the color image display apparatus shown in FIG. 47, the three primary color image signals are supplied to the signal processing circuit 2 through the input terminals 1g, 1r and 1b, respectively as the simultaneous image signals. One-channel green primary color image signal is supplied from the signal processing circuit 2 to the light emitting element array REAα via the drive circuit 3. Further, one-channel red primary color image signal is supplied from the signal processing circuit 2 to the light emitting element array REAβ via the drive circuit 4. Further, one-channel blue primary color image signal is supplied from the signal processing circuit 2 to the light emitting element array REAγ via a drive circuit 10. In the color image display apparatus shown in FIG. 47, the wave length band of the light beam emitted by the light emitting element of the array REAβ is different from that emitted by the light emitting element of the array REAγ. These two light beams of two different wave length bands are synthesized by a dichroic prism DF and then introduced to a lens L3 at the same time.

In the color image display apparatus shown in FIGS. 39 to 44, a sequential image signal composed of red and blue primary color signals supplied to the light emitting element array REAβ is such that the respective red and blue image signals are arranged alternately in sequence on the time axis in unit of image signals at one vertical scanning period. On the other hand, in the color image display apparatus shown in FIGS. 45 to 46, a sequential image signal composed of red and blue primary color signals supplied to the light emitting element array REAβ is such that the respective red and blue image signals are arranged alternately in sequence on the time axis in unit of pixel.

Figure 39:
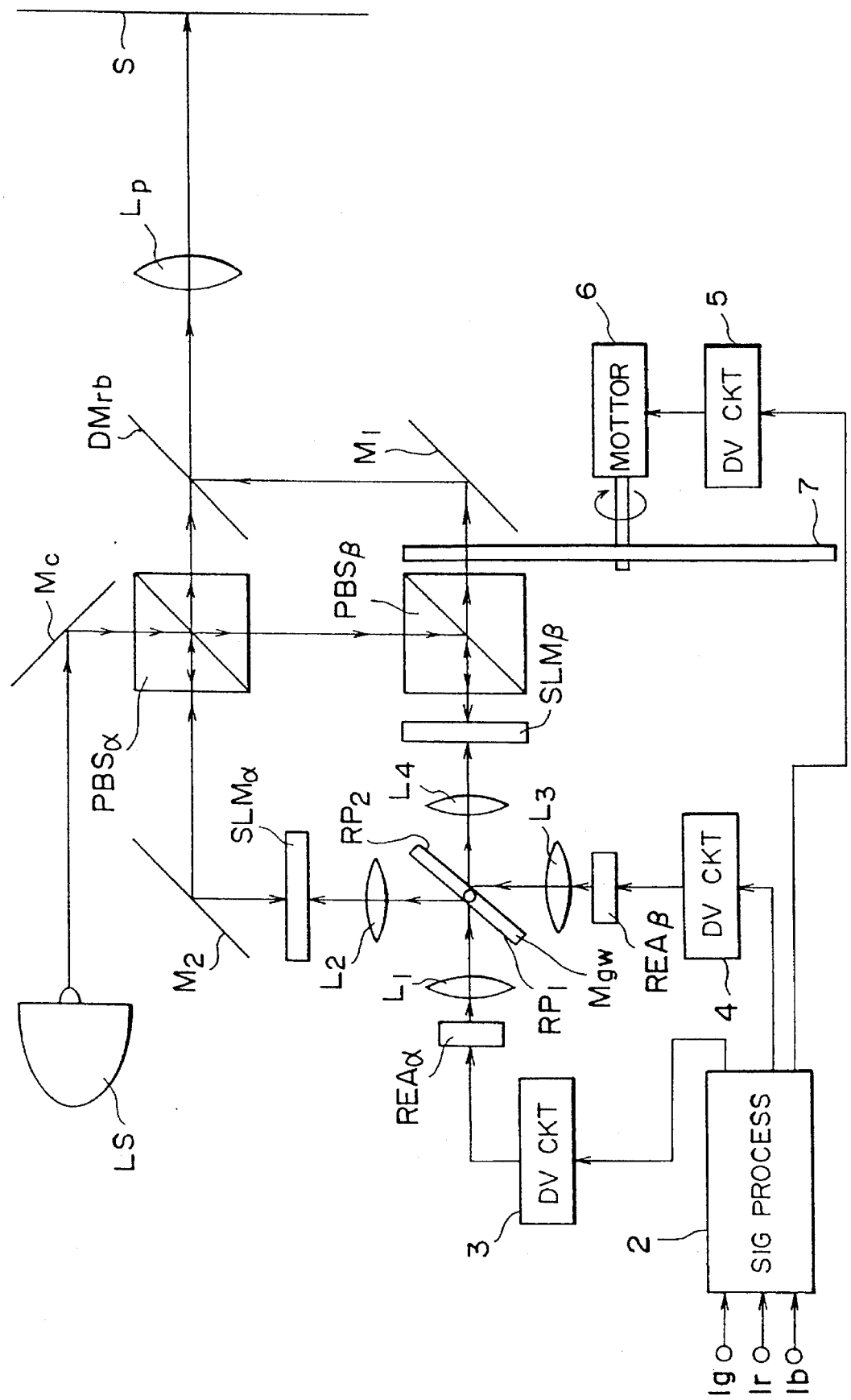
FIG. 39 is a block diagram showing an example of a fifth embodiment of the color image display apparatus according to the present invention.
Figure 41:
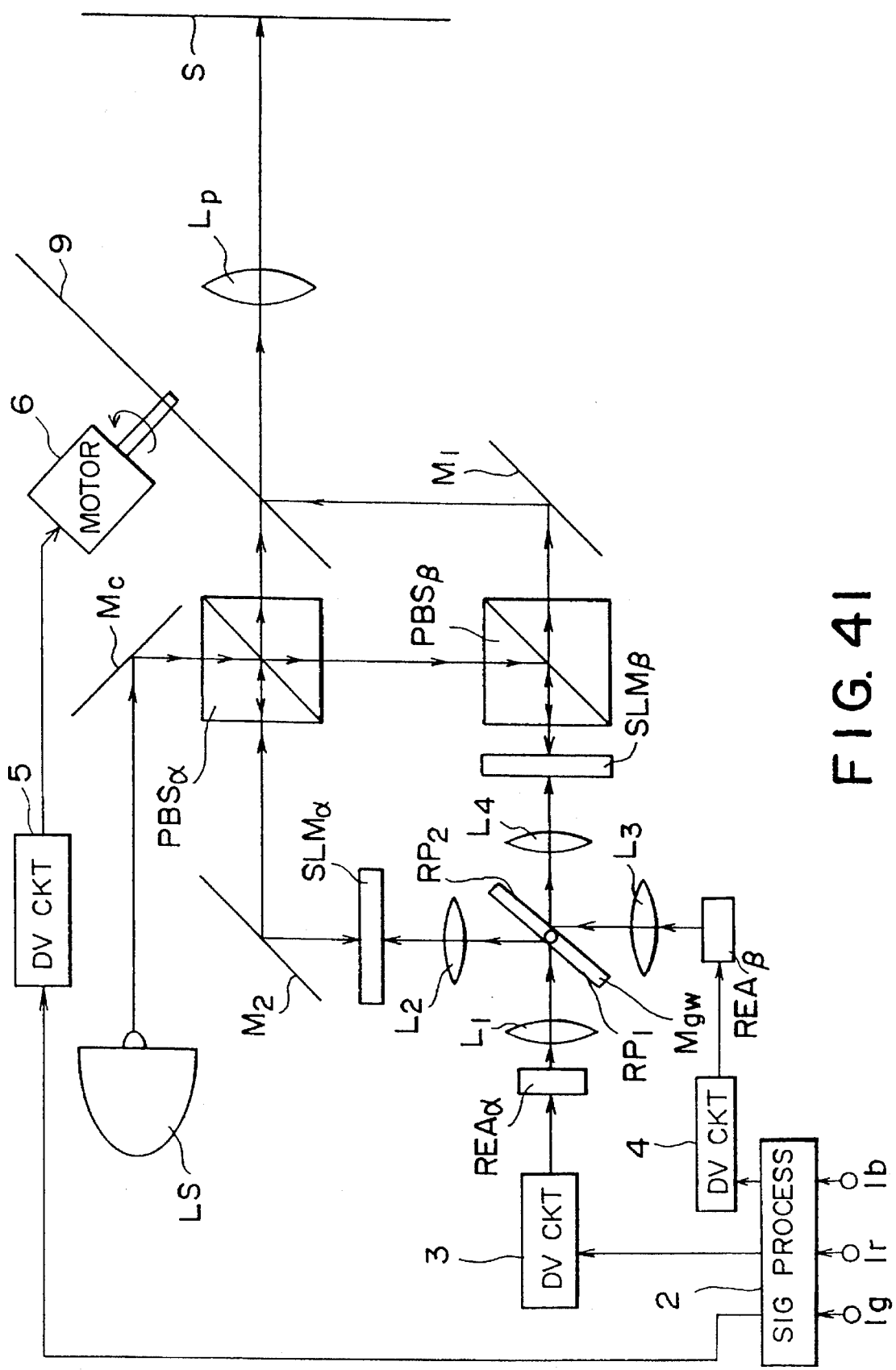
FIG. 41 is a block diagram showing another example of the fifth embodiment of the color image display apparatus according to the present invention.
Figure 42:
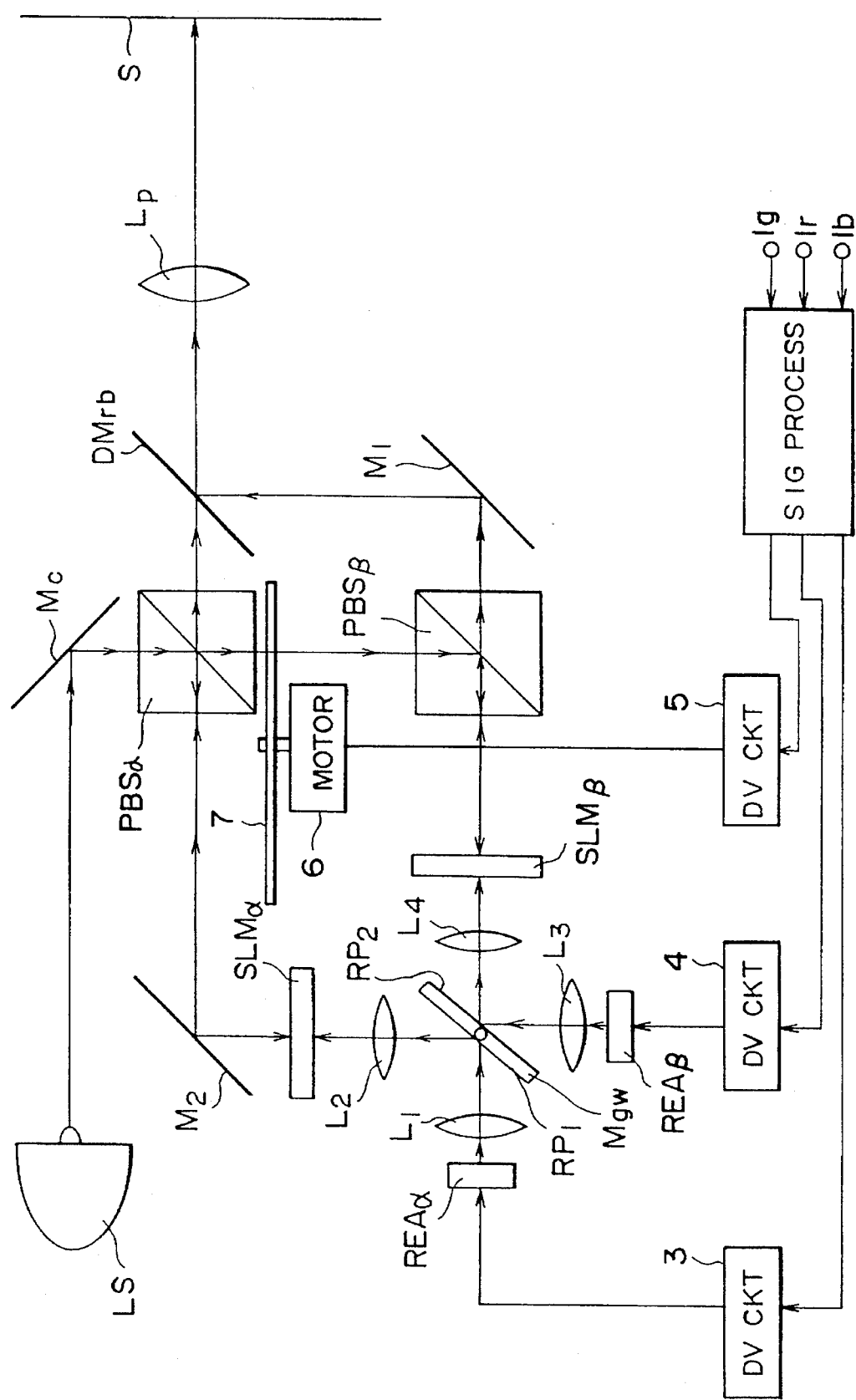
FIG. 42 is a block diagram showing another example of the fifth embodiment of the color image display apparatus according to the present invention.

In FIGS. 39 to 42, a motor 6 rotates a transmission type color filter disk 7 (as shown in FIGS. 39 and 42) or a reflection type color filter disk 8 (as shown in FIG. 40) or a dichroic filter disk 9 (as shown in FIG. 41). The motor 6 is controlled at a predetermined revolution speed and a rotational phase in such a way that the synchronous relationship between the three primary color signals for constituting the simultaneous sequential signal can be maintained properly. The control signal is supplied to the motor 6 from the drive circuit 5 of the signal processing circuit 2.

FIGS. 34 end 35 show examples of the color filter disks 7, 8 and 9, in which Fc1 and Fc2 are color filter segments having different optical characteristics. Further, the number of sets of the color filter segments must be of course changed according to how to select the revolution speed of the color filter disk 7, 8 or 9.

In the color image display apparatus according to the present invention, the simultaneous signals of three primary colors of additive color mixture (as shown by FIGS. 38A to 38C) are inputted to the input terminals 1g, 1r and 1b of the signal processing circuit 2, respectively.

Further, the signal modes outputted by the drive circuit 4 have been already explained in detail hereinbefore in [Fourth embodiment] with reference to FIG. 38, so that any detailed description thereof is omitted herein.

Here, the light beam emitted by the light emitting element of the array REAα is introduced to the first reflection surface RP1 of the oscillating reflection mirror Mgw through the lens L1. Further, the light beam emitted by the light emitting element array of the REAβ is introduced to the second reflection surface RP2 of the oscillating reflection mirror Mgw through the lens L3. The oscillating reflection mirror Mgw rotates at 1/N times of the oscillation period of one vertical scanning period (1 V) of the respective primary color signals supplied to the input terminals 1g, 1r and 1b of the signal processing circuit 2, in order to deflect the light beam emitted by the light emitting element of the array REAα and the light beam emitted by the light emitting element of the array REAβ both by a right angle by the two reflection surfaces RP1 and RP2 formed on both surfaces of the oscillating reflection mirror Mgw.

In other words, the light beam emitted by the light emitting element of the array REAα is deflected by the reflection surface RP1 of the oscillating reflection mirror Mgw at a right angle toward the lens L2. The two lenses L1 and L2 function as to focus the deflected light beam on the photo-conductive layer member of the light-written type spacial light modulation element SLMα. Therefore, the light beam passed through the lens L2 is focused on the photo-conductive layer member of the light-written type spacial light modulation element SLMα.

On the other hand, the light emitted by the light emitting element of the array REAβ is deflected by the reflection surface RP2 of the oscillating reflection mirror Mgw at a right angle toward the lens L4. The two lenses L3 and L4 function as to focus the deflected light on the photo-conductive layer member of the light-written type spacial light modulation element SLMβ. Therefore, the light passed through the lens L4 is focused on the photo-conductive layer member of the light-written type spacial light modulation element SLMβ.

The two-dimensional image information of the respective primary color image signals focused on the respective primary spacial light modulation elements SLMα and SLMβ are written in the respective spacial light modulation elements SLMα and SLMβ on the basis of the write operation of the spacial light modulation elements already explained with reference to FIG. 3.

The read operation of the respective spacial light modulation elements SLMα and SLMβ will described hereinbelow.

The read light of wide wave length band emitted by a read light source LS is introduced to a polarizing light beam splitter PBSα through a cold mirror Mc. The polarizing light beam splitter PBSα is provided with such transmission and reflection characteristics with respect to the P-polarized light and S-polarized light, as shown in FIG. 10. Accordingly, the polarizing light beam splitter PBSα transmits the P-polarized light component of the incident light of all band, the S-polarized light component of the red primary color light and the S-polarized light component of the blue primary color light.

Further, in the color image display apparatus as shown in FIGS. 39 to 41, the read light is further introduced to the polarizing light beam splitter PBSβ provided with such transmission and reflection characteristics with respect to the P-polarized light and S-polarized light, as shown in FIG. 11. Further, the S-polarized light component of the light with the green primary color wave length band is reflected by the polarizing light beam splitter PBSα, and then introduced to the transparent substrate (BP2) side of the spacial light modulation element SLMα through a total reflection mirror M2. Here, the S-polarized light component of blue primary color and the S-polarized light component of red primary color (of the P-polarized light component of the light of all wave length band passed through the polarizing light beam splitter PBSα and then introduced to the polarizing light beam splitter PBSβ, the S-polarized light component of blue primary color and the S-polarized light component of red primary color) are reflected by the polarizing light beam splitter PBSβ, and then introduced to the transparent substrate (BP2) side of the spacial light modulation element SLMβ.

Further, in the color image display apparatus shown in FIG. 42, the read light of wide wave length band emitted by a read light source LS is introduced to a polarizing light beam splitter PBSα through a cold mirror Mc. The polarizing light beam splitter PBSα passes the P-polarized light component of the incident light of all wave length band, the S-polarized light component of red primary color and the S-polarized light component of blue primary color, reflects the S-polarized light component of green primary color, and introduces these light to the transparent substrate (BP2) side of the spacial light modulation element SLMα through the total reflection mirror M2.

The P-polarized light component of the incident light of all the wave length band passed through the polarizing light beam splitter PBSα, the S-polarized light component of red primary color and the S-polarized light component of blue primary color are introduced to the transmission type color filter disk 7. The S-polarized light component of the light of wave length band passed through the color filter of the transmission type color filter disk 7 is reflected by the polarizing light beam splitter PBSβ, and then introduced to the transparent substrate (BP2) side of the spacial light modulation element SLMβ.

The above-mentioned respective spacial light modulation elements SLMα and SLMβ performs the read operation as already explained with reference to FIG. 3.

In the color image display apparatus shown in FIGS. 39, 40 and 42, the image information of the green primary color read by the spacial light modulation element SLMα is focused onto the screen by optical path of the spacial light modulation element SLMα→the total reflection mirror M2→the polarizing light beam splitter PBSα→(transmission through) the dichroic mirror DMrb→the projection lens Lp→the screen S.

Further, in the color image display apparatus shown in FIG. 41, the image information of the green primary color read by the spatial light modulation element SLMα is focused onto the screen by optical path of the spacial light modulation element SLMα→the total reflection mirror M2→(transmission through) the dichroic filter disk 9→the projection lens Lp→the screen S.

Further, in the color image display apparatus shown in FIG. 39, the image information of the red and blue primary colors read by the spacial light modulation element SLMβ is focused onto the screen by optical path of the spacial light modulation element SLMβ→(transmission of) the polarizing light beam splitter PBSβ→(selective transmission of red and blue primary color image information on the time axis through) the color filter of the transmission type color filter disk 7→(reflection of) the total reflection mirror M1→(reflection by) the dichroic mirror DMrb→the projection lens Lp→the screen S. Here, in the optical path between the spacial light modulation element SLMβ and the screen S, a transmission type color filter disk 7 is arranged. This transmission type color filter disk 7 is rotated at a predetermined rotational speed and in a predetermined phase by the motor 6 under control of the drive circuit 6. The red and blue primary color image information read from the spacial light modulation element SLM-β can be selected by the color filter of the rotating transmission type color filter disk 7, so as to be focused onto the screens correctly. The method of controlling the rotational speed and phase of the transmission type color filter disk 7 is well known in the technical field of the color synchronism in sequential picture of the color television system, so that any detailed description thereof is omitted herein.

Further, in the color image display apparatus shown in FIG. 40, the image information of the red and blue primary colors read by the spacial light modulation element SLMβ is focused onto the screen by optical path of the spacial light modulation element SLMβ→(transmission of) the polarizing light beam splitter PBSβ→(selective reflection of red end blue primary color image information on the time axis by) the color filter of the reflection type color filter disk 8→(reflection by) the dichroic mirror DMrb →the projection lens Lp→the screen S.

Further, in the color image display apparatus shown in FIG. 41, the image information of the red and blue primary colors read by the spacial light modulation element SLMβ is focused onto the screen by optical path of the spacial light modulation element SLMβ→the polarizing light beam splitter PBSβ→(reflection of) the total reflection mirror M1→(reflection by) the dichroic filter disk 9→the projection lens Lp→the screen S.

Further, in the color image display apparatus shown in FIG. 42, the image information of the red and blue primary colors read by the spacial light modulation element SLMβ is focused onto the screen by optical path of the spacial light modulation element SLMβ→the polarizing light beam splitter PBSβ→(reflection of) the total reflection mirror M1→(reflection by) the dichroic mirror DMrb→the projection lens Lp→the screen S.

Here, the respective spacial light modulation light elements SLMα and SLMβ are arranged at the same distance away from the primary plane of the common projection lens Lp. In any of the color image display apparatus shown in FIGS. 39 to 42, the image information of the respective primary colors read by the respective spacial light modulation elements SLMα and SLMβ are projected on the same screen S under excellent superimposed conditions through the common projection lens Lp.

In the color image display apparatus shown in FIGS. 39 to 42 (except that shown in FIG. 42), the light corresponding to the time-axis compressed red and blue primary color field sequential signal is written in the spacial light modulation element SLMβ. Further, the synchronously rotating disk (such as the transmission type color filter disk 7 (as shown in FIG. 39), the reflection type color filter disk 8 (FIG. 40), =he dichroic filter disk 9 (FIG. 41), etc.) arranged midway of the optical path of the read light outgoing from the spacial light modulation element SLMβ are rotated in synchronism with the switching timing of the time-axis compressed field sequential signal when written. Further, the written red and blue primary color sequential signals can be read in proper color synchronism with respect to each other on the basis of the read light.

On the other hand, in the color image display apparatus shown in FIG. 42, the light corresponding to the time-axis compressed red and blue primary color field sequential signal is written in the spacial light modulation element SLMβ. Further, the synchronously rotating transmission type color filter disk 7 arranged midway of the optical path of the read light incoming to the spacial light modulation element SLMβ are rotated An synchronism with the switching timing of the time-axis compressed field sequential signal when written. Further, the written red and blue primary color sequential signals can be read in proper color synchronism with respect to each other on the basis of the read light.

Figure 45:
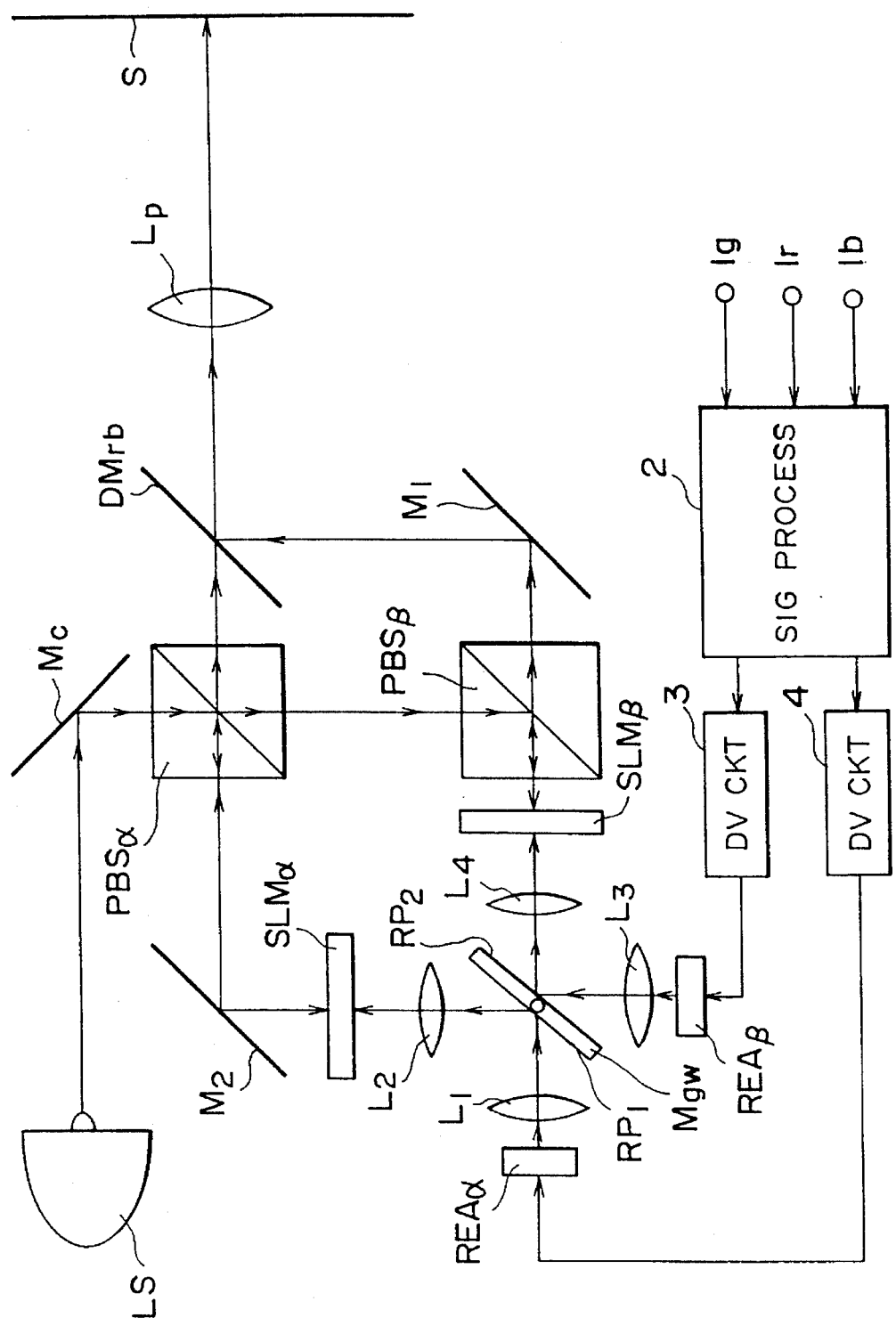
FIG. 45 is a block diagram showing another example of the fifth embodiment of the color image display apparatus according to the present invention.
Figure 46:
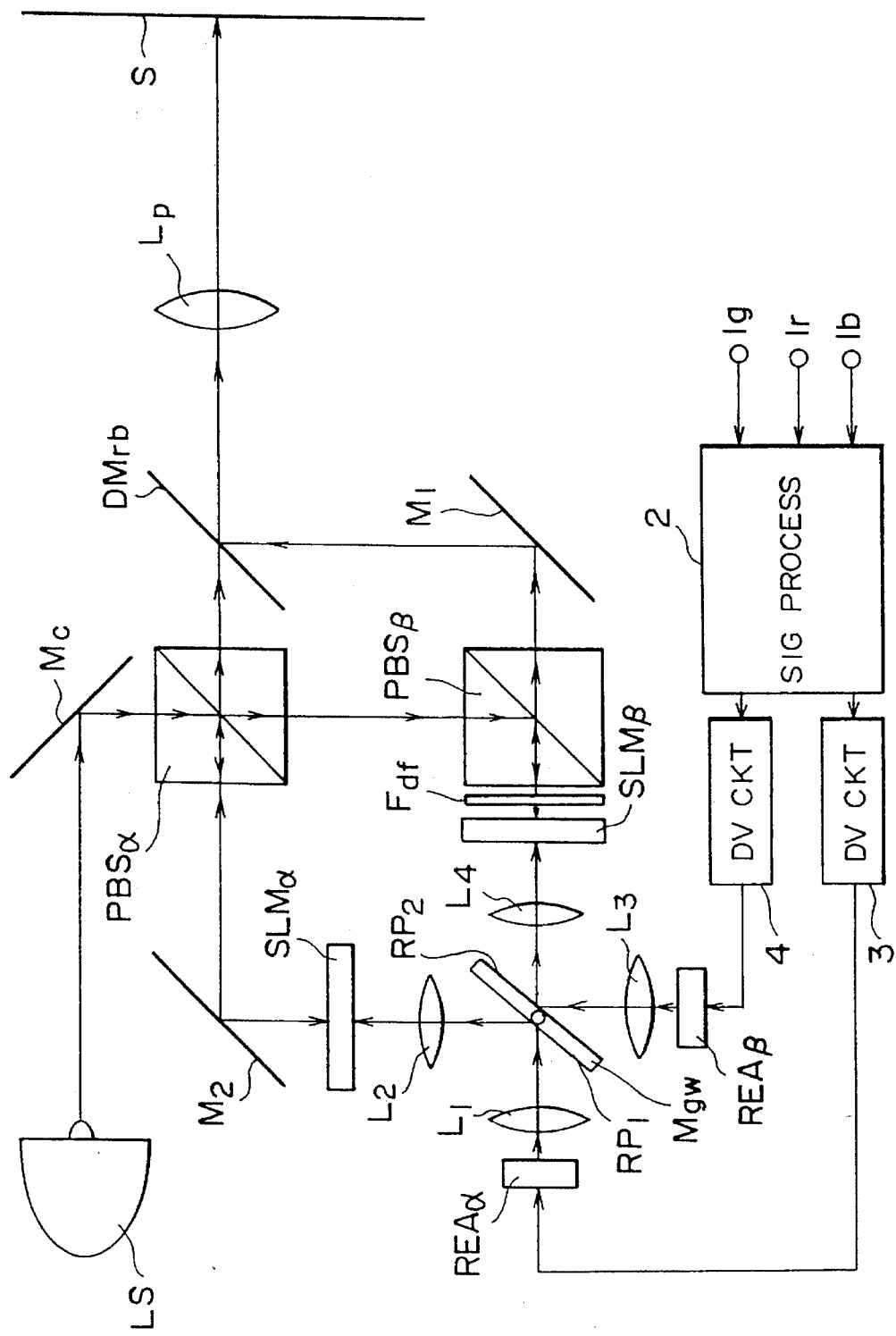
FIG. 46 is a block diagram showing another example of the fifth embodiment of the color image display apparatus according to the present invention.

Further, in the color display apparatus shown in FIGS. 45 and 46, the light emitting element array REAα is activated by the one-channel green primary color image signal outputted by the signal processing circuit 2, as already explained. In the same way, the light emitting element array REAβ is activated by the one-channel red and blue primary color sequential image signal (in the sequence of dots (pixels), for instance) outputted by the signal processing circuit 2. In order to arrange the red and blue primary color sequential signal to be supplied to the light emitting element array REAβ alternately in sequence on the time axis in unit of pixel, a drive circuit as shown in FIG. 28 is used, which has been already explained.

In the color image display apparatus shown in FIGS. 45 to 46, the respective image signals of three primary colors of additive color mixture as shown by FIGS. 38A to 38C are inputted simultaneously to the signal processing circuit 2 through the input terminals 1g, 1r and 1b, respectively. The same signals are supplied to the light emitting element array REAα through the drive circuit 3. On the other hand, the red and blue primary color sequential image signal (in unit of dot) is supplied to the light emitting element array REAβ through the drive circuit 4. The light beam emitted by the light emitting element of the array REAα is introduced to the lens L1, and the light emitted by the light emitting element of the array REAβ is introduced to the lens L3.

In the color image display apparatus shown in FIGS. 45 and 46, the oscillating reflection mirror Mgw is used as a light deflector. The light beam (corresponding to the green primary color signal) emitted by the light emitting element of the array REAα is introduced to the lens L1, and is deflected by the first reflection surface RP1 of the oscillating reflection mirror Mgw in the perpendicular direction, and then introduced to the lens L2. Since the two lens L1 and L2 function as a lens for focusing the light beam emitted by the light emitting element of the array REAα onto the photo-conductive layer member of the spacial light modulation element SLMα, the light beam passed through the lens L2 is focused on the photo-conductive layer member of the spacial light modulation element SLMα.

Further, the red and blue primary color dot-sequential image signal emitted by the light emitting element of the array REAβ is introduced to the lens L3, and then deflected by the second reflection surface RP2 of the oscillating reflection mirror Mgw in the perpendicular direction, and then introduced to the lens L4. Since the two lens L3 and L4 function as a lens for focusing the light emitted by the light emitting element of the array REAβ onto the photo-conductive layer member of the spacial light modulation element SLMβ, the light passed through the lens L4 is focused on the photo-conductive layer member of the spacial light modulation element SLMβ.

The two-dimensional image information signals corresponding to the respective primary color images focused on the respective spacial light modulation elements SLMα and SLMβ are written in the respective spacial light modulation elements SLMα and SLMβ on the basis of the write operation as already explained with reference to FIG. 3.

As the spacial light modulation element SLMα, it is possible to use that as shown in FIG. 3. Further, as the spacial light modulation element SLMβ, it is possible to use those as shown in FIGS. 18 to 22. These spacial light modulation elements have been described already hereinabove, so that any detailed description thereof is omitted herein.

In the color image display apparatus shown in FIG. 46, the light beam whose intensity is modulated by the red and blue primary color dot-sequential image signal is emitted by the light emitting element of the array REAβ, and then written in the spacial light modulation element SLMβ. As the spacial light modulation element REAβ, the element as shown in FIG. 3 can be used. In the optical path of the read light, en optical color resolving filter Fdf in which red and blue primary color filter segments are arranged in a predetermined sequence as shown in FIGS. 23 to 27 is arranged. Further, as the spacial light modulation element SLMβ to which the dot-sequential image signal is written, various elements as shown in FIGS. 18 to 22 can be of course used.

In the color image display apparatus shown in FIGS. 45 and 46, the mixture read light of the two primary colors is supplied to the spacial light modulation element SLMβ in which the red and blue primary color image signals are written at different spacial positions. Therefore, the red and blue reflection light beams can be obtained on the basis of the read lights.

Further, the optical color resolving filter Fdf shown in FIGS. 23 to 26 and the dielectric mirror shown in FIG. 27 both arranged in the spacial light modulation element are substantially the same as the color resolving filter Fdf, so that any description thereof is omitted herein.

In the color image display apparatus shown in FIGS. 45 and 46, the read operation of the three primary color image information written in the two spacial light modulation elements SLMα and SLMβ are as follows: As shown, the reed light of wide wave length band emitted by the read light source LB is reflected by a cold mirror Mc and then introduced to the polarizing light beam splitter PBSα. The polarizing light beam splitter PBSα is provided with such transmission and reflection characteristics of the P-polarized light and S-polarized light with respect to the wave length of the incident light thereupon as shown in FIG. 10. Therefore, the polarizing light beam splitter PBSα transmits the P-polarized light component of all the wave length bands of the incident light, the S-polarized light component of the red primary color and the S-polarized light component of the blue primary color; and reflects the S-polarized light component of the light of green primary color wave length band. The reflected light component becomes a read light, and then introduced to the transparent substrate (BP2) side of the spacial light modulation element SLMα through the total reflection mirror M2, so that the read operation as explained with reference to FIG. 3 can be realized. The green primary color image information read by the spatial light modulation element SLMα is focused on the screen S by optical path of the spacial light modulation element SLMα→the total reflection mirror M2→the polarizing light beam splitter PBSα→(transmission of) the dichroic mirror DMrb→the projection lens Lp→the screen S.

On the other hand, in the color image display apparatus shown in FIG. 46, the light component passed through the polarizing light beam splitter PBSα is introduced to the polarizing light beam splitter PBSβ having the transmission and reflection characteristics as shown in FIG. 11. The polarizing light beam splitter PBSβ reflects the mixture light of the S-polarized light component of the red primary color and the S-polarized light component of the blue primary color. The mixture light is introduced to the transparent substrate (BP2) side of the spacial light modulation element SLMβ through the color resolving filter Fdl as shown in FIGS. 23 to 26.

In the color image display apparatus shown in FIG. 45, the mixture read light introduced to the spacial light modulation element SLMβ is passed through the color resolving filter Fdl as shown in FIGS. 23 to 26 and the dielectric mirror as shown in FIG. 27 both arranged in the spacial light modulation element SLMβ, so that red and blue primary color reflective read light in unit of pixel can be obtained. The obtained primary color read light is focused onto the screen S through the optical path of the spacial light modulation element SLMβ→the polarizing light beam splitter PBSβ→ (reflection by) the total reflection mirror M1→(reflection by) the dichroic mirror DMrb→the projection lens Lp→the screen S.

Further, in the color image display apparatus shown in FIG. 46, the mixture read light of the S-polarized light components of The red and blue primary colors outgoing from the polarizing light beam splitter PBSβ is resolved into two primary colors by the optical color resolving filter Fdl, and then supplied to the spacial light modulation element SLMβ. Therefore, the read light of the S-polarized light component of the blue primary color light comes to the blue primary color image information writing portion, so that the blue primary color reflected read light can be obtained. In the same way, the read light of the S-polarized light component of the red primary color light comes to the red primary color image information writing portion, so that the red primary color reflected read light can be obtained. These two reflected read lights are focused on the screen S through the optical path of the spacial light modulation element SLMβ→(transmission of) the optical color resolving filter Fdf→(transmission of) the polarizing light beam splitter PBSβ→(reflection by) the total reflection mirror M1→(reflection by) the dichroic mirror DMrb→the projection lens→the screen S.

Further, in the color image display apparatus shown in FIG. 47, the respective three signals of the three primary colors of additive color mixture as shown by FIGS. 38A to 38C are inputted simultaneously to the signal processing circuit 2 through the input terminals 1g, 1r and 1b. Therefore, the signal supplied to the light emitting element array REAα is the same as already explained.

The red primary color signal (as shown by FIG. 38B) outputted by the signal processing circuit 2 is supplied to the light emitting element array REAβ through the drive circuit 4. Further, the blue primary color signal (as shown by FIG. 38C) outputted by the signal processing circuit 2 is supplied to the light emitting element array REAγ through the drive circuit 10. The light emitting elements for constituting the light emitting element array REAγ are different from the light emitting elements for constituting the light emitting element array REAβ with respect to the wave length band. In the following description, the assumption is made that the light emitting elements for constituting the light emitting element array REAβ emit a light beam of wave length band including a wave length α, respectively and the light emitting elements for constituting the light emitting element array REAγ emit a light beam of wave length bend including a wave length β, respectively.

The light beam of wave length band including wave length α emitted by the light emitting element of the array REAβ and the light beam of wave length band including wave length β emitted by the light emitting element of the array REAγ are introduced to the dichroic filter DF, respectively. The light beam of wave length band including wave length α (of REAβ) is reflected by the dichroic filter DF and is introduced to the lens L3. On the other hand, the light of wave length band including wave length β (of REAγ) is passed through the dichroic filter DF, and both introduced to the same lens L3.

In the color image display apparatus shown in FIG. 47, the light corresponding to the green primary color signal is introduced to the lens L1. The light passed through the lens L1 is deflected by the reflection surface RP1 of the oscillating reflection mirror Mgw (light deflector) in the perpendicular direction, and then introduced to the lines L2. Since the lenses L1 and L2 function as a focusing lens for focusing the light beam onto the photo-conductive layer member of the light-written type spacial light modulation element SLMα, the light passed through the lens L2 is focused onto the light-written type spatial light modulation element SLMα. As the light-written type spacial light modulation element SLMα, the element as shown in FIG. 3 can be used.

On the other hand, the light beam of wave length band including the wave length α corresponding to the red primary color signal and the light of wave length band including the wave length β corresponding to the blue primary color signal are both introduced to the lens L3. The light passed through the lens L3 is deflected by the reflection surface RP2 of the oscillating reflection mirror Mgw (light deflector) in the perpendicular direction, and then introduced to the lines L4. Since the lenses L3 and L4 function as a focusing lens for focusing the light onto the photoconductive layer member of the light-written type spacial light modulation element SLMβ, the light passed through the lens L4 is focused onto the light-written type spatial light modulation element SLMβ. As the spacial light modulation element SLMβ, the elements as shown in FIG. 3 and FIGS. 1B to 22 can be used. In the spacial light modulation element SLMβ, the optical color resolving filter Fdf is arranged on the incoming side of the write light, and the optical filter Fdf or the dielectric mirror DMLdf is arranged midway of the optical path of the write light. Further, in the optical color resolving filter Fdf, the filter segments α for selectively passing light of wave length band including the wave length α and the filter segments β for selectively passing light of wave length band including the wave length β are both arranged as shown in FIGS. 23 and 24. Further, in the optical filter Fdf, two primary color filter segments R and B are arranged as shown in FIGS. 25 and 26 in correspondence to the arrangement shown in FIGS. 23 and 24. Further, in the dielectric mirror DMLdf, the region R for reflecting the red primary color and the region B for reflecting the blue primary color are arranged as shown in FIG. 27 in correspondence to the arrangement shown in FIGS. 23 and 24.

The two-dimensional image information corresponding to the green primary color image focused on the spacial light modulation element SLMα is written in the spacial light modulation element SLMα on the basis of the write operation of the spacial light modulation element as already explained. Further, the light of wave length band including the wave length α and the light of wave length band including the wave length β focused on the spacial light modulation element SLMβ are selectively passed through the color filter segments of the optical color resolving filter Fdf arranged on the incoming side of the write light, and then written in the spacial light modulation element SLMβ under such conditions that the two-dimensional image information corresponding to the red primary color image and the two-dimensional image information corresponding the blue primary color image are separated from each other.

In the color image display apparatus shown in FIG. 47, the read operation of the three primary color image information written an in the two spacial light modulation elements SLMα and SLMβ are as follows: In FIG. 47, the read light of wide wave length band emitted by the read light source LS is reflected by a cold mirror Mc and then introduced to the polarizing light beam splitter PBSα. The polarizing light beam splitter PBSα is provided with such transmission and reflection characteristics of the P-polarized light end S-polarized light with respect to the wave length of the incident light whereupon as shown in FIG. 10. Therefore, the polarizing light beam splitter PBSα transmits the P-polarized light component of all the wave length band of the incident light, the S-polarized light component of the red primary color and the S-polarized light component of the blue primary color, and reflects the S-polarized light component of the light of green primary color wave length band. The reflected light is introduced to the transparent substrate (BP2) side of the spacial light modulation element SLMα through the total reflection mirror M2.

On the other hand, the light components passed through the polarizing light beam splitter PBSα are introduced to the polarizing light beam splitter PBSβ having the transmission and reflection characteristics as shown in FIG. 11. The polarizing light beam splitter PBSβ reflects the mixture light of the S-polarized light component of the red primary color and the S-polarized light component of the blue primary color. The reflected mixture light is introduced to the transparent substrate (BP2) side of the spacial light modulation element SLMβ through the color resolving filter Fdl as shown in FIGS. 23 to 26, In the color image display apparatus shown in FIG. 47, the spacial light modulation element SMLα performs the read operation on the basis of the read light of wave length band of the green primary color incoming to the transparent substrate (BP2) side thereof, as already explained with reference to FIG. 3. The light information including the green primary color image information read by the spacial light modulation element SLMα is focused on the screen through the optical path of the spacial light modulation element SLMα→(reflection by) the total reflection mirror M2→(transmission of) the polarizing light beam splitter PBSα→(transmission of) the dichroic mirror DMrb→the projection lens→the screen S.

On the other hand, the mixture read light of the S-polarized light components of the red and blue primary colors outgoing from the polarizing light beam splitter PBSβ is resolved into two primary colors by the optical color resolving filter Fdf, and then supplied to the spacial light modulation element SLMβ. Therefore, the light is resolved into two primary color light patterns through the optical color resolving filter Fdf. The resolved patterns are the same as the two separated patterns of the two-dimensional image information corresponding to the written red and blue primary color images, respectively.

Accordingly, the read light of the S-polarized light component of the red (or blue) primary color light incoming to the read side reaches the written portion of the red (or blue) primary color image information, so that a reflection light of the red (or blue) primary color light can be generated. The reflected read light is focused on the screen S by optical path of the spacial light modulation element SLMβ→(transmission of the optical color resolving filter Fdf→(transmission of) the polarizing light beam splitter PBSβ→(reflection by) the total reflection mirror M1→(reflection by) the dichroic mirror DMrb →the projection lens→the screen S.

Figure 43:
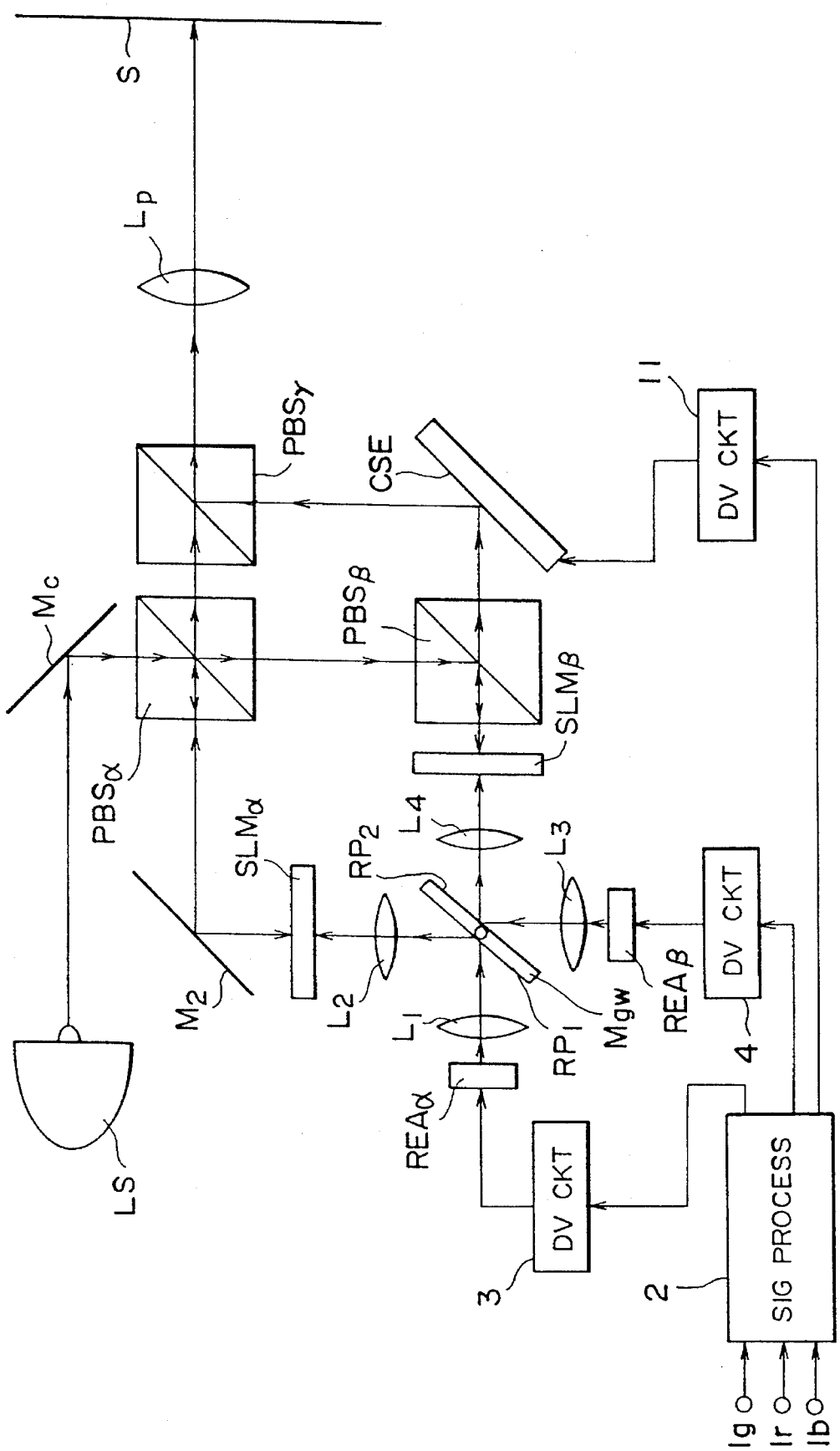
FIG. 43 is a block diagram showing another example of the fifth embodiment of the color image display apparatus according to the present invention.
Figure 44:
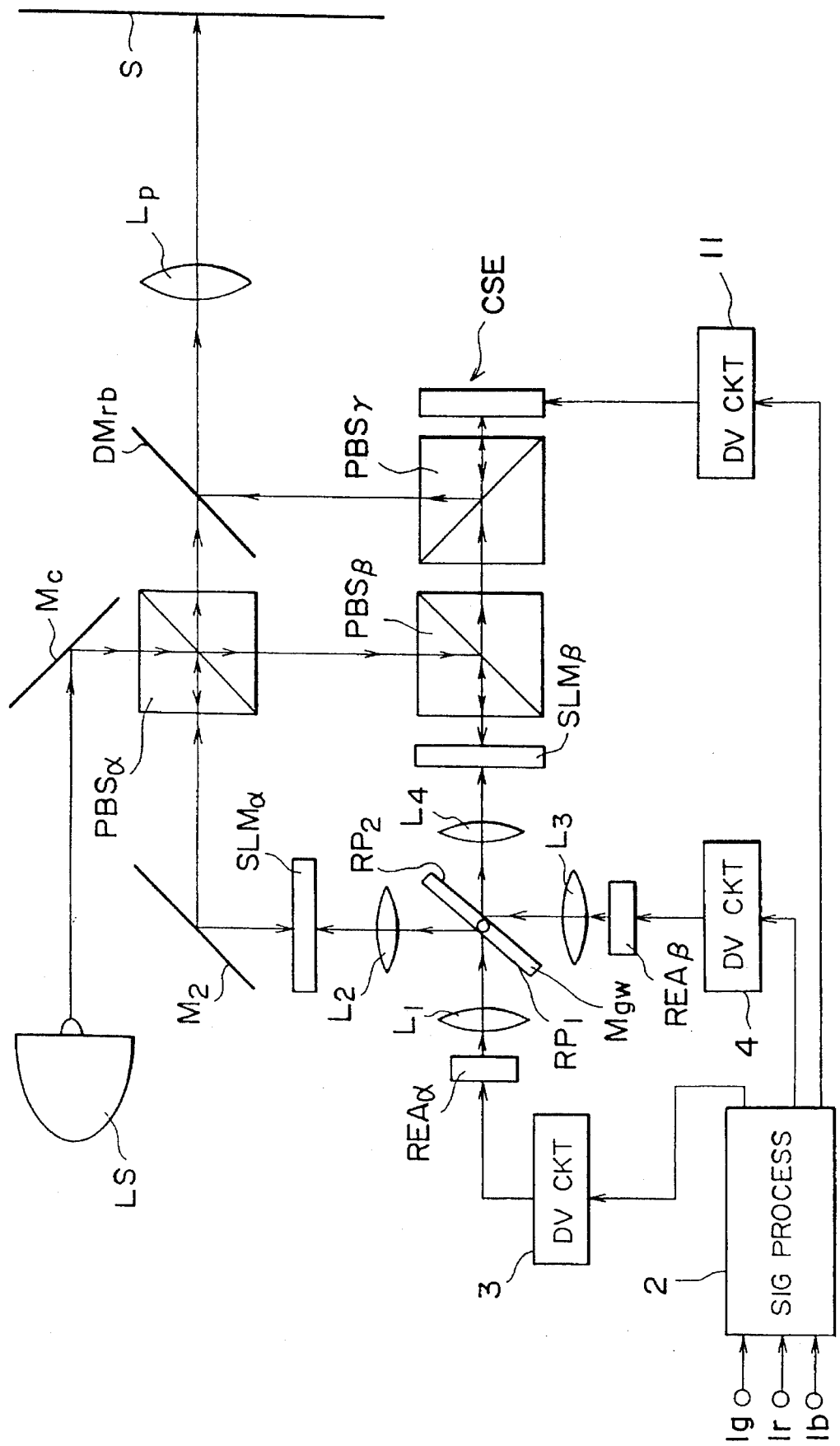
FIG. 44 is a block diagram showing another example of the fifth embodiment of the color image display apparatus according to the present invention.

In the color display apparatus shown in FIGS. 43 and 44, the colors are switched by use of the static type color selecting reflection element CSE (as shown in FIG. 36), instead of the rotary color filter disks 7, 8 and 9 used in the color image display apparatus as shown in FIGS. 39 to 42. That is, the static type color selecting reflection element CSE is controlled by a drive circuit 11 activated on the basis of a control signal applied by the signal processing circuit 2, to switch the reflected colors of the read light. Therefore, it is possible to switch the colors under such conditions that the synchronous relationship can be maintained correctly among the simultaneous sequential three primary color image signals, which is composed of the one-channel green primary color image signal and the one-channel sequential red and blue primary color image signal. Further, the operation of the static type color selecting reflection element CSE has been already explained hereinabove, so that the description thereof is omitted herein.

In the color image display apparatus show in FIGS. 43 and 44, The oscillating reflection mirror Mgw is oscillated at a predetermined oscillation period. The light beam corresponding to the green primary color image is emitted by the light emitting element of the array REAα driven by the drive circuit 3. The light beam is introduced to the reflection surface RP1 of the oscillating reflection mirror Mgw, deflected in the perpendicular direction, passed through the lens L2, and further focused on the photoconductive layer member of the light-written type spacial light modulation element SLMα.

On the other hand, the light beam corresponding to the time-axis compressed sequential signal based on the red and blue primary color images is emitted by the light emitting element of the array REAβ driven by the drive circuit 3. The light beam is introduced to the reflection surface RP2 of the oscillating reflection mirror Mgw, deflected in the particular direction, passed through the lens L4, and further focused on the photo-conductive layer member of the light-written type spacial light modulation element SLMβ.

The Two-dimensional image information corresponding to the respective primary color images focused on the respective spacial light modulation elements SLMα and SLMβ can be written in the respective spacial light modulation elements SLMα and SLMβ, respectively on the basis of the write operation of the spacial light modulation element, as explained with reference to FIG. 3.

In the color image display apparatus shown in FIGS. 43 and 44, the read operation of the image information from the spacial light modulation elements SLMα and SLMβ can be performed as follows: As described above, the read light of wide wave length bend emitted by a read light source LS is introduced to a polarizing light beam splitter PBSα through the cold mirror Mc. The polarizing light beam splitter PBSα is provided with such transmission and reflection characteristics with respect to the P-polarized light and S-polarized light, as shown in FIG. 10. Accordingly, the polarizing light beam splitter PBSα transmits the P-polarized light component of the incident light of all band, the S-polarized light component of the red primary color light and the S-polarized light component of the blue primary color light. The transmitted light components ere further introduced to the polarizing light beam splitter PBSβ provided with such transmission and reflection characteristics, as shown in FIG. 11.

Further, the polarizing light beam splitter PBSα reflects the S-polarized light component of light of green primary color light wave length band, and introduces the reflected light component to the transparent substrate (BP2) side of the spacial light modulation element SLMα through a total reflection mirror M2. Further, the S-polarized light component of blue primary color and the S-polarized light component of red primary color (of the P-polarized light component of the light of all wave length band introduced to the polarizing light beam splitter PBSβ, the S-polarized light component of blue primary color and the S-polarized light component of red primary color) are reflected by the polarizing light beam splitter PBSβ, and then introduced to the transparent substrate (BP2) side of the spacial light modulation element SLMβ.

The respective spacial light modulation element SLMα and SLMβ perform the read operation as already explained with reference to FIG. 3. First, in the color image display apparatus shown in FIG. 43, the image information of the green primary color read by the spatial light modulation element SLMα is focused onto the screen by optical path of the spacial light modulation element SLMα →(reflection by) the total reflection mirror M2→(transmission of the polarizing light beam splitter PBSα→(transmission of) the polarizing light beam splitter PBSγ→the projection lens Lp→the screen S.

Further, in the color image display apparatus shown in FIG. 44, the image information of the green primary color read by the spacial light modulation element SLMα is focused onto the screen by optical path of the spacial light modulation element SLMα→(reflection by) the total reflection mirror M2→(transmission of the polarizing light beam splitter PBSα→(transmission of) the dichroic mirror DMrb→the projection lens Lp→the screen S. Here, the polarizing light beam splatter PBSγ is provided with the transmission and reflection characteristics as shown in FIG. 11.

Further, in the color image display apparatus shown in FIG. 43, the image information of the red end blue primary colors read by the spacial light modulation element SLMβ is focused onto the screen by way of optical path of the spacial light modulation element SLMβ→(transmission of the polarizing light beam splitter PBSβ→(selective reflection of red and blue primary color image information on the time axis by) the color selecting reflection element CSE→(reflection of) the polarizing light beam splitter PBSγ→the projectional lens Lp→the screen S.

Further, in the color image display apparatus shown in FIG. 44, the image information of the red and blue primary colors read by the spacial light modulation element SLMβ is focused onto the screen by optical path of the spacial light modulation element SLMβ→(transmission of the polarizing light beam splitter PBSβ→(transmission of) the polarizing light beam splitter PBSγ→(selective reflection of red and blue primary color image information on the time axis by) the color selecting reflection element CSE→(reflection of) the polarizing light beam splitter PBSγ→(reflection by) the dichroic mirror DMrb→the projection lens Lp→the screen S.

As described above, in any of the color image display apparatus, the respective primary color image information read from the respective spacial light modulation elements SLMα end SLMβ can projected onto the screen S through the common projection lens Lp as an excellent superimposed image.

As described above, in the fifth embodiment of the color image display apparatus according to the present invention, the color image robe displayed is composed of three primary colors of additive color mixture. In the three primary colors, the specific primary color (e.g., green) image signal is used to modulate the intensity of one light beam. The light beam whose intensity is modulated is deflected by the first reflection surface of the oscillating reflection mirror having first and second reflecting surfaces on both sides thereof. The deflected light beam is focused onto the photo-conductive layer member of the first light-written type spacial light modulation element, so that the image information can be written therein. Further, in the three primary colors, the two-remaining primary color (e.g., red and blue which are complementary to green) image signal is used to modulate the intensity of the other light beam under such condition as to be separatable in time or space. The light beam whose intensity is modulated is deflected by the first reflection surface of the oscillating reflection mirror. The deflected light beam is focused onto the photo-conductive layer member of the second light-written type spacial light modulation element, so that the image information can be written therein. On the other hand, the light emitted by the read light source is resolved into three read lights having wave lengths corresponding to the three primary colors of additive color mixture. These read lights are given to the respective spacial light modulation elements as a read light, respectively. Therefore, the light modulated by the image information can be read from the first and second light-written type spacial light modulation element, separately. The read light beams are synthesized through the common projection lens, and then projected on the screen as a color image.

As described above, since the light deflection operation of a plurality of color image information can be deflected by only a single deflector, it is possible to solve the problems raised when a plurality of primary color images are superimposed, while reducing the cost of the display apparatus. Further, since the image information corresponding to the green primary color (which contributes to the resolution power in the human visibility) is written in one light-written type spacial light modulation element, and the image information corresponding to the red and blue primary colors is written as time division signal manner in the other light-written type spacial light modulation element, it is possible to realize a color image display apparatus high in precision end reliability and low in cost.

[Sixth Embodiment]

A sixth embodiment of the color image display apparatus according to the present invention will be described hereinbelow with reference to FIGS. 48 to 53, in which various modifications are shown.

Figure 54:
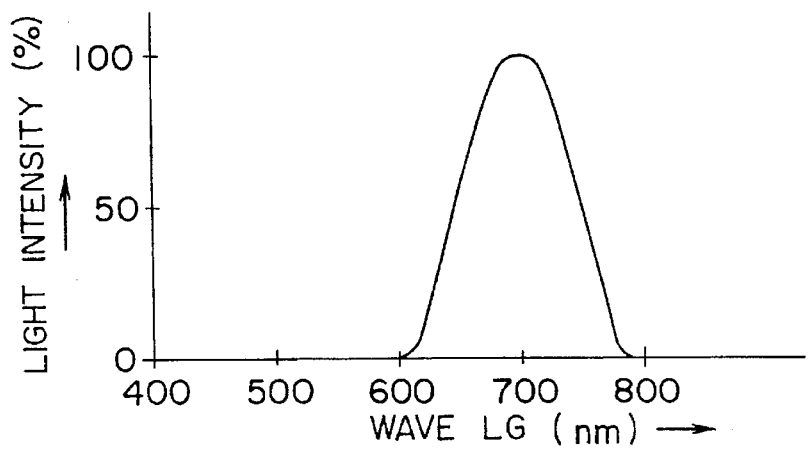
FIG. 54 is a graphical representation showing the spectral characteristics with respect to the wave length of the light beam emitted by the light emitting element of the array.

In this embodiment, three light emitting element arrays REA1, REA2 and REA3 are arranged. The light emitting element of the array REA1 emits a light beam whose intensity is modulated by the red primary color image signal of additive color mixture. The light emitting element of the array REA2 emits a light beam whose intensity is modulated by the blue primary color image signal of additive color mixture. The light emitting element of the array REA3 emits a light beam whose intensity is modulated by the green primary color image signal of additive color mixture. FIG. 54 shows the spectral characteristics of the light beam emitted by the light emitting element of the arrays REA1, REA2 and REA3.

Further, as the light-written spacial light modulation elements (referred to as spacial light modulation elements simply, hereinafter) SLMr, SLMb and SLMg, the element as already explained with reference to FIG. 3 can be used.

In the display apparatus shown in FIG. 48, the arrangement of the first the two light emitting element arrays REA1 and REA2 will be explained. In the light emitting element arrays REA1 and REA2, the light emitting elements are arranged on the same substrate in such a way that the column of the light emitting elements of the array REA1 and that of the light emitting elements of the array REA2 are spaced from each other at intervals of an integer times of the element pitch of the light emitting element array. Instead of this, it is also possible to arrange the light emitting elements of the arrays REA1 and REA2 on the same substrate in such a way that each column of the light emitting elements of the array REA1 and each column of the light emitting elements of the array REA2 are arranged in a straight lines.

The light beam emitted by the light emitting element of the array REA1 is transformed into, the S-polarized light through a polarizer PL1, and then introduced to a lens L1. The light beam emitted by the light emitting element of the array REA2 is transformed into the P-polarized light through a polarizer PL2, and then introduced to the same lens L1. The polarization plane of the S-polarized light and that of the P-polarized light are perpendicular to each other.

Figure 55:
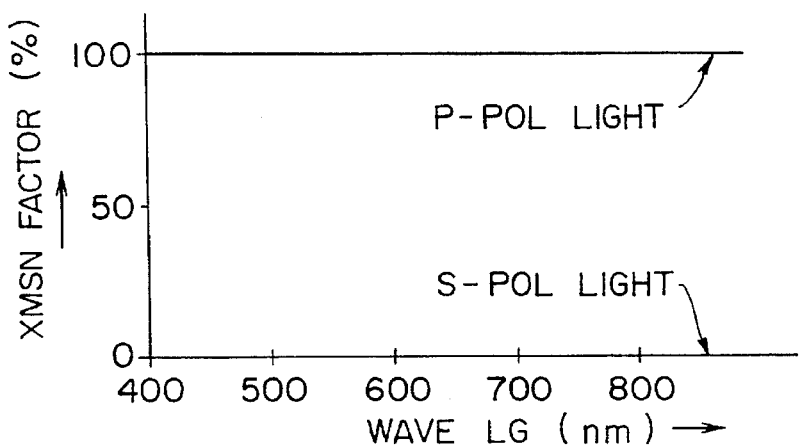
FIG. 55 is a graphical representation showing the transmission factor characteristics with respect to the polarized light of the polarizing light beam splitter.

The two linearly polarized light beams introduced to the lens L1 perpendicular to each other are deflected by a first reflection surface of an oscillating reflection mirror (deflector) Mgw in the perpendicular direction, and then introduced to a lens L2. The two lenses L1 and L2 function as a focusing lens for focusing the two light beams emitted by two light emitting elements of the two array REA1 and REA2, respectively on the photo-conductive layer member of the spacial light modulation element arranged corresponding thereto, respectively. The two linearly polarized light beams passed through the lens L2 are separated into two linearly polarized light beams perpendicular to each other by a polarizing light beam splitter PBSα provided with such transmission and reflection characteristics of the P- and S-polarized lights with respect to wave length as shown in FIG. 55. The linearly polarized light beams passed through the polarizer PL1 is reflected by a polarizing light beam splitter PBSα, and then focused on the photo-conductive layer member of the spacial light modulation element SLMr. Further, the linearly polarized light passed through the polarizer PL2 is passed through a polarized light beam splitter PBSα, and then focused on the photo-conductive layer member of the spacial light modulation element SLMb.

Further, the spacial positional offset (mismatching) between the two linearly polarized lights are corrected according to the arrangement of the two light emitting elements of the two arrays REA1 and REA2 on the same substrate. In more detail, the red primary color image signal supplied to the light emitting element array REA1 and the blue primary color image signal supplied to the light emitting element array REA2 are delayed with respect to each other. Alternatively, the arrangement positions of the two spacial light modulation elements SLMr and SLMb are offset from each other. By doing this, it is possible to write the light beam of the red primary color image signal and the light beam of the blue primary color image signal in the spacial light modulation elements SLMr and SLMb, respectively as two dimensional image information under perfect offset-less superimposed image.

To obtain the above-mentioned two linearly polarized lights, it is also possible to arrange a predetermined polarizer in front of the light emitting elements of the light emitting element arrays. In this case, the polarized lights emitted from the two adjacent light emitting elements are perpendicular to each other.

On the other hand, the light beam emitted by the light emitting element of the array REA3 is introduced to a lens L3. The light beam introduced to the lens L3 is deflected by a second reflection surface of the oscillating reflection mirror Mgw (deflector) in the perpendicular direction, and then introduced to a lens L4. The two lenses L3 and L4 function as a focusing lens for focusing the light beam emitted by the light emitting element of the array REA3 on the photo-conductive layer member of the spacial light modulation element. Therefore, the light beam passed through the lens L4 is reflected by a reflection mirror M3, and then focused on the photo-conductive layer member of the spacial light modulation element SLMg.

The oscillating reflection mirror Mgw used to deflect the light beam emitted by the light emitting element of the array REA3 in the perpendicular direction is used in common to deflect the light beams emitted by the light emitting elements of the two arrays REA1 and REA2 in the perpendicular direction. It is easy to form the reflection mirror Mgw having an extremely high parallelism with respect to both the right and reverse surfaces thereof. Accordingly, it is possible to superimpose the two-dimensional image information corresponding to the red primary color image written in the spacial light modulation element SLMr, the two-dimensional image information corresponding to the blue primary color image written in the spacial light modulation element SLMb, and the two-dimensional image information corresponding to the green primary color image written in the spacial light modulation element SLMg perfectly without any positional offsets or mismatching among them, in the same way as with the case of the other embodiments of the present invention.

The two-dimensional image information corresponding to the respective primary color images focused on the respective spacial light modulation elements SLMr, SLMb and SLMg are written in the spacial light modulation elements SLMr, SLMb and SLMg, respectively on the basis of the write operation of the spacial light modulation element, as already explained with reference to FIG. 3.

Figure 56:
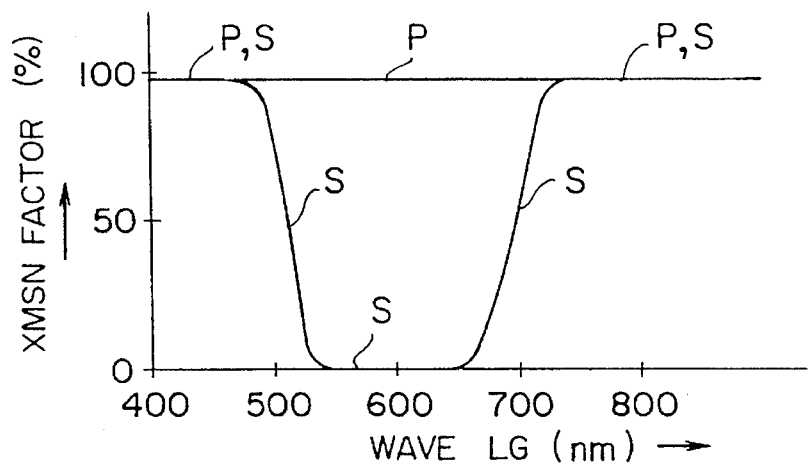
FIG. 56 is a graphical representation showing the transmission factor characteristics with respect to the polarized light of the polarizing light beam splitter.

On the other hand, the read operation from the spacial light modulation elements SLMr, SLMb and SLMg is as follows: The read light of wide wave length band emitted by a read light source LS is introduced to a polarizing light beam splitter PBSγ through a cold mirror Mc. The polarizing light beam splitter PBSγ is provided with such transmission and reflection characteristics of the P- and S-polarized lights with respect to wave length of the incident light, as shown in FIG. 56. Therefore, the polarizing light beam splitter PBSγ transmits the P-polarized light component of the light of all wave length band of the incident light and the S-polarized light component of the blur primary color light, and then introduces these transmitted components to the polarizing light beam splitter PBSβ. On the other hand, the polarizing light beam splitter PBSγ reflects the S-polarized light component of the light of wave length band of red and green primary color lights, and then introduces the reflected components to the dichroic prism (dichroic mirror) DMrg.

Figure 57:
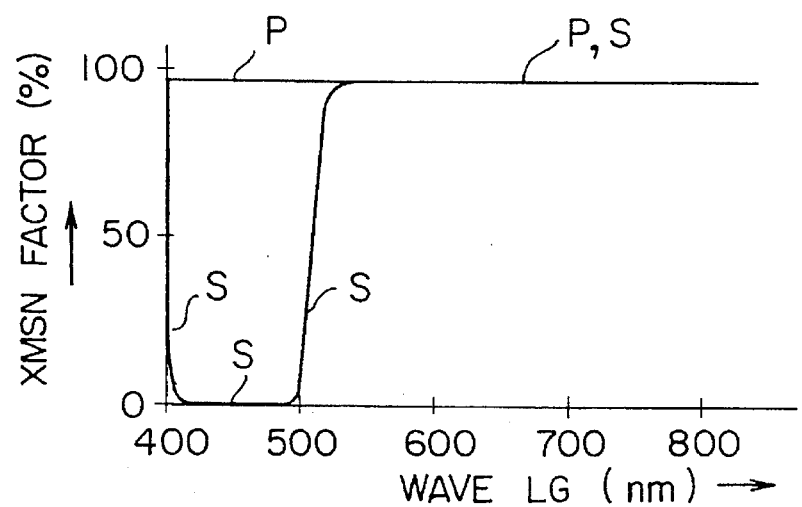
FIG. 57 is a graphical representation showing the transmission factor characteristics with respect to the polarized light of the polarizing light beam splitter.

The polarizing light beam splitter PBSβ is provided with such transmission and reflection characteristics of the P- and S-polarized lights with respect to wave length of the incident light, as shown in FIG. 57. Therefore, the polarizing light beam splitter PBSβ reflects the S-polarized light component of the blur primary color light, and then introduces the reflected component to the transparent substrate (BP2) side of the spacial light modulation element SLMb. Further, the S-polarized light component of the light of wave length band of red and green primary color lights introduced to the dichroic mirror DMrg is separated by the dichroic mirror DMrg into the S-polarized light component of the light of green primary color wave length band and the S-polarized light component of the light of red primary color wave length band. Further, the S-polarized light component of the light of green primary color wave length band is introduced to the transparent substrate (BP2) side of the spacial light modulation element SLMg. Further, the S-polarized light component of the light of red primary color wave length band is introduced to the transparent substrate (BP2) side of the spacial light modulation element SLMr.

The respective spacial light modulation elements SLMr, SLMb and SLMg performs the read operation as already explained with reference to FIG. 3. The optical information containing the red primary color image information read by the spacial light modulation element SLMr is focused on the screen S by optical path of the spacial light modulation element SLMr→(reflection by) the dichroic mirror DMrg→ (transmission through) the polarizing light beam splitter PBSγ→(transmission through) the dichroic mirror MBb→ the projection lens Lp→the screen S. Further, the optical information containing the green primary color image information read by the spacial light modulation element SLMg is focused on the screen S by optical path of the spacial light modulation element SLMg →(transmission through) the dichroic mirror DMrg→(transmission through) the polarizing light beam splitter PBSγ→(transmission through) the dichroic mirror MBb→the projection lens Lp→the screen S. Further, the optical information containing the blue primary color image information read by the spacial light modulation element SLMb is focused on the screen S by optical path of the spacial light modulation element SLMb→(transmission through) the polarizing light beam splitter PBSβ→(reflection by the total reflection mirror M4→(reflection by) the dichroic mirror MBb→the projection lens Lp→the screen S.

Further, the respective spacial light modulation elements SLMr, SLMb and SLMg are arranged at positions the same distance away from the primary plane of the common projection lens Lp. Accordingly, the image information of the respective primary colors read by the respective spacial light modulation elements SLMr, SLMb and SLMg can be projected on the screen S under excellent superimposed conditions.

Figure 49:
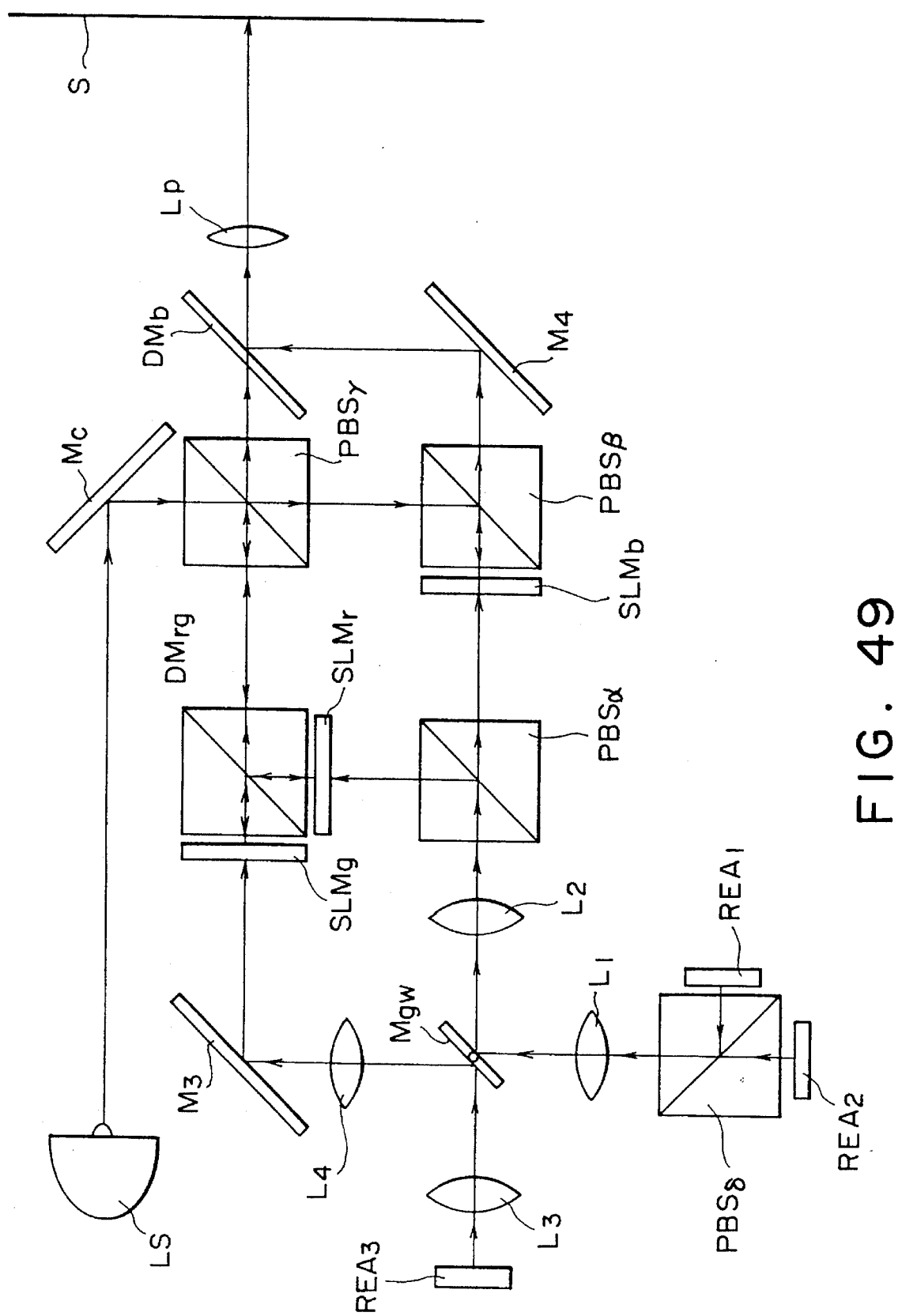
FIG. 49 is a block diagram showing another example of the sixth embodiment of the color image display apparatus according to the present invention.

In the display apparatus shown in FIG. 49, the light beam emitted from the light emitting element of the array REA1 and the light beam emitted from the light emitting element of the array REA2 are both introduced to the polarizing light beam splitter PBSδ from the two directions perpendicular to each other. Further, the light beam of the linearly polarized light (the S-polarized light in this embodiment) corresponding to the red primary color image signal emitted by the light emitting element of the array REA1 is introduced from the polarizing light beam splitter PBS6 to the lens L1. Further, the light beam of the linearly polarized light (the P-polarized light in this embodiment) corresponding to the blue primary color image signal emitted by the light emitting element of the array REA2 is introduced from the polarizing light beam splitter PBS6 to the lens L1.

The light beam of the S-polarized light corresponding to the red primary color image signal passed through the lens L1 and the light beam of the P-polarized light corresponding to the blue primary color image signal passed through the lens L1 are both introduced to one of reflection surface of the oscillating reflection mirror Mgw, being deflected in the perpendicular direction, and then introduced to the lens LS. Since the two lenses L1 and L2 function as a focusing lens for focusing the two light beams emitted by two light emitting elements of the two array REA1 and REA2 on the photo-conductive layer members of the spacial light modulation elements arranged corresponding thereto, respectively. There are, the light beam of the S-polarized light component passed through the lens L2 is reflected by the polarizing light beam splitter PBSα, and then focused on the photo-conductive layer member of the spacial light modulation element SLMr. Further, the light beam of the P-polarized light component passed through the lens L2 is passed through the polarizing light beam splitter PBSα, and then focused on the photo conductive layer member of the spacial light modulation element SLMb.

As described above, the light beam corresponding red primary color image signal and the light beam corresponding to the blue primary color image signal can be both written in the two spacial light modulation elements SLMr and SLMb as two-dimensional image information under excellent superimposed conditions.

On the other hand, the light beam corresponding to the green primary color image signal emitted by the light emitting element of the array REA3 is introduced to the other reflection surface of the oscillating reflection mirror Mgw through the lens L3. Being deflected in the perpendicular direction, the light beam is introduced to he lens L4. Since the two lenses L3 end L4 function as a focusing lens for focusing the light beam emitted by the light emitting element of the array REA3 on the photo-conductive layer member of the spacial light modulation element SLMg, the light beam passed through the lens L4 is reflected by a reflection mirror M3, and then focused on the photo-conductive layer member of the spacial light modulation element SLMg.

The two-dimensional image information signals corresponding to the respective primary color images focused on the respective spacial light modulation elements SLMr, SLMb, and SLMg are written in the respective spacial light modulation elements SLMr, SLMb and SLMg, respectively on the basis of the write operation as already explained with reference to FIG. 3. Further, the image information signals are read from the respective spacial light modulation elements SLMr, SLMb, and SLMg, respectively on the basis of the read operation as already explained with reference to FIG. 48. Therefore, the description of these operation is omitted herein.

Figure 48:
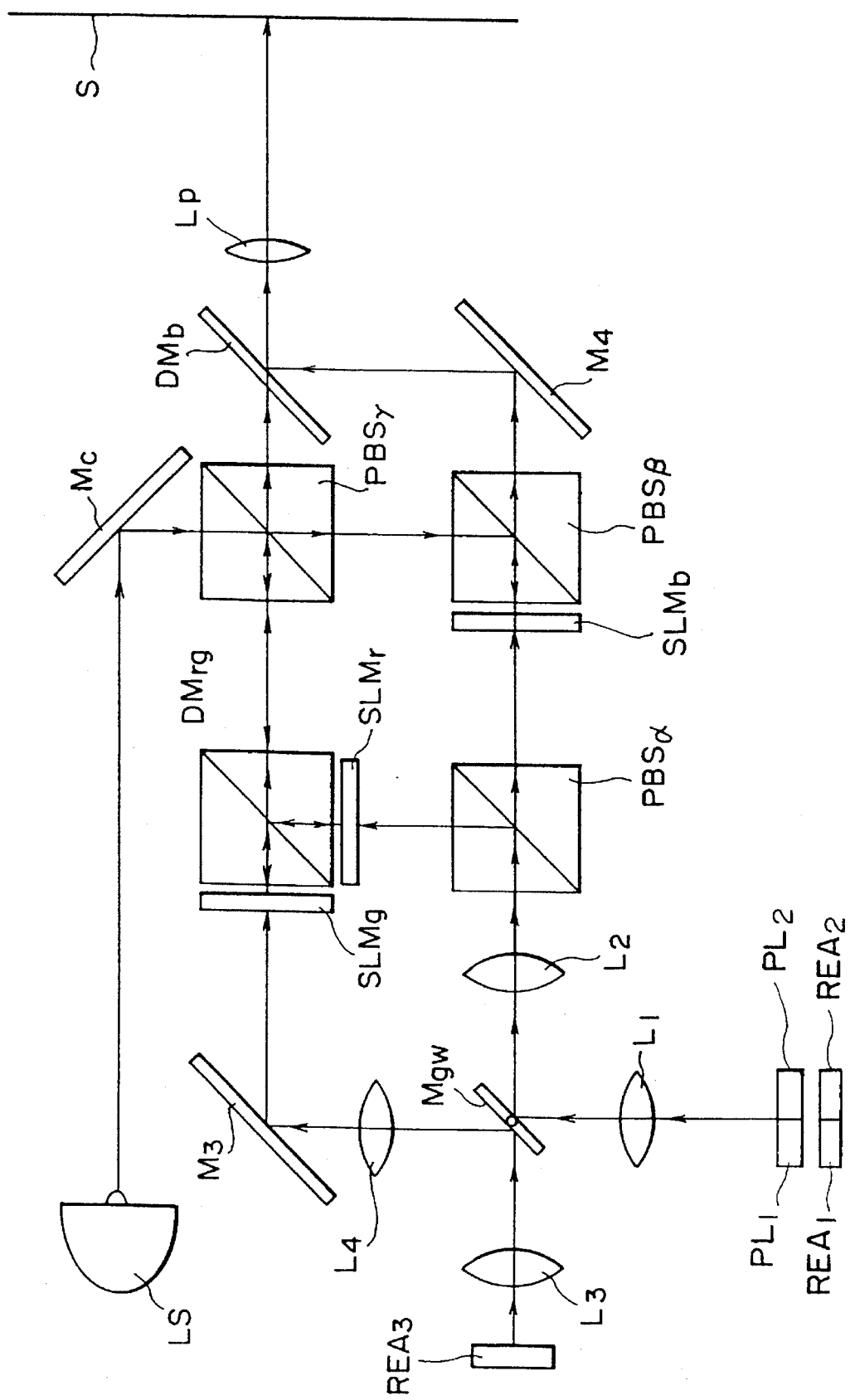
FIG. 48 is a block diagram showing en example of a sixth embodiment of the color image display apparatus according to the present invention.
Figure 50:
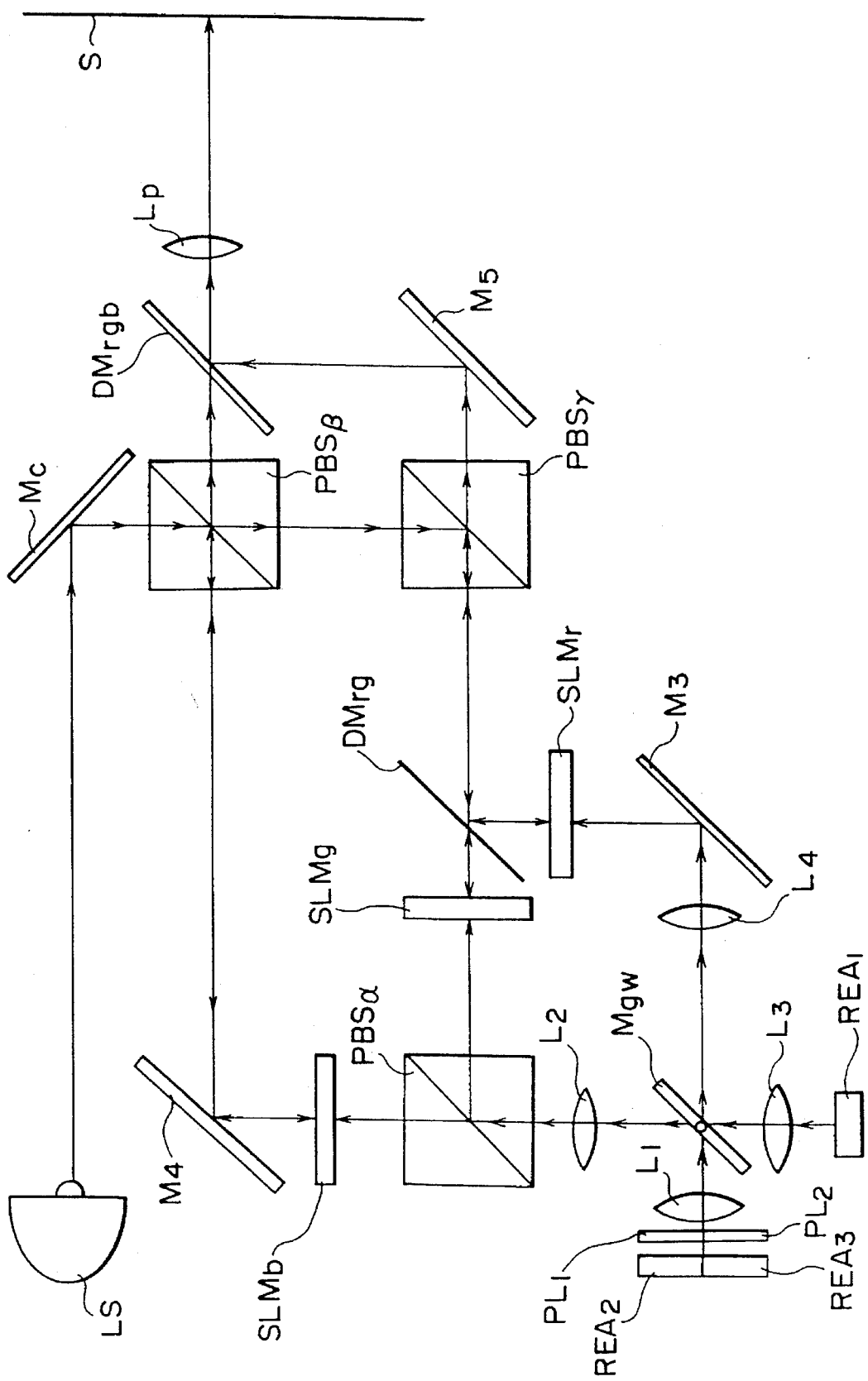
FIG. 50 is a block diagram showing another example of the sixth embodiment of the color image display apparatus according to the present invention.

In the display apparatus shown in FIG. 50, the arrangement relationship between the light emitting element arrays REA2 and REA3 is substantially the same as with the case of that shown in FIG. 48, so that the description thereof is omitted herein.

The light beam emitted by the light emitting element of the array REA2 is transformed into the S-polarized light through a polarizer PL1, and then introduced to a lens L1. The light beam emitted by the light emitting element of the array REA3 is converted into the P-polarized light through a polarizer PL2, and then introduced to the same lens L1. The polarization plane of the S-polarized light and that of the P-polarized light are perpendicular to each other.

The two linearly polarized lights introduced to the lens L1 perpendicular to each other is deflected by a first reflection surface of an oscillating reflection mirror (deflector) Mgw in the perpendicular direction, and then introduced to a lens L2. The two lenses L1 and L2 function as a focusing lens for focusing the two light beams emitted by two light emitting elements of the two array REA2 and REA3 on the photoconductive layer member of the spacial light modulation element arranged corresponding thereto, respectively. The two linearly polarized lights passed through the lens L2 are separated into two linearly polarized lights perpendicular to each other by a polarizing light beam splitter PBSα (see FIG. 55). The linearly polarized light passed through the polarizer PL1 is passed through a polarizing light beam splitter PBSα, and then focused on the photo-conductive layer member of the spacial light modulation element SLMb. Further, the linearly polarized light passed through the polarizer PL2 is reflected by a polarizing light beam splitter PBSα, and then focused on the photo-conductive layer member of the spacial light modulation element SLMg.

By doing this, it is possible to write the light of the blue primary color image signal and the light of the green primary color image signal, respectively as two dimensional image information under perfect offset-less superimposed image.

Further, the spacial position offset between the two linearly polarized lights can be corrected according to the arrangement of the two light emitting element arrays REA2 and REA3 on the same substrate, in the same way as with the modification shown in FIG. 48.

On the other hand, the light beam emitted by the light emitting element of the array REA1 is introduced to a lens L3. The light introduced to the lens L3 is deflected by a second reflection surface of an oscillating reflection mirror Mgw in the perpendicular direction, and then introduced to a lens L4. The two lenses L3 and L4 function as a focusing lens for focusing the light beam emitted by the light emitting element of the array REA1 on the photo-conductive layer member of the spacial light modulation element. Therefore, light passed through the lens L4 is reflected by a reflection mirror M3, and then focused on the photo-conductive layer member of the spacial light modulation element SLMr.

Here, the light beams emitted by the respective light emitting elements of the respective arrays REA1 to REA3 are deflected by the same oscillating reflection mirror Mgw. Therefore, the two-dimensional image information corresponding to the respective different primary color images emitted by the respective light emitting elements of the respective arrays REA1 to REA3 can be focused on the photo-conductive layer members of the respective spacial light modulation elements under perfect superimposed conditions.

The two-dimensional image information corresponding to the respective primary color images focused on the respective spacial light modulation elements SLMr, SLMb and SLMg are written in the spacial light modulation elements SLMr, SLMb and SLMg, respectively on the basis of the write operation of the spacial light modulation element as already explained with reference to FIG. 3.

On the other hand, the read operation from the spacial light modulation elements SLMr, SLMb and SLMg is as follows: The read light of wide wave length band emitted by a read light source LS is introduced to a polarizing light beam splitter PBSβ through a cold mirror Mc. The polarizing light beam splitter PBSβ is provided with such transmission and reflection characteristics of the P- and S-polarized lights with respect to wave length of the incident light, as shown in FIG. 57. Therefore, the polarizing light beam splitter PBSβ reflects the S-polarized light component of the blue primary color light, and introduces the reflected light to the transparent substrate (BP2) side of the spacial light modulation element SLMb through the total reflection mirror M4. On the other hand, the polarizing light beam splitter PBSβ passes the S-polarized light component of the light of all band and the S-polarized light component of the green primary color light, and then introduces these components into the polarizing light beam splitter PBSγ.

On the other hand, the polarizing light beam PBSγ is provided with such transmission and reflection characteristics of the P- and S-polarized lights with respect to wave length of the incident light, as shown in FIG. 56. Therefore, the polarizing light beam splitter PBSγ reflects the S-polarized light component of the red and blue primary color lights, and introduces the reflected lights to the dichroic mirror DMrg.

Further, the S-polarized light component of the light of wave length band of red and green primary color lights introduced to the dichroic mirror DMrg is separated by the dichroic mirror DMrg into the S-polarized light component of the light of green primary color wave length band and the S-polarized light component of the light of red primary color wave length band. Further, the S-polarized light component of the light of green primary color wave length band is passed through the dichroic mirror DMrg, and the introduced to the transparent substrate (BP2) side of the spacial light modulation element SLMg. On the other hand, the S-polarized light component of the light of red primary color wave length band is reflected by the dichroic mirror DMrg, and then introduced to the transparent substrate (BP2) side of the spacial light modulation element SLMr.

The respective spacial light modulation elements SLMr, SLMb and SLMg performs the read operation as already explained with reference to FIG. 3. The optical information containing the red primary color image information read by the spacial light modulation element SLMr is focused on the screen S by optical path of the spacial light modulation element SLMr→(reflection by) the dichroic mirror DMrg→(transmission through) the polarizing light beam splitter PBSγ→(reflection by) the total reflection mirror M5→(reflection by) the dichroic mirror DMrgb→the projection lens Lp→the screen S. Further, the optical information containing the green primary color image information read by the spacial light modulation element SLMg is focused on the screens by optical path of the spacial light modulation element SLMg→transmission through the dichroic mirror DMrg→(transmission through) the polarizing light beam splitter PBSγ→(reflection by) the total reflection mirror M5→(reflection by) the dichroic mirror MBrgb→the projection lens Lp→the screen S. Further, the optical information containing the blue primary color image information read by the spacial light modulation element SLMb is focused on the screen S by optical path of the spatial light modulation element SLMb →(reflection by) the total reflection mirror M4→(transmission through) the polarizing light beam splitter PBSβ →(transmission through) the dichroic mirror MBrgb→the projection lens Lp→the screen S.

Further, the respective spacial light modulation elements SLMr, SLMb and SLMg are arranged at positions the same distance away from the primary plane of the common projection lens Lp. Accordingly, the image information of the respective primary colors read by he respective spacial light modulation elements SLMr, SLMb and SLMg can be projected on the screen S under excellent superimposed conditions.

Figure 51:
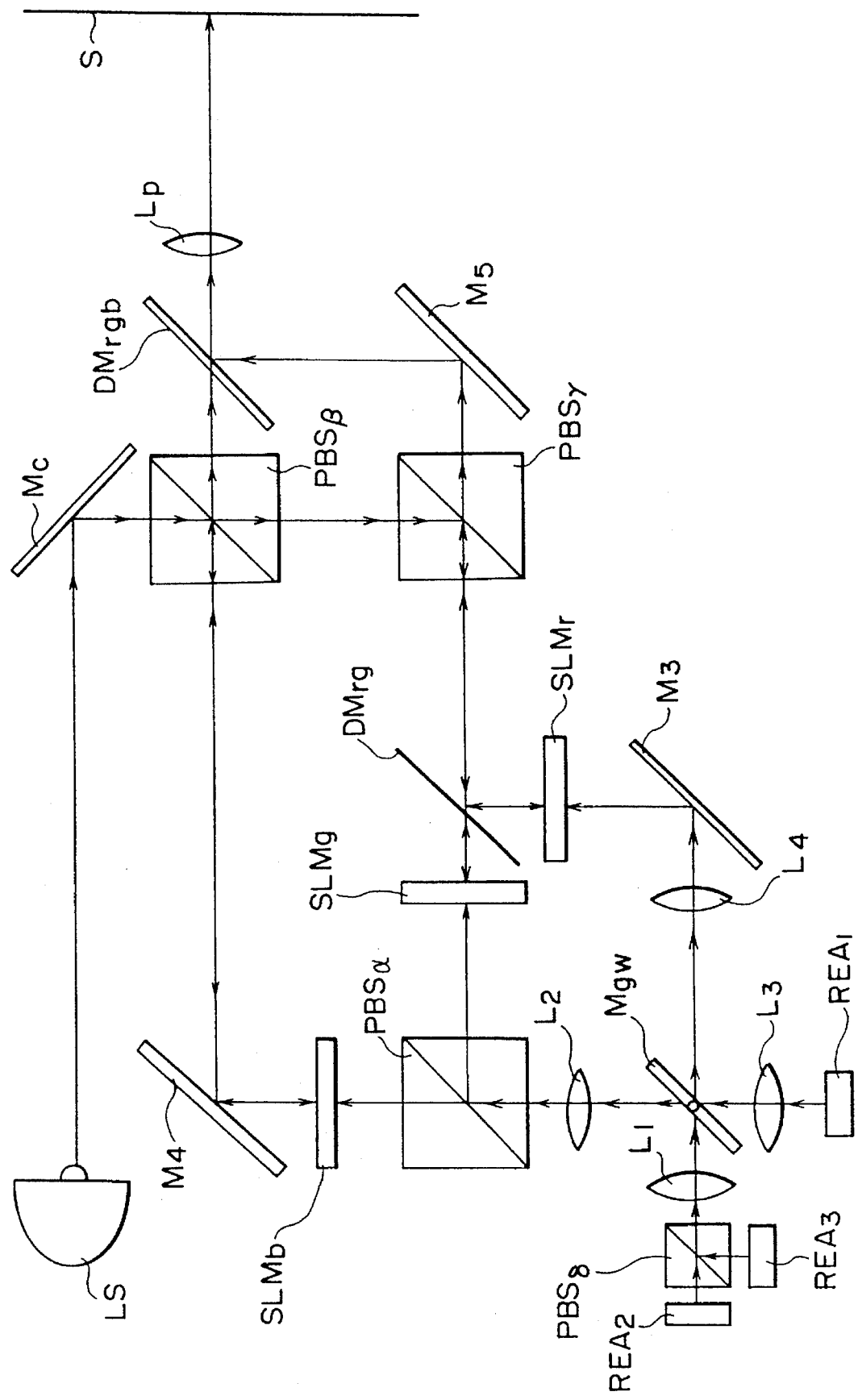
FIG. 51 is a block diagram showing another example of the sixth embodiment of the color image display apparatus according to the present invention.

In the display apparatus shown in FIG. 51, the light beam emitted from the light emitting element of the array REA2 and the light beam emitted from the light emitting element of the array REA3 are both introduced to the polarizing light beam splitter PBSδ in two directions perpendicular to each other. Further, the light beam of the linearly polarized light (the P-polarized light in this embodiment) corresponding to the blue primary color image signal emitted by the light emitting element of the array REA2 is introduced from the polarizing light beam splitter PBSδ to the lens L1. In the same way, the light beam of the linearly polarized light (the S-polarized light in this embodiment) corresponding to the green primary color image signal emitted by the light emitting element of the array REA2 is introduced from the polarizing light beam splitter PBSδ of the lens L1.

The light beam of the P-polarized light corresponding to the blue primary color image signal passed through the lens L1 and the light beam of the S-polarized light corresponding to the green primary color image signal passed through the lens L1 are both introduced to one of the reflection surface of the oscillating reflection mirror Mgw, being deflected in the perpendicular direction, and then introduced to the lens L2. The two lenses L1 and L2 function as a focusing lens for focusing the two light beams emitted by two light emitting element of the two array REA2 and REA3, respectively on the photo-conductive layer member of the spacial light modulation element arranged corresponding thereto, respectively. That is, the light beam of the P-polarized light component passed through the lens L2 is passed through the polarizing light beam splitter PBSα and then focused on the photo-conductive layer member of the spacial light modulation element SLMb. On the other hand, the light beam of the S-polarized light component is reflected by the polarizing light beam splitter PBSα and then focused on the photo-conductive layer member of the spacial light modulation element SLMg.

As described above, the light beam corresponding to the blue primary color image signal and the light beam corresponding to the green primary color image signal can be both written in the two spacial light modulation elements SLMb and SLMg as two-dimensional image information under excellent superimposed conditions.

On the other hand, the light beam emitted by the light emitting element of the array REA1 is introduced to a lens L3. The light beam passed through the lens L3 is deflected by the other reflection surface of the oscillating reflection mirror Mgw in the perpendicular direction, and then introduced to the lens L4. Since the two lenses L3 and L4 function as a focusing lens for focusing the light beam emitted by the light emitting element of the array REA1 on the photo-conductive layer member of the spacial light modulation element SLMr, the light beam passed through the lens L4 is focused on the photo-conductive layer member of the spacial light modulation element SLMr.

The two-dimensional image information signals corresponding to the respective primary color images focused on the respective spacial light modulation elements SLMr, SLMb, and SLMg are written in the respective spacial light modulation elements SLMr, SLMb and SLMg, respectively on the basis of the write operation as already explained with reference to FIG. 3. Further, the image information signals are read from the respective spacial light modulation elements SLMr, SLMb, and SLMg, respectively on the basis of the operation as already explained with reference to FIG. 50. Therefore, the description of these operation is omitted herein.

Figure 52:
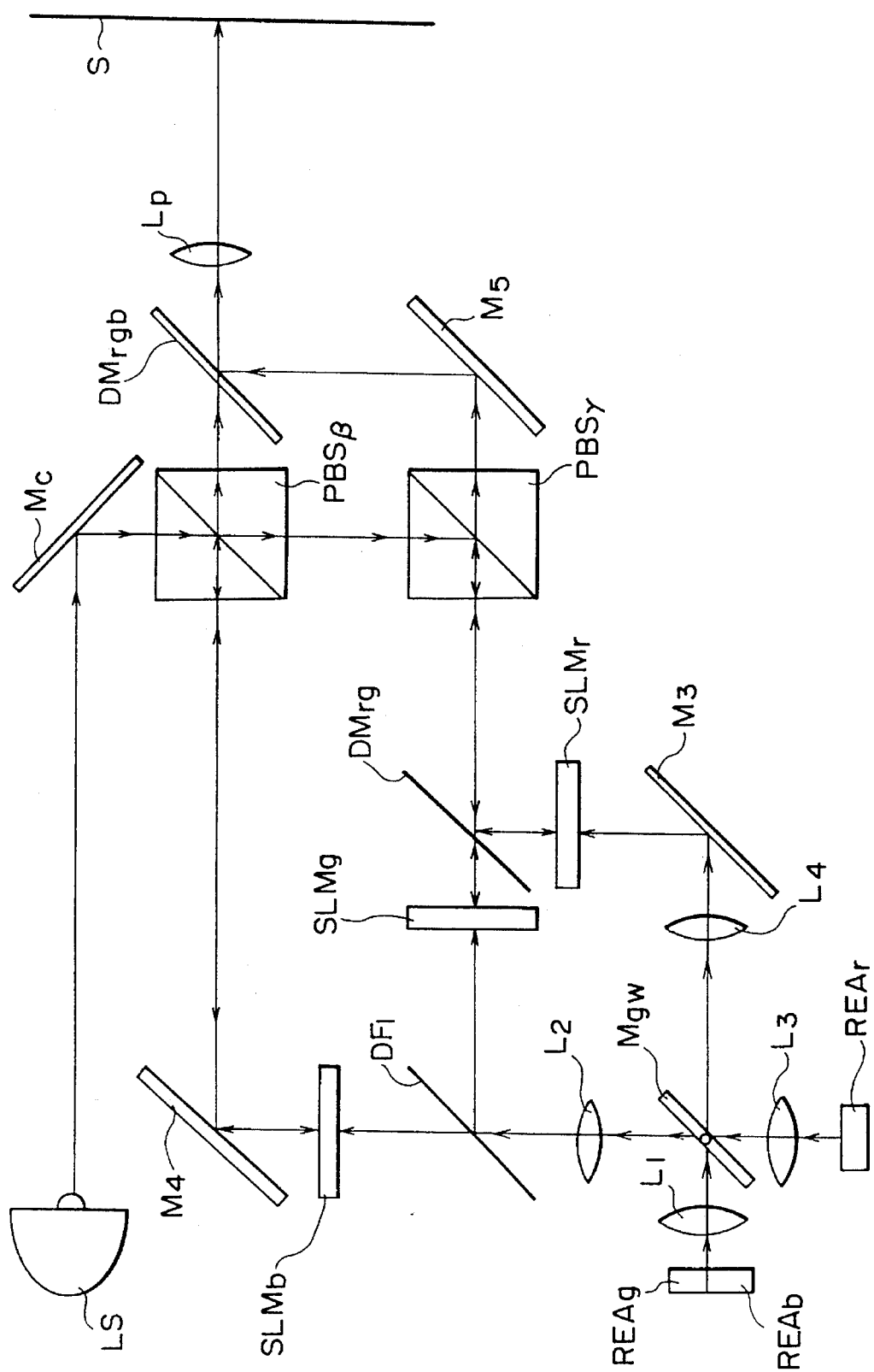
FIG. 52 is a block diagram showing another example of the sixth embodiment of the color image display apparatus according to the present invention.
Figure 53:
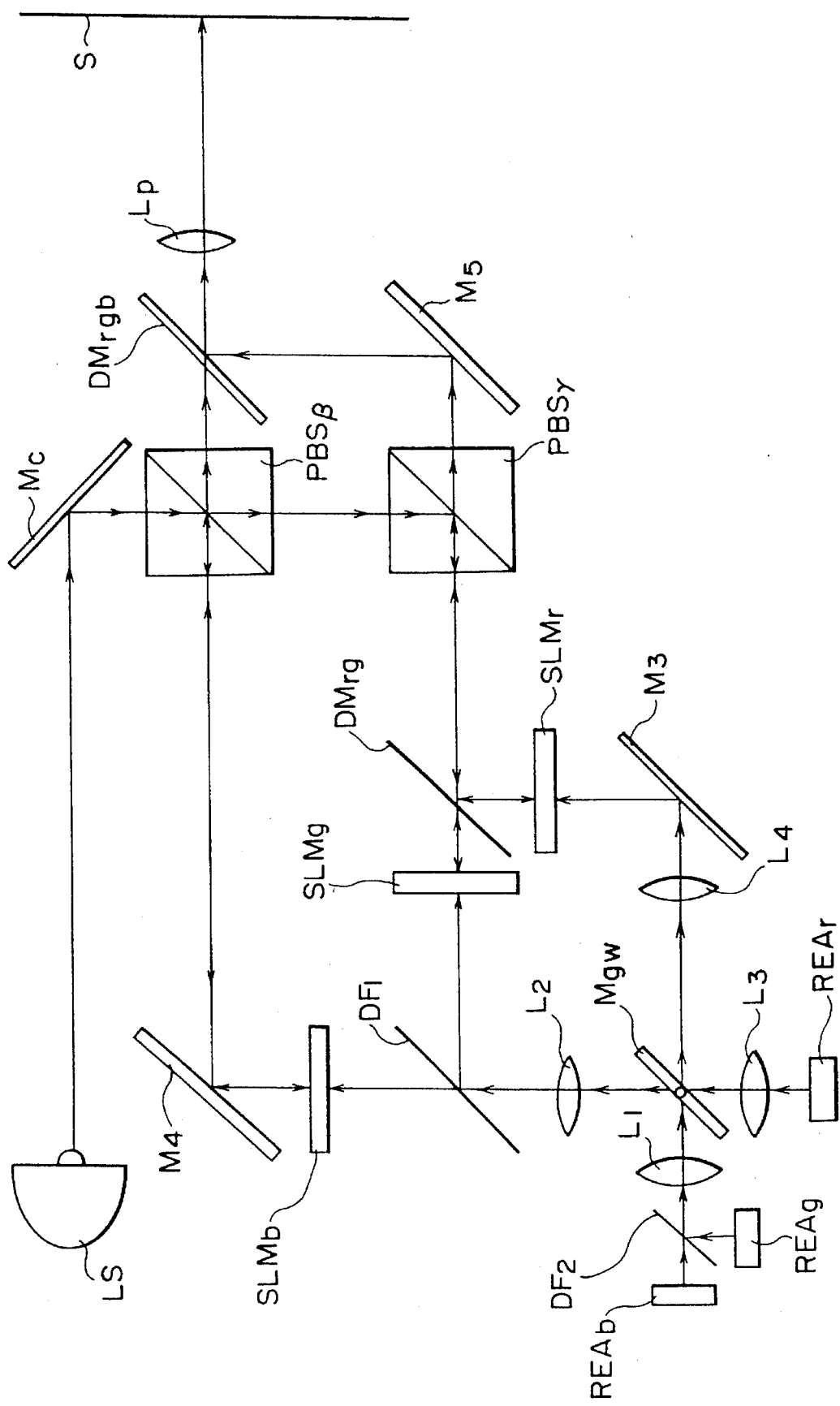
FIG. 53 is a block diagram showing the other example of the sixth embodiment of the color image display apparatus according to the present invention.

In the display apparatus shown in FIGS. 52 and 53, the respective light emitting element at rays REAr, REAb and REAg are each composed by arranging a number (N-units) of light emitting elements in a straight line.

Figure 59:
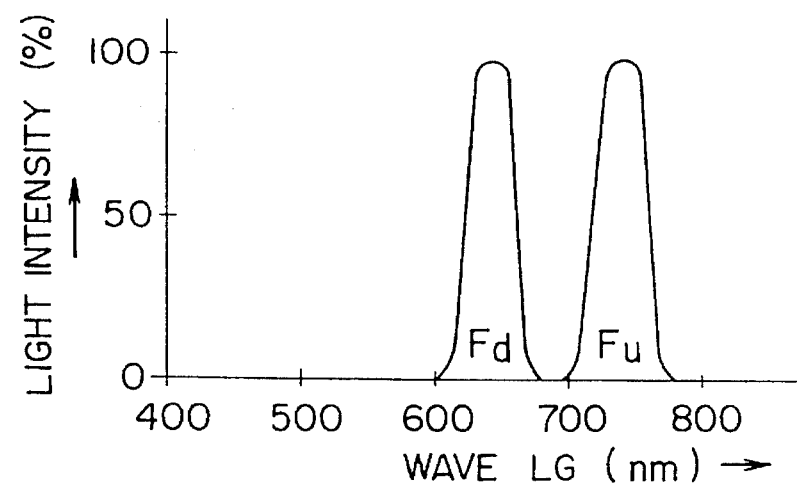
FIG. 59 is a graphical representation showing the spectral characteristics with respect to the wave length of the light beam emitted by the light emitting element of the array.

FIG. 59 shows two wave length bands Fd and Fu of light beams emitted by the light emitting elements of the two arrays REAb and REAg, independently. When the light emitting element array REAb for emitting a light beam of the wave length band Fd is used, the light emitting element array REAg for emitting a light beam of the wave length band Fu is used, or vice versa. In summary, the light emitting element arrays REAb and REAg for emitting light beams of different wave length bands are used. Further, as the light emitting element array REAr, the light emitting element array for emitting light of any one of the wave length bands Fd and Fu can be used, because it is possible to use any light emitting element array REAr which can emit a light beam of any wave length as far as being written in the light-written spacial light modulation element. In the following description, the assumption is made that the light emitting element array REAb emits the light of wave length band Fd whose intensity is modulated by the blue primary color image signal; the light emitting element array REAg emits the light of wave length band Fu whose intensity is modulated by the green primary color image signal; and the light emitting element array REAr emits the light of wave length band Fu whose intensity is modulated by the red primary color image signal.

In the display apparatus shown in FIG. 52, since arrangement of the light emitting element arrays REAb and REAg is the same as with the case of that shown in FIG. 48, the description thereof is omitted herein.

The light beam of wave length Fd emitted by the light emitting element of the array REAb and the light beam of wave length Fd emitted by the light emitting element of the array REAg are both introduced to the lens L1. The light passed through the lens L1 is introduced to the reflection surface of the oscillating reflection mirror Mgw (deflector) in the perpendicular direction, and then introduced to the lens L2. The lenses L1 and L2 focus the light beams emitted from the light emitting elements of the arrays REAb and REAg, respectively on the photo-conductive layer member of the spacial light modulation element.

Figure 58:
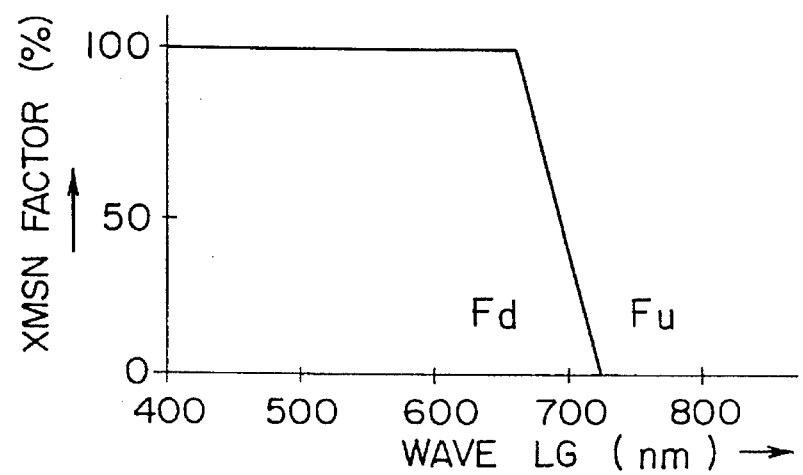
FIG. 58 is a graphical representation showing the transmission factor characteristics with respect to the light of the dichroic mirror.

The light beams of the wave length bands Fu and Fd emitted passed through the lens L2 are separated into the light beam of wave length band Fu and the light beam of wave length band Fd by the dichroic mirror DF1 provided with the transmission and reflection characteristics with respect to wave length as shown in FIG. 58. That is, the light beam of the wave length band Fd is passed through the dichroic mirror DF1, and then focused on the photo-conductive layer member of the spacial light modulation element SLMb. Further, the light beam of the wave length band Fu is reflected by the dichroic mirror DF1 and then focused on the photo-conductive layer member of the spacial light modulation element SLMg.

As described above, it is possible to write the light beam (the wave length band Fd) of the blue primary color image signal and the light beam (the wave length bend Fu) of the green primary color image signal, respectively as two dimensional image information under perfect offset-less superimposed image.

Further, the spacial position offset between the two light beams can be corrected according to the arrangement of the two light emitting element arrays REAb and REAg on the same substrate, in the same way as with the modification shown in FIG.

On the other hand, the light beam corresponding to the red primary color image signals emitted by the light emitting element of the array REAr is introduced to a lens L3. The light beam passed through the lens L3 is deflected by the second reflection surface of the oscillating reflection mirror Mgw in the perpendicular direction, and then introduced to a lens L4. The two lenses L3 and L4 function as a focusing lens for focusing the light beam emitted by the light emitting element of the array REAr on the photo-conductive layer member of the spacial light modulation element. Therefore, light passed through the lens L4 is reflected by a reflection mirror M3, and then focused on the photo-conductive layer member of the spacial light modulation element SLMr.

As described above, the light beams emitted by the respective light emitting elements of the respective arrays REAr, REAb and REAg are deflected by the same oscillating reflection mirror Mgw in the perpendicular direction. Therefore, it is possible to focus the two-dimensional image information corresponding to the different primary color images and emitted from the respective light emitting element arrays REAr, REAb and REAg on the photo-conductive layer members of the spacial light modulation elements under excellent superimposed conditions.

The two-dimensional image information corresponding to the respective primary color images focused on the respective spacial light modulation elements SLMr, SLMb and SLMg are written in the spacial light modulation elements SLMr, SLMb end SLMg, respectively on the basis of the write operation of the spacial light modulation element as already explained with reference to FIG. 3.

On the other hand, the read operation from the spacial light modulation elements SLMr, SLMb and SLMg is as follows: The read light of wide wave length band emitted by a read light source LS is introduced to a polarizing light beam splitter PBSβ by the cold mirror Mc. The polarizing light beam splitter PBSβ is provided with such transmission and reflection characteristics of the P- and S-polarized lights with respect to wave length of the incident light, as shown in FIG. 57. Therefore, the polarizing light beam splitter PBSβ reflects the S-polarized light component of the blue primary color light, and introduces the reflected light to the transparent substrate (BP2) side of the spacial light modulation element SLMb through the total reflection mirror M4. On the other hand, the polarizing light beam splitter PBSβ transmits the P-polarized light component of the light of all wave length band and the S-polarized light component of the red and blue primary color lights, and then introduces these components to the polarizing light beam splitter PBSγ.

On the other hand, the polarizing light beam splitter PBSγ is provided with such transmission and reflection characteristics of the P- and S-polarized lights with respect to wave length of the incident light, as shown in FIG. 56. Therefore, the polarizing light beam splitter PBSγ reflects the S-polarized light component of the red and green primary color lights, and introduces the reflected components to the dichroic mirror DMrg.

Further, the S-polarized light component of the light of wave length bend of red and green primary color lights introduced to the dichroic mirror DMrg is separated by the dichroic mirror DMrg into t he S-polarized light component of the light of green primary color wave length band and the S-polarized light component of the light of red primary color wave length band. Further, the S-polarized light component of the light of green primary color wave length band is passed through the dichroic mirror DMrg, and then introduced to the transparent substrate (BP2) side of the spacial light modulation element SLMg. On the other hand, the S-polarized light component of the red primary color light is reflected by the dichroic mirror DMrg, and then introduced to the transparent substrate (BP2) side of the spacial light modulation element SLMr.

The respective spacial light modulation elements SLMr, SLMb and SLMg perform the read operation, as already explained with reference to FIG. 3. The optical information containing the red primary color image information read by the spacial light modulation element SLMr is focused on the screen S by optical path of the spacial light modulation element SLMr→(reflection by) the total dichroic mirror DMrg→(transmission through) the polarizing light beam splitter PBSγ→(reflection by) the total reflection mirror M5→(reflection by) the dichroic mirror DMrgb→the projection lens Lp→the screen S. Further, the optical information containing the green primary color image information read by the spacial light modulation element SLMg is focused on the screen S by optical path of the spacial light modulation element SLMg→(transmission through) the dichroic mirror DMrg→(transmission through) the polarizing light beam splitter PBSγ→(reflection by) the total reflection mirror M5→(reflection by) the dichroic mirror MBrgb→the projection lens Lp→the screen S. Further, the optical information containing the blue primary color image information read by the spacial light modulation element SLMb is focused on the screen S by optical path of the spacial light modulation element SLMb →(reflection by) the total reflection mirror M4→(transmission through) the polarizing light beam splitter PBSβ →(transmission through) the dichroic mirror MBrgb→the projection lens Lp→the screen S.

Further, the respective spacial light modulation elements SLMr, SLMb and SLMg are arranged at positions the same distance away from the primary plane of the common projection lens Lp. Accordingly, the image information of the respective primary colors read by the respective spacial light modulation elements SLMr, SLMb and SLMg can be projected on the screen S under excellent superimposed conditions.

In the display apparatus shown in FIG. 53, the dichroic mirror DF2 is provided with the transmission characteristics with respect to wave length as shown in FIG. 58. The light beam of a specific wave length band Fd emitted by the light emitting element of the array REAb (whose intensity is modulated on the basis of the blue primary color image signal) is passed through the dichroic mirror DF2, and then introduced to a lens L1. The light beam of a specific wave length band Fu emitted by the light emitting element of the array REAg (whose intensity is modulated on the basis of the green primary color image signal) is reflected from the dichroic mirror DF2, and then introduced to the lens L1. On the other hand the light beam of a specific wave length band Fu emitted by the light emitting element of the array REAr (whose intensity is modulated on the basis of the red primary color image signal) is introduced to a lens L3.

The write and read operation of this display apparatus is substantially the same as with the case of that shown in FIG. 52, except above, so that any description thereof is omitted herein.

Finally, the respective spacial light modulation elements SLMr, SLMb and SLMg are arranged at positions the same distance away from the primary plane of the common projection lens Lp. Accordingly, the image information of the respective primary colors read by the respective spacial light modulation elements SLMr, SLMb and SLMg can be projected on the screen S under excellent superimposed conditions.

As described above, in the color image display apparatus according to the present invention, the oscillating reflection mirror provided with two reflecting surfaces on both sides thereof is oscillated at a predetermined speed, so that two light beams incident upon both the right and reverse reflecting surfaces thereof can be deflected simultaneously and separately. A light beam whose intensity is modulated on the basis of image information of light with a specific polarization plane (or with a specific wave length) is introduced to at least one reflection surface of the oscillating reflection mirror. That is, in this oscillating reflection mirror, it is possible to deflect a plurality of light beams by one of the reflection surfaces. Further, the light beams deflected by the two right and reverse reflection surfaces of the oscillating reflection mirror are introduced to the focusing lenses, respectively. When the light beams passed through the focusing lenses are not intensity-modulated separately on the basis of different image signals of lights of specific polarization planes (or specific wave length bands), the light beam is written in the photo-conductive layer member of one light-written type spacial light modulation element. Further, when the light beams passed through the focusing lenses are intensity-modulated separately on the basis of different image signals of lights of specific polarization planes (or specific wave length bands), the light beams are separated to two lights of different specific polarization plane (or specific wave length band). The separated lights with a specific polarization plane are focused on the photo-conductive layer members of two light-written type spacial light modulation elements separately, and written as different image information. Further, the light emitted by a read light is resolved into a plurality of read lights of different wave length bands. The respective read lights are given to the respective light-written spacial light modulation elements, as read lights, so that the light whose intensity is modulated on the basis of the image information can be read, separately. These read lights are synthesized, and then projected on the screen through the common projection lens, so that it is possible to obtain a color image to be displayed on the screen.

As described above, in the color display apparatus according to the present invention, a plurality of light beams of various image information can be deflected by single deflector in synchronism with each other before being written the light-written spacial light modulation elements. A plurality of written image information are read simultaneously and then projected onto the screen under excellent superimposed conditions. Accordingly, it is possible to realize a color image display apparatus high in precision and reliability and low in cost.

What is claimed is:

1. A color image display apparatus, comprising:

light deflecting means having a first and a second oscillating reflection mirror attached to a common oscillating shaft a predetermined distance away from each other for deflecting a first light beam and a second light beam simultaneously by oscillating the first and second oscillating reflection mirrors at a predetermined period;

first light emitting means for emitting the first light beam intensity-modulated on the basis of an image signal of a specific primary color of three primary colors of additive color mixture for constituting a color image to be displayed, to the first oscillating reflection mirror of said light deflecting means;

second light emitting means for emitting the second light beam intensity-modulated on the basis of an image signal of two remaining primary colors, to the second oscillating reflection mirror of said light deflecting means, the two remaining primary colors being complementary to the specific primary color and the two remaining primary color light beams being separatable in space or time;

first focusing means for focusing the light beam deflected by the first oscillating reflection mirror to a first light-written type spacial light modulation element composed of at least a photo-conductive layer member and a light modulation substance layer member, to write the light beam deflected by the first oscillating reflection mirror;

second focusing means for focusing the light beam deflected by the second oscillating reflection mirror to a second light-written type spacial light modulation element composed of at least a photo-conductive layer member and a light modulation substance layer member, to write the light beam deflected by the second oscillating reflection mirror;

light resolving means for resolving light emitted by a read light source to three read lights of predetermined wave length bands corresponding to the three primary colors of the additive color mixture, respectively;

first light introducing means for introducing a resolved read light with a wave length band of the specific primary color, to said first light-written type spacial light modulation element as a read light;

second light introducing means for selectively introducing two remaining read lights with two wave length bands of the two primary colors complementary to the specific primary color, to said second light-written type spacial light modulation element as two read lights, separately in correspondence to light writing portions at which the second light beam intensity-modulated on the basis of the image signal of the two remaining primary colors has been written;

light synthesizing means for synthesizing two read lights intensity-modulated on the basis of the respective color image information and read from said first and second light-written type spacial light modulation elements separately, into light intensity-modulated on the basis of the respective image information; and projecting means for projecting the light synthesized by said light synthesizing means onto a screen.

2. A color image display apparatus, comprising:

light deflecting means having a first and a second oscillating reflection mirror formed with a first reflective surface and a second reflective surface on both right and reverse sides thereof, the first and second mirrors being attached to a common oscillating shaft a predetermined distance away from each other for deflecting a first, a second, and a third light beams simultaneously by oscillating the first oscillating reflection mirror and the second oscillating reflection mirror;

first light emitting means for emitting the first light beam intensity-modulated on the basis of an image signal of a specific primary color of three primary colors of additive color mixture for constituting a color image to be displayed, to the first oscillating reflection mirror of said light deflecting means;

second light emitting means for emitting the second light beam intensity-modulated on the basis of an image signal of one of two remaining primary colors, to the first reflective surface of the second oscillating reflection mirror of said light deflecting means;

third light emitting means for emitting the third light beam intensity-modulated on the basis of an image signal of the other of two remaining primary colors, to the second reflective surface of the second oscillating reflection mirror of said light deflecting means;

first focusing means for focusing the light beam deflected by the first oscillating reflection mirror to a first light-written type spacial light modulation element composed of at least a photo-conductive layer member and a light modulation substance layer member;

second focusing means for focusing the light beam deflected by the first reflective surface of the second oscillating reflection mirror to a second light-written type spacial light modulation element composed of at least a photo-conductive layer member and a light modulation substance layer member;

third focusing means for focusing the light beam deflected by the second reflective surface of the second oscillating reflection mirror to a third light-written type spacial light modulation element composed of at least a photo-conductive layer member and a light modulation substance layer member;

light resolving means for resolving light emitted by a read light source to three read lights with wave length bands of the three primary colors of the additive color mixture, respectively;

light introducing means for introducing each of the three resolved read lights with three wave length bands of the three primary colors, to said first, second and third light-written type spacial light modulation elements, as a read light, respectively;

light synthesizing means for synthesizing three lights intensity-modulated on the basis of the respective color image signals and read from said first, second and third light-written type spacial light modulation elements separately, into light intensity-modulated on the basis of the respective image information; and projecting means for projecting the light synthesized by said light synthesizing means onto a screen.

3. A color image display means, comprising:

a first light-written type reflective spacial light modulation element composed of at least a photo-conductive layer member and a light modulating substance member, for writing two-dimensional image information of a first light beam intensity-modulated on the basis of an image signal of a specific primary color of three primary colors of additive color mixture for constituting a color image to be displayed;

a second light-written type reflective spacial light modulation element composed of at least a photo-conductive layer member and a light modulating substance member, for writing two-dimensional image information of a second light beam intensity-modulated on the basis of an image signal of two remaining primary colors, the two remaining primary colors being complementary to the specific primary color and the two remaining primary color light beams being separatable in space or time;

a first polarizing light beam splitter arranged on a read light incoming side of said first light-written type reflective spacial light modulation element;

a second polarizing light beam splitter arranged on a read light incoming side of said second light-written type reflective spacial light modulation element;

separating means for separating read light emitted by a read light source to a first read light of the specific primary color of three colors of additive color mixture and second read lights of two remaining primary colors complementary to the specific primary color;

light introducing means for introducing the separated first read light to the read light incoming side of said first light-written type reflective spacial light modulation element through said first polarizing light beam splitter;

selective light introducing means for selectively introducing the separated second read lights with two wave length bands of the two primary colors complementary to the specific primary color, to the read light incoming side of said second light-written type reflective spacial light modulation element through said second polarized light beam splitter, in correspondence to light writing portions at which the second light beams intensity-modulated on the basis of the image signal of the two remaining primary colors has been written;

synthesizing means for synthesizing the first read light having image information of the specific primary color of the three primary colors of additive color mixture, reflected by said first light-written type reflective light modulation element and outputted through said first polarizing light beam splitter; and the second read light having image information of the two remaining primary colors complementary to the specific primary color and separatable in space or time, reflected by said second light-written type reflective light modulation element, and outputted through said second polarizing light beam splitter, into light intensity-modulated on the basis of the respective image information; and projecting means for projecting the light synthesized by said light synthesizing means onto a screen.

4. A color image display apparatus, comprising:

first light emitting means for emitting a first light beam intensity-modulated on the basis of an image signal of a specific primary color of three primary colors of additive color mixture for constituting a color image to be displayed, to a first reflective surface of an oscillating reflection mirror formed with the first and a second reflective surfaces on both right and reverse sides thereof;

second light emitting means for emitting a second light beam intensity-modulated on the basis of an image signal of two remaining primary colors, to the second reflective surface of the oscillating reflection mirror, the two remaining primary colors being complementary to the specific primary color and the two remaining primary color light beams being separatable in space or time;

first focusing means for focusing the light beam deflected by the first reflective surface of the oscillating reflection mirror to a first light-written type spacial light modulation element composed of at least a photoconductive layer member and a light modulation substance layer member;

second focusing means for focusing the light beam deflected by the second reflective surface of the oscillating reflection mirror to a second light-written type spacial light modulation element composed of at least a photo-conductive layer member and a light modulation substance layer member;

light resolving means for resolving light emitted by a read light source to three read lights of predetermined wave length bands corresponding to the three primary colors of the additive color mixture, respectively;

first light introducing means for introducing a resolved read light with a wave length band of a specific primary color, to said first light-written type spacial light modulation element as a read light;

second light introducing means for selectively introducing two remaining read lights with two wave length bands of the two primary colors complementary to the specific primary color, to said second light-written type spacial light modulation element as two read lights, separately in correspondence to light writing portions at which the second light beam intensity-modulated on the basis of the image signal of the two remaining primary colors separatable in space or time has been written;

light synthesizing means for synthesizing two lights intensity-modulated on the basis of the respective color image signals end read from said first and second light-written type spacial light modulation elements separately, into light intensity-modulated on the basis of the respective image information; and projecting means for projecting the light synthesized by said light synthesizing means onto a screen.

5. A color image display apparatus, comprising:

first light emitting means for emitting a first light beam intensity-modulated on the basis of an image signal of a specific primary color of three primary colors of additive color mixture for constituting a color image to be displayed, to a first reflective surface of an oscillating reflection mirror formed with the first and a second reflective surfaces on both right and reverse sides thereof;

second light emitting means for emitting a second light beam intensity-modulated on the basis of a time-axis compressed end time division multiplexed image signal of two remaining primary colors, to the second reflective surface of the oscillating reflection mirror, the two remaining primary colors being complementary to the specific primary color;

first focusing means for focusing the light beam deflected by the first reflective surface of the oscillating reflection mirror to a first light-written type spacial light modulation element composed of at least a photoconductive layer member and a light modulation substance layer member;

second focusing means for focusing the light beam deflected by the second reflective surface of the oscillating reflection mirror to a second light-written type spacial light modulation element composed of at least a photo-conductive layer member and a light modulation substance layer member;

light resolving means for resolving light emitted by a read light source to three read lights of predetermined wave length bands corresponding to the three primary colors of the additive color mixture, respectively;

light introducing means for introducing a resolved read light with a wave length band of a specific primary color, to said first light-written type spacial light modulation element as a read light;

second light introducing means for selectively introducing two remaining read lights with two wave length bands of the two primary colors complementary to the specific primary color, to said second light-written type spacial light modulation element as two read lights, separately in correspondence to light writing portions at which the second light beam intensity-modulated on the basis of the image signal of the two remaining primary colors has been written;

light synthesizing means for synthesizing two lights intensity-modulated on the basis of the respective color image signals and read from said first and second light-written type spacial light modulation elements separately, into light intensity-modulated on the basis of the respective image information; and projecting means for projecting the light synthesized by said light synthesizing means onto a screen.

6. A color image display apparatus, comprising:

first light emitting means for emitting a first light beam intensity-modulated on the basis of an image signal of a specific primary color of three primary colors of additive color mixture for constituting a color image to be displayed, to a first reflective surface of an oscillating reflection mirror formed with the first and a second reflective surfaces on both right and reverse sides thereof;

second light emitting means for emitting two light beams with two different wave length bands and intensity-modulated on the basis of two image signals of two remaining primary colors for each primary color, to the second reflective surface of the oscillating reflection mirror, the two remaining primary colors being complementary to the specific primary color;

first focusing means for focusing the light beam deflected by the first reflective surface of the oscillating reflection mirror to a first light-written type spacial light modulation element composed of at least a photo-conductive layer member and a light modulation substance layer member;

second focusing means for focusing the light beams with two different wave length bands and deflected by the second reflective surface of the oscillating reflection mirror to a second light-written type spacial light modulation element composed of at least a photo-conductive layer member and a light modulation substance layer member;

light resolving means for resolving light emitted by a read light source to three read lights of predetermined wave length bands corresponding to the three primary colors of the additive color mixture, respectively;

light introducing means for introducing a resolved read light with a wave length band of a specific primary color, to said first light-written type spacial light modulation element as a read light;

second light introducing means for selectively introducing two remaining read lights with two wave length bands of the two primary colors complementary to the specific primary color, to said second light-written type spacial light modulation element as two read lights, separately in correspondence to light writing portions at which the second light beams with two different wave length bands for each primary color and intensity-modulated on the basis of the image signal of the two remaining primary colors has been written;

light synthesizing means for synthesizing two lights intensity-modulated on the basis of the respective color image signals and read from said first and second light-written type spacial light modulation elements separately, into light intensity-modulated on the basis of the respective image information; and projecting means for projecting the light synthesized by said light synthesizing means onto a screen.

7. A color image display apparatus, comprising:

light deflecting means for simultaneously deflecting light beams incident upon two reflection surfaces formed on right and reverse sides of an oscillating reflection mirror thereof, independently;

light emitting means for introducing first and second light beams intensity-modulated on the basis of first and second color image information for each light having a specific polarization plane, to one of the reflection surfaces and a third light beam intensity-modulated on the basis of a third image color information to the other reflection surface of the oscillating reflection mirror of said light deflecting means;

focusing means for focusing the light beams deflected by both the right and reverse sides of the oscillating reflection mirror of said light deflecting means, separately;

first light guiding means for guiding the third light beam deflected and passed through said focusing means to a light-written type spacial light modulation element composed of at least a photo-conductive layer member and a light modulation substance layer member; and second light guiding means for separating the first and second light beams into said each light having a specific polarization plane and guiding the separated light beams deflected by said deflecting means and passed through said focusing means to two different light-written type spacial light modulation elements, respectively each composed of at least a photo-conductive layer member and a light modulation substance layer member.

8. The color image display apparatus of claim 7, which further comprises:

light resolving means for resolving light emitted by a read light source to a plurality of read lights with predetermined wave length bands;

introducing means for introducing each of the resolved read lights to each of the plurality of light-written type spacial light modulation elements as a read light, respectively;

light synthesizing means for synthesizing lights modulated on the basis of the respective image information and read by a plurality of the light-written type spacial light modulation elements, respectively; and projecting means for projecting the light synthesized by said light synthesizing means onto a screen.

9. The color image display apparatus of claim 8, wherein said light emitting means is a plurality of light emitting element arrays each formed by arranging a plurality of light emitting elements in straight lines; the light emitting element arrays are arranged on a substrate in such a way that two adjacent light emitting element array columns are spaced away from each other by integer times of a pitch of the light emitting elements of the light emitting element array; and light beams intensity-modulated on the basis of different image color information and having a specific polarization plane are introduced to at least one of the reflection surfaces of the oscillating reflection mirror of said light deflecting means, for each light emitting element array.

10. The color image display apparatus of claim 8, wherein said light emitting means is a plurality of light emitting element arrays each formed by arranging a plurality of light emitting elements in straight lines; the light emitting element columns of the light emitting element arrays are arranged on a substrate in straight lines; and light beams intensity-modulated on the basis of different image color information and having a specific polarization plane are introduced to at least one of the reflection surfaces of the oscillating reflection mirror of said light deflecting means, for each light emitting element array.

11. The color image display apparatus of claim 8, wherein said light emitting means is a plurality of light emitting element arrays each formed by arranging a plurality of light emitting elements in straight lines; and light beams intensity-modulated on the basks of different image color information and having a specific polarization plane are introduced to at least one of the reflection surfaces of the oscillating reflection mirror of said light deflecting means, for each region determined in series and in sequence along the light emitting element array.

12. The color image display apparatus of claim 8, wherein said light emitting means is a plurality of light emitting element arrays each formed by arranging a plurality of light emitting elements in straight lines; and a light beam obtained by synthesizing a plurality of light beam groups each intensity-modulated on the basis of image color information and having a specific polarization plane is introduced to at least one of the reflection surfaces of the oscillating reflection mirror of said light deflecting means.

13. A color image display apparatus, comprising:

light deflecting means for simultaneously deflecting light beams incident upon two reflection surfaces formed on right and reverse sides of an oscillating reflection mirror thereof, independently:

light emitting means for introducing first and second light beams intensity-modulated on the basis of first and second color image information for each light having a specific wave length band, to one of the reflection surfaces and a third light beam intensity-modulated on the basis of a third image color information to the other reflection surface of the oscillating reflection mirror of said light deflecting means;

focusing means for focusing the light beams deflected by both the right and reverse sides of the oscillating reflection mirror of said light deflecting means, separately;

first light guiding means for guiding the third light beam deflected and passed through said focusing means to a light-written type spacial light modulation element composed of at least a photo-conductive layer member and a light modulation substance layer member; and second light guiding means for separating the first and second light beams into said each light having a specific wave length band and guiding the separated light beams deflected by said deflecting means and passed through said focusing means to two different light-written type spacial light modulation elements, respectively each composed of at least a photo-conductive layer member and a light modulation substance layer member.

14. The color image display apparatus of claim 13, which further comprises:

light resolving means for resolving light emitted by a read light source to a plurality of read lights with predetermined wave length bands;

introducing means for introducing each of the resolved reed lights to each of the plurality of light-written type spacial light modulation elements as a read light, respectively;

light synthesizing means for synthesizing lights modulated on the basis of the respective image information and read by a plurality of the light-written type spacial light modulation elements, respectively: and projecting means for projecting the light synthesized by said light synthesizing means onto a screen.

15. The color image display apparatus of claim 14, wherein said light emitting means is a plurality of light emitting element arrays each formed by arranging a plurality of light emitting elements in straight lines; the light emitting element arrays are arranged on a substrate in such a way that two adjacent light emitting element array columns are spaced away from each other by integer times of a pitch of the light emitting elements of the light emitting element array; and light beams intensity-modulated on the basis of different image color information and having a specific wave length band are introduced to at least one of the reflection surfaces of the oscillating reflection mirror of said light deflecting means, for each light emitting element array.

16. The color image display apparatus of claim 14, wherein said light emitting means is a plurality of light emitting element arrays each formed by arranging a plurality of light emitting elements in straight lines; the light emitting element columns of the light emitting element arrays are arranged on a substrate in straight lines: and light beams intensity-modulated on the basis of different image color information end having a specific wave length band are introduced to at least one of the reflection surfaces of the oscillating reflection mirror of said light deflecting means, for each light emitting element array.

17. The color image display apparatus of claim 14, wherein said light emitting means is a plurality of light emitting element arrays each formed by arranging a plurality of light emitting elements in straight lines; and light beams intensity-modulated on the basis of different image color information and having a specific wave length band are introduced to at least one of the reflection surfaces of the oscillating reflection mirror of said light deflecting means, for each region determined in series and in sequence along the light emitting element array.

18. The color image display apparatus of claim 14, wherein said light emitting means is a plurality of light emitting element arrays each formed by arranging a plurality of light emitting elements in straight lines; and a light beam obtained by synthesizing a plurality of light beam groups each intensity-modulated on the basis of image color information and having a specific wave length band is introduced to at least one of the reflection surfaces of the oscillating reflection mirror of said light deflecting means.

\* \* \* \* \*